United States Patent
Bondaryk et al.

(10) Patent No.: US 11,420,338 B2
(45) Date of Patent: Aug. 23, 2022

(54) ASSISTIVE ROBOT SYSTEMS FOR CONTAINER TILTING

(71) Applicant: Toyota Research Institute, Inc., Los Altos, CA (US)

(72) Inventors: Joseph Bondaryk, Brookline, MA (US); James D. C. Lent, Burlington, VT (US); Aimee S. Goncalves, Kingston, MA (US); Paul W. Baim, Natick, MA (US); Christopher Gidwell, Sherborn, MA (US); Toffee Albina, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 244 days.

(21) Appl. No.: 16/560,363

(22) Filed: Sep. 4, 2019

(65) Prior Publication Data
US 2020/0206946 A1    Jul. 2, 2020

Related U.S. Application Data

(60) Provisional application No. 62/785,474, filed on Dec. 27, 2018.

(51) Int. Cl.
*B25J 15/00*      (2006.01)
*B25J 9/02*       (2006.01)
(Continued)

(52) U.S. Cl.
CPC ............. *B25J 15/0004* (2013.01); *B25J 9/02* (2013.01); *B25J 18/025* (2013.01);
(Continued)

(58) Field of Classification Search
CPC ........ B25J 15/0004; B25J 9/02; B25J 18/025; B66F 9/07513; B66F 9/183; B66F 9/20; B65F 3/04; B65F 3/046
See application file for complete search history.

(56) References Cited

U.S. PATENT DOCUMENTS 2,925,887 A * 2/1960 Gibson .................. B62D 7/142
                                                      187/232
3,157,370 A * 11/1964 Govatsos ............... A47K 10/40
                                                    242/560.2
(Continued)

FOREIGN PATENT DOCUMENTS

CA          2949306 A1     5/2018
CN          101897641       12/2011
(Continued)

OTHER PUBLICATIONS

McGinn, Conor, et al., "Design of a terrain adaptive wheeled robot for human-orientated environments," https://link.springer.com/article/10.1007/s10514-018-9701-1; Published Date: Feb. 13, 2018.
(Continued)

*Primary Examiner* — Saul Rodriguez
*Assistant Examiner* — Ashley K Romano
(74) *Attorney, Agent, or Firm* — Dinsmore & Shohl LLP

(57) ABSTRACT

Embodiments are directed to an assistive robot system. The assistive robot system includes a lifting mechanism, a movable arm assembly coupled to the lifting mechanism, a container tilting arm assembly, a processing device communicatively coupled to the lifting mechanism and the movable arm assembly, and a non-transitory, processor-readable storage medium in communication with the processing device. The non-transitory, processor-readable storage medium causes the processing device to transmit a command to the lifting mechanism to cause the lifting mechanism to move the movable arm assembly such that the container tilting arm assembly makes contact with a container and transmits one or more signals to the movable arm assembly to cause the movable arm assembly to extend in a system longitudinal direction such that the container within the movable arm
(Continued)

US 11,420,338 B2

Page 2 assembly is pivoted against the container tilting assembly to tilt the container within the movable arm assembly.

18 Claims, 26 Drawing Sheets

(51) Int. Cl.
*B25J 18/02* (2006.01)
*B66F 9/18* (2006.01)
*B66F 9/20* (2006.01)
*B66F 9/07* (2006.01)
*B66F 9/075* (2006.01)

(52) U.S. Cl.
CPC .......... *B66F 9/07513* (2013.01); *B66F 9/183* (2013.01); *B66F 9/20* (2013.01)

(56) References Cited

U.S. PATENT DOCUMENTS

| | | | |
|---|---|---|---|
| 4,467,893 A * | 8/1984 | Hobson | B66F 9/08 |
| | | | 182/69.1 |
| 4,714,399 A * | 12/1987 | Olson | B66F 9/063 |
| | | | 414/275 |
| 4,940,381 A * | 7/1990 | Rysewyk | B66F 9/06 |
| | | | 187/234 |
| 5,119,894 A * | 6/1992 | Crawford | B65F 1/1484 |
| | | | 177/139 |
| 5,366,339 A * | 11/1994 | Gould | B66F 9/187 |
| | | | 294/90 |
| 5,823,737 A * | 10/1998 | Cook | B66F 9/183 |
| | | | 414/621 |
| 5,837,945 A * | 11/1998 | Cornwell | B65F 3/04 |
| | | | 177/136 |
| 6,113,343 A | 9/2000 | Goldenberg et al. | |
| 6,328,120 B1 | 12/2001 | Haeussler et al. | |
| 6,523,629 B1 | 2/2003 | Buttz et al. | |
| 6,644,426 B1 | 11/2003 | Lame | |
| 6,896,078 B2 | 5/2005 | Wakui | |
| 7,137,464 B2 | 11/2006 | Stabler | |
| 7,152,869 B2 | 12/2006 | Dupay et al. | |
| 7,424,923 B2 | 9/2008 | Yang et al. | |
| 7,426,970 B2 | 9/2008 | Olsen | |
| 7,434,638 B2 | 10/2008 | Tanielian | |
| 7,475,745 B1 | 1/2009 | DeRoos | |
| 7,581,746 B2 | 9/2009 | Abate et al. | |
| 7,645,110 B2 | 1/2010 | Ogawa et al. | |
| 7,721,829 B2 | 5/2010 | Lee et al. | |
| 8,016,334 B2 * | 9/2011 | Garrett | A01D 87/127 |
| | | | 294/119.1 |
| 8,066,298 B2 | 11/2011 | Alguera et al. | |
| 8,083,013 B2 | 12/2011 | Bewley et al. | |
| 8,162,351 B2 | 4/2012 | Lee et al. | |
| 8,307,923 B2 | 11/2012 | Lin et al. | |
| 8,360,178 B2 | 1/2013 | Goldenberg et al. | |
| 8,585,344 B2 * | 11/2013 | Sharp | B66F 9/085 |
| | | | 414/667 |
| 8,708,349 B1 * | 4/2014 | Setzer, Sr. | B25J 9/041 |
| | | | 280/35 |
| 8,753,155 B2 | 6/2014 | Olm et al. | |
| 8,840,128 B2 | 9/2014 | Glazner | |
| 8,840,130 B2 | 9/2014 | Columbia | |
| 8,875,815 B2 | 11/2014 | Terrien et al. | |
| 8,915,692 B2 | 12/2014 | Grinnell et al. | |
| 9,032,831 B2 | 5/2015 | Sutherland | |
| 9,096,281 B1 | 8/2015 | Li et al. | |
| 9,120,636 B2 * | 9/2015 | Cavirani | B65H 19/12 |
| 9,248,875 B2 | 2/2016 | Wolf et al. | |
| 9,248,876 B2 | 2/2016 | Nuchter et al. | |
| 9,283,681 B2 | 3/2016 | Slawinski et al. | |
| 9,296,326 B1 * | 3/2016 | Young | B66F 9/0759 |
| 9,314,921 B2 | 4/2016 | Jacobsen et al. | |
| 9,314,929 B2 | 4/2016 | Hyde et al. | |
| 9,387,892 B2 | 7/2016 | Gettings et al. | |
| 9,387,895 B1 | 7/2016 | Theobald et al. | |
| 9,463,574 B2 | 10/2016 | Purkayastha et al. | |
| 9,475,193 B2 | 10/2016 | Bosscher et al. | |
| 9,527,213 B2 | 12/2016 | Luo et al. | |
| 9,586,636 B1 | 3/2017 | Burmeister et al. | |
| 9,616,948 B2 | 4/2017 | Ben-Tzvi et al. | |
| 9,724,829 B2 | 8/2017 | Hyde et al. | |
| 9,726,268 B1 | 8/2017 | Krasowski et al. | |
| 9,776,333 B2 | 10/2017 | Sakai et al. | |
| 9,808,383 B2 | 11/2017 | Mulhern et al. | |
| 9,902,069 B2 | 2/2018 | Farlow et al. | |
| 11,034,371 B2 * | 6/2021 | Kalinowski | B66F 9/06 |
| 2003/0137268 A1 | 7/2003 | Papanikolopoulos et al. | |
| 2007/0172342 A1 * | 7/2007 | Zhou | B25J 18/025 |
| | | | 414/555 |
| 2008/0302586 A1 | 12/2008 | Yan | |
| 2009/0189132 A1 * | 7/2009 | Meijer | B62B 3/06 |
| | | | 254/2 R |
| 2010/0025964 A1 | 2/2010 | Fisk et al. | |
| 2011/0206489 A1 * | 8/2011 | Ford | B66F 9/07563 |
| | | | 414/639 |
| 2011/0280701 A1 * | 11/2011 | Brighenti | B65H 19/102 |
| | | | 414/621 |
| 2012/0153654 A1 * | 6/2012 | Cole | B66C 9/18 |
| | | | 294/119.1 |
| 2013/0231814 A1 | 9/2013 | Sarokhan et al. | |
| 2014/0023468 A1 * | 1/2014 | Fortin | B65F 1/1452 |
| | | | 414/408 |
| 2014/0379198 A1 | 12/2014 | Amino et al. | |
| 2015/0368080 A1 * | 12/2015 | Dal Dosso | B66F 9/0755 |
| | | | 701/50 |
| 2016/0311479 A1 | 10/2016 | Rudakevych et al. | |
| 2017/0066132 A1 | 3/2017 | Casey et al. | |
| 2017/0280960 A1 | 10/2017 | Ziegler et al. | |
| 2017/0349197 A1 * | 12/2017 | Jonasson | B66F 5/02 |
| 2018/0043530 A1 | 2/2018 | Goldenberg et al. | |
| 2018/0065242 A1 | 3/2018 | Tanaka et al. | |
| 2018/0071909 A1 | 3/2018 | Bewley et al. | |
| 2018/0079632 A1 * | 3/2018 | Plachta | B66F 9/07531 |
| 2019/0048980 A1 * | 2/2019 | Muser | B25J 9/003 |
| 2019/0232992 A1 | 8/2019 | Bondaryk et al. | |
| 2019/0322506 A1 * | 10/2019 | Ourada | B62D 55/0655 |
| 2019/0352146 A1 * | 11/2019 | Pivac | B66C 23/705 |
| 2019/0388926 A1 * | 12/2019 | Raman | B05B 12/1454 |
| 2020/0078956 A1 * | 3/2020 | Olander | C10B 1/04 |
| 2020/0207597 A1 * | 7/2020 | Goncalves | B66F 5/02 |
| 2020/0317486 A1 * | 10/2020 | Puszkiewicz | B66F 9/07559 |
| 2021/0004039 A1 * | 1/2021 | Kawaguchi | G05G 1/06 |
| 2021/0053602 A1 * | 2/2021 | Kalinowski | B66F 9/06 |
| 2021/0170583 A1 * | 6/2021 | Edsinger | B25J 9/162 |

FOREIGN PATENT DOCUMENTS

| | | |
|---|---|---|
| CN | 101712199 B | 7/2012 |
| CN | 102718012 B | 11/2014 |
| CN | 203993868 U | 12/2014 |
| CN | 103568018 B | 9/2015 |
| CN | 105598937 A | 5/2016 |
| CN | 105666474 A | 6/2016 |
| CN | 105269593 B | 8/2016 |
| CN | 205441615 U | 8/2016 |
| CN | 106272478 A | 1/2017 |
| CN | 206296921 U | 7/2017 |
| CN | 107150336 A | 9/2017 |
| CN | 206748412 U | 12/2017 |
| CN | 107618026 A | 1/2018 |
| CN | 207669294 U | 7/2018 |
| CN | 108466278 A | 8/2018 |
| EP | 1290935 B1 | 9/2006 |
| JP | 2885367 B2 | 4/1999 |
| JP | 2001225754 | 8/2001 |
| JP | 2004195592 A | 7/2004 |
| JP | 2009166181 A | 7/2009 |
| JP | 2017164872 A | 9/2017 |
| WO | 2014162605 | 10/2014 |

(56) References Cited

FOREIGN PATENT DOCUMENTS

| WO | 2017088048 | | 6/2017 |
|---|---|---|---|
| WO | 2017191591 | A1 | 11/2017 |

OTHER PUBLICATIONS

"StairKing battery powered stair climbing appliance truck," https://catalog.wescomfg.com/item/all-categories/liftkar-hd-stairking-and-stair-climbing-trucks/230051-1?plpver=1001 Accessed Date: Sep. 19, 2018.

"Toru", Sep. 19, 2018; URL: https://www.magazino.eu/toru-cube/?lang=en.

U.S. Appl. No. 16/560,252, filed Sep. 4, 2019; Inventors: Suhas Malghan et al.

The difference between cartesian, six-Axis, and SCARA robots; Published Date: Dec. 2, 2013; URL: https://www.machinedesign.com/motion-control/difference-between-cartesian-six-axis-and-scararobots.

\* cited by examiner

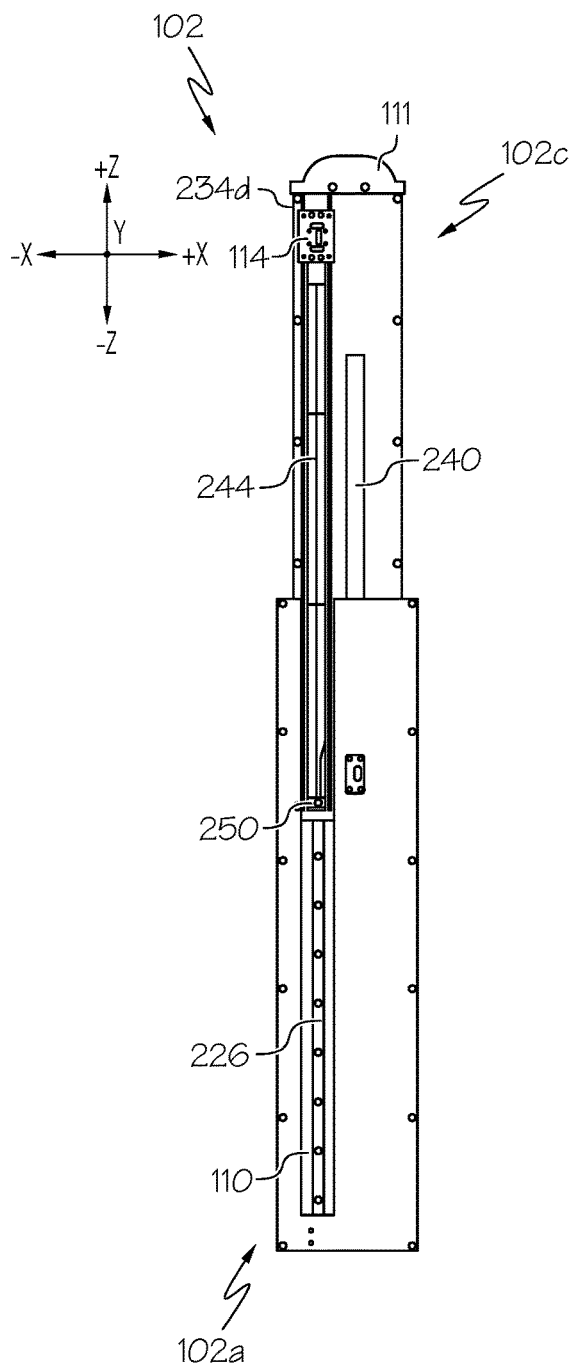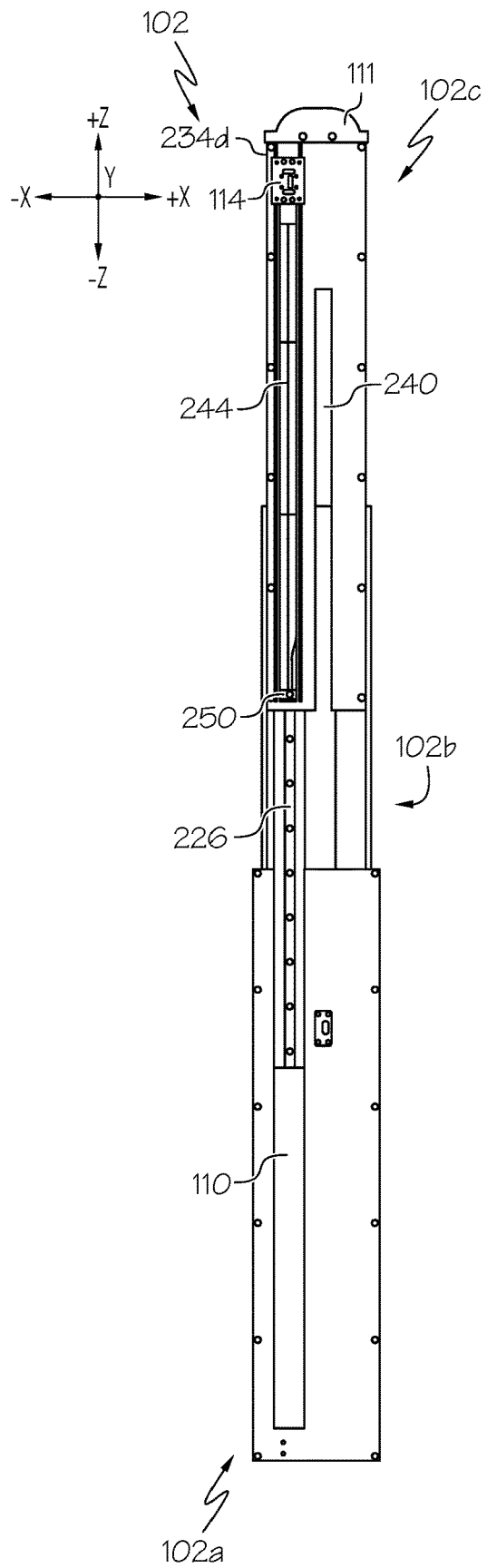
FIG. 6C
FIG. 6D

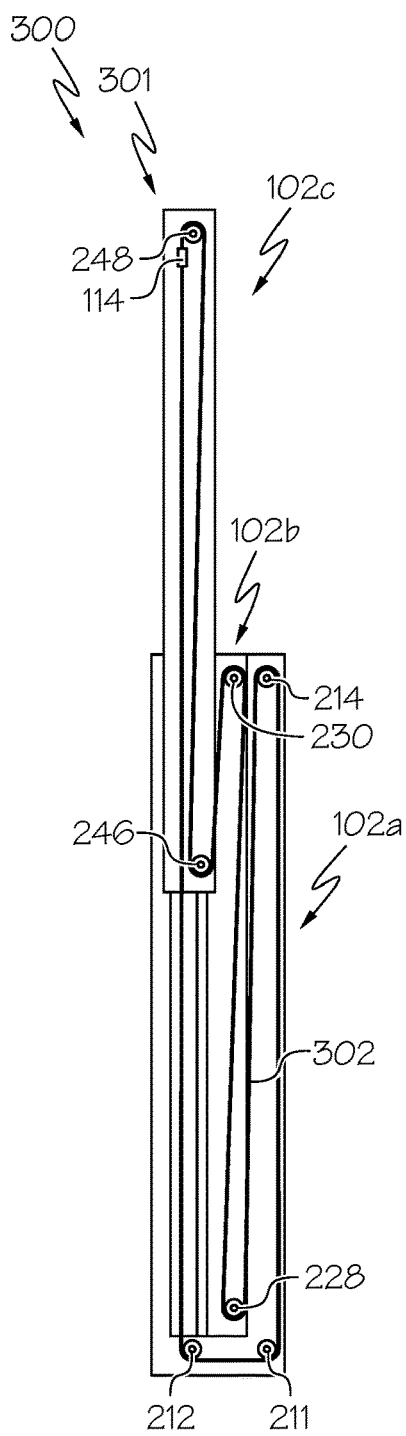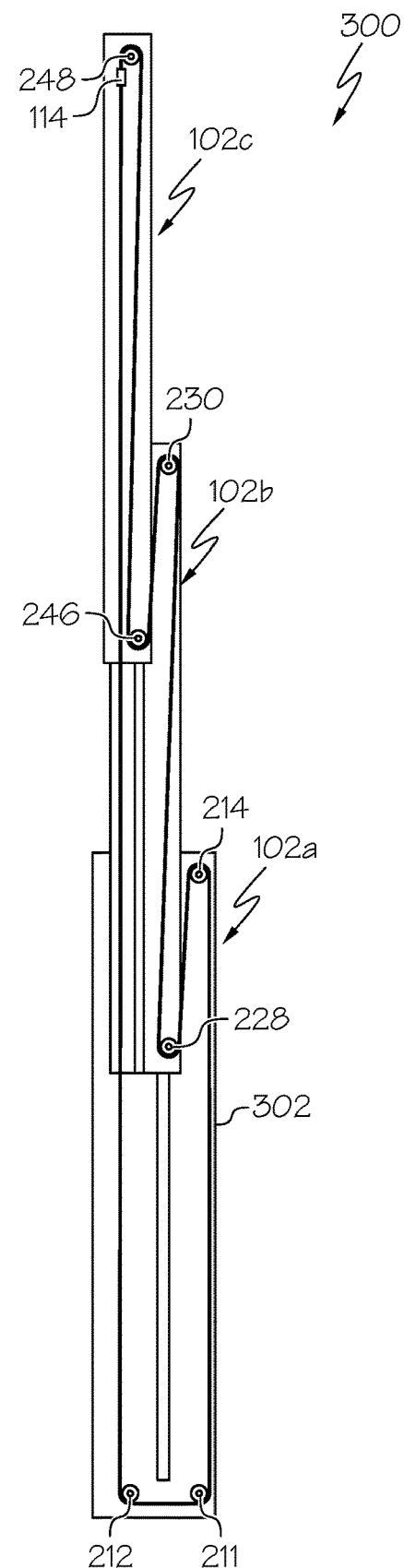
FIG. 7C
FIG. 7D

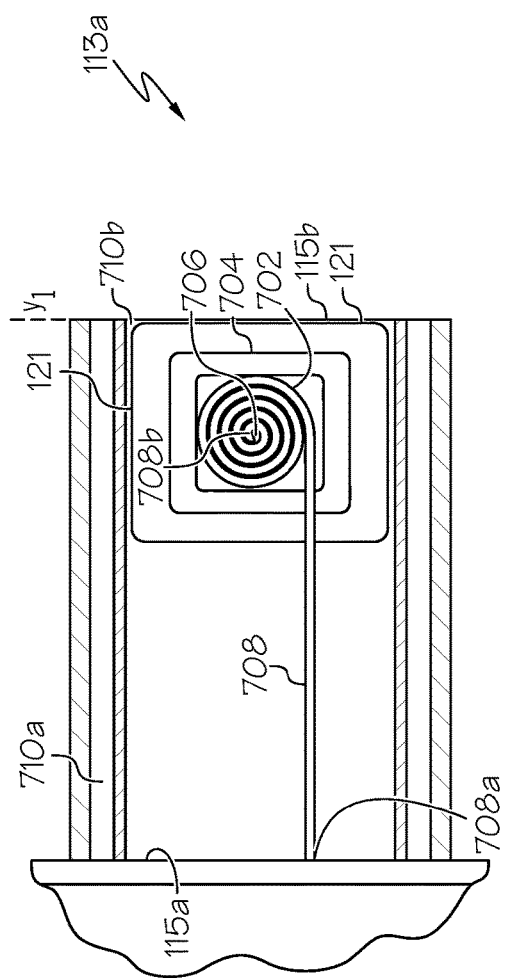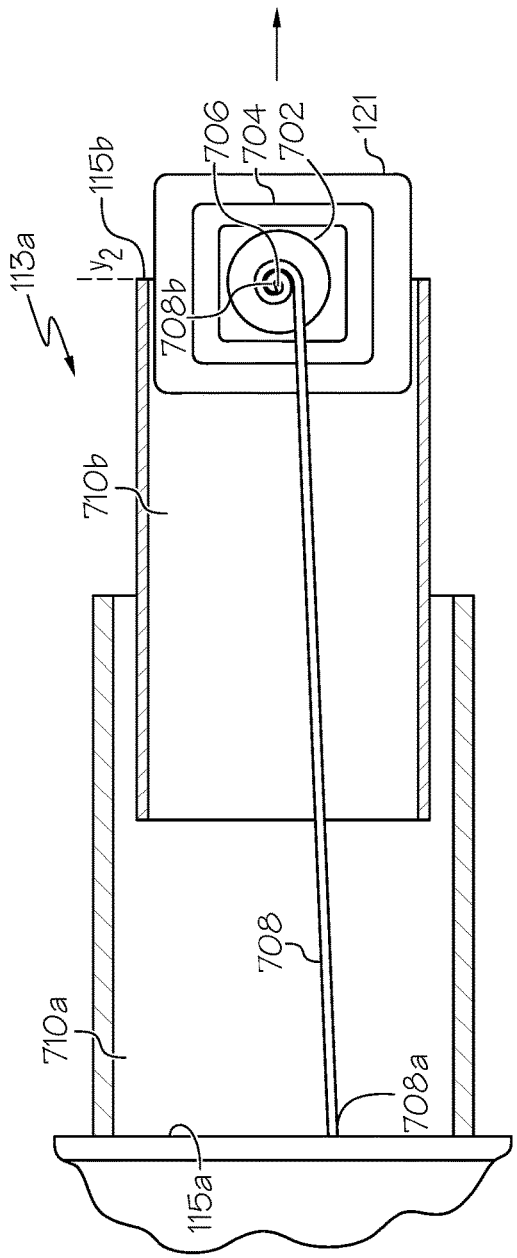

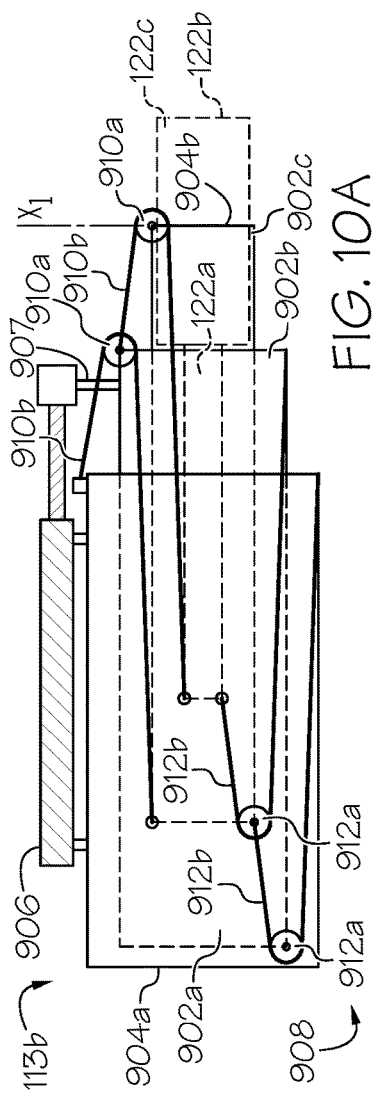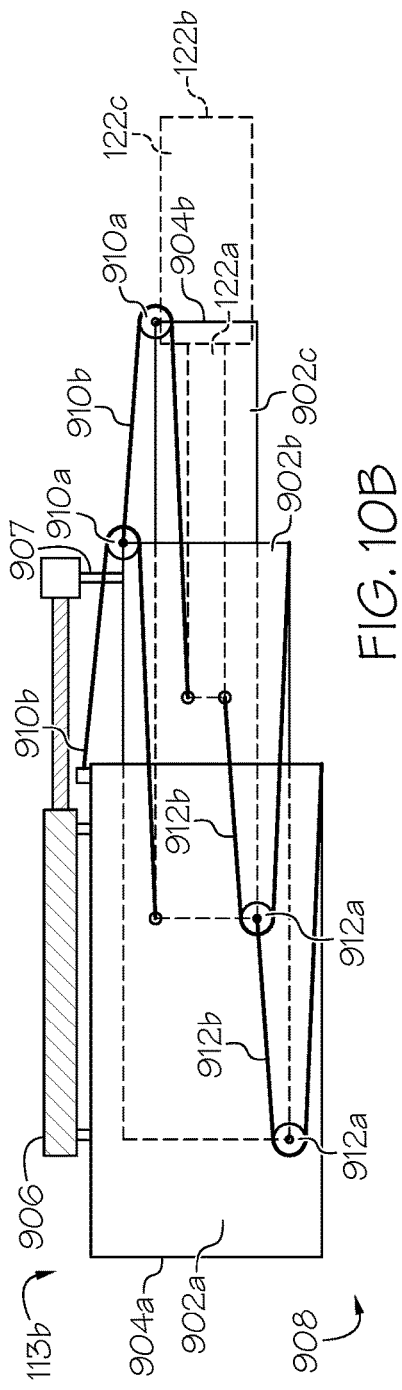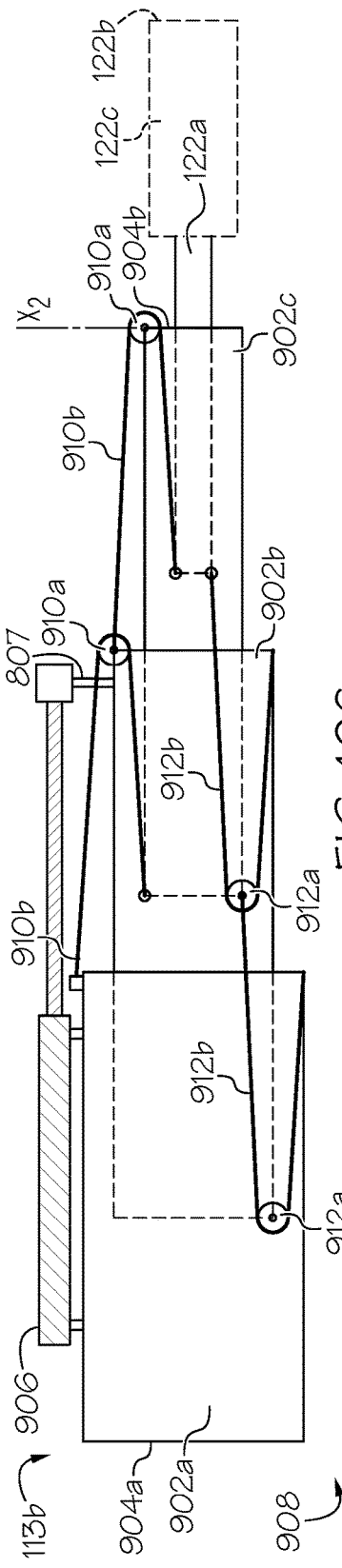

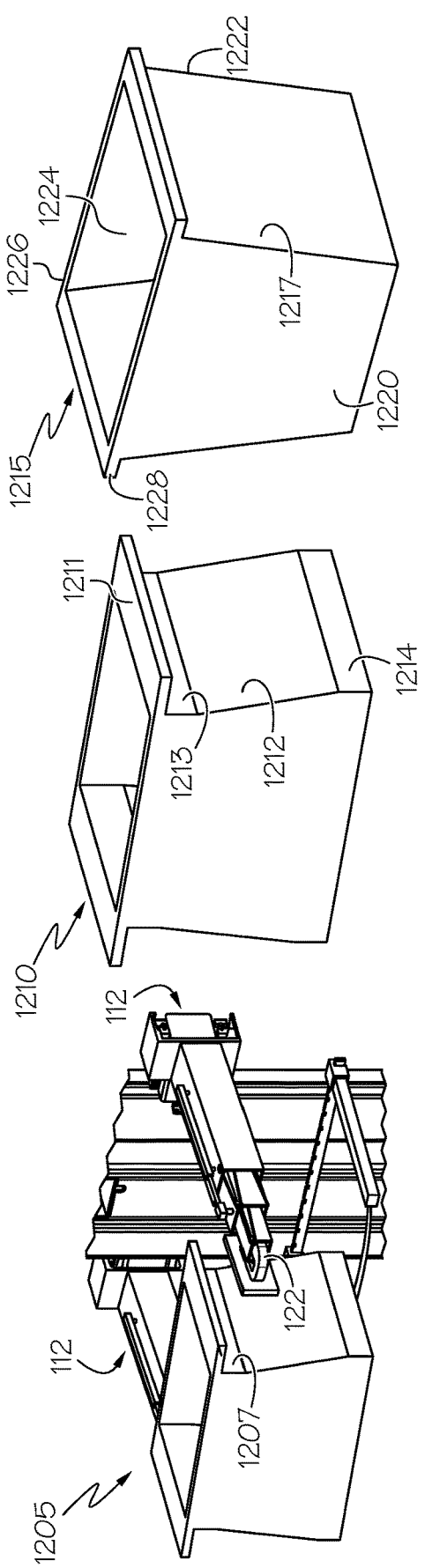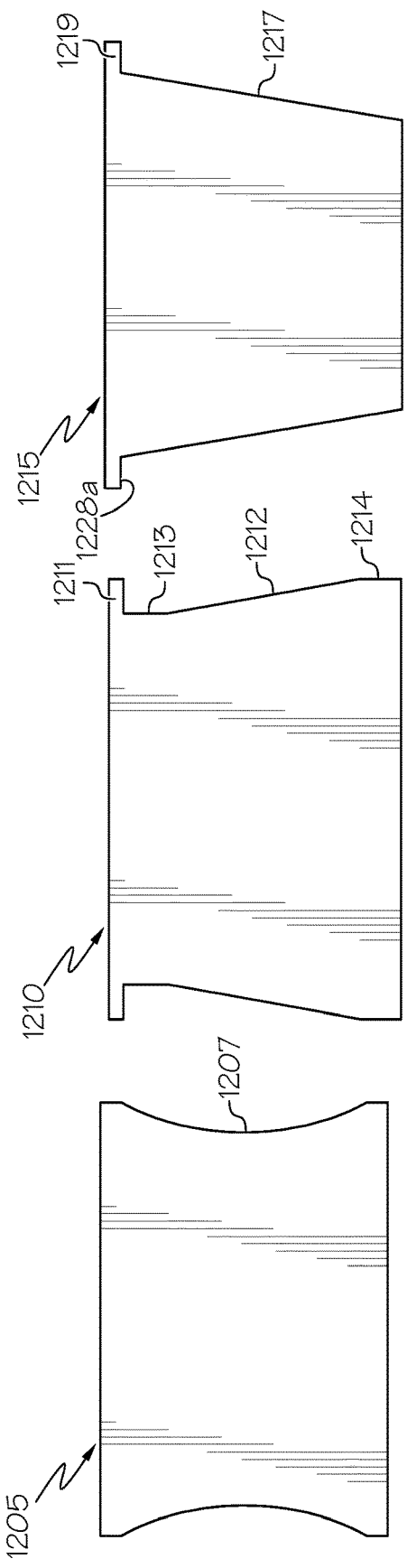

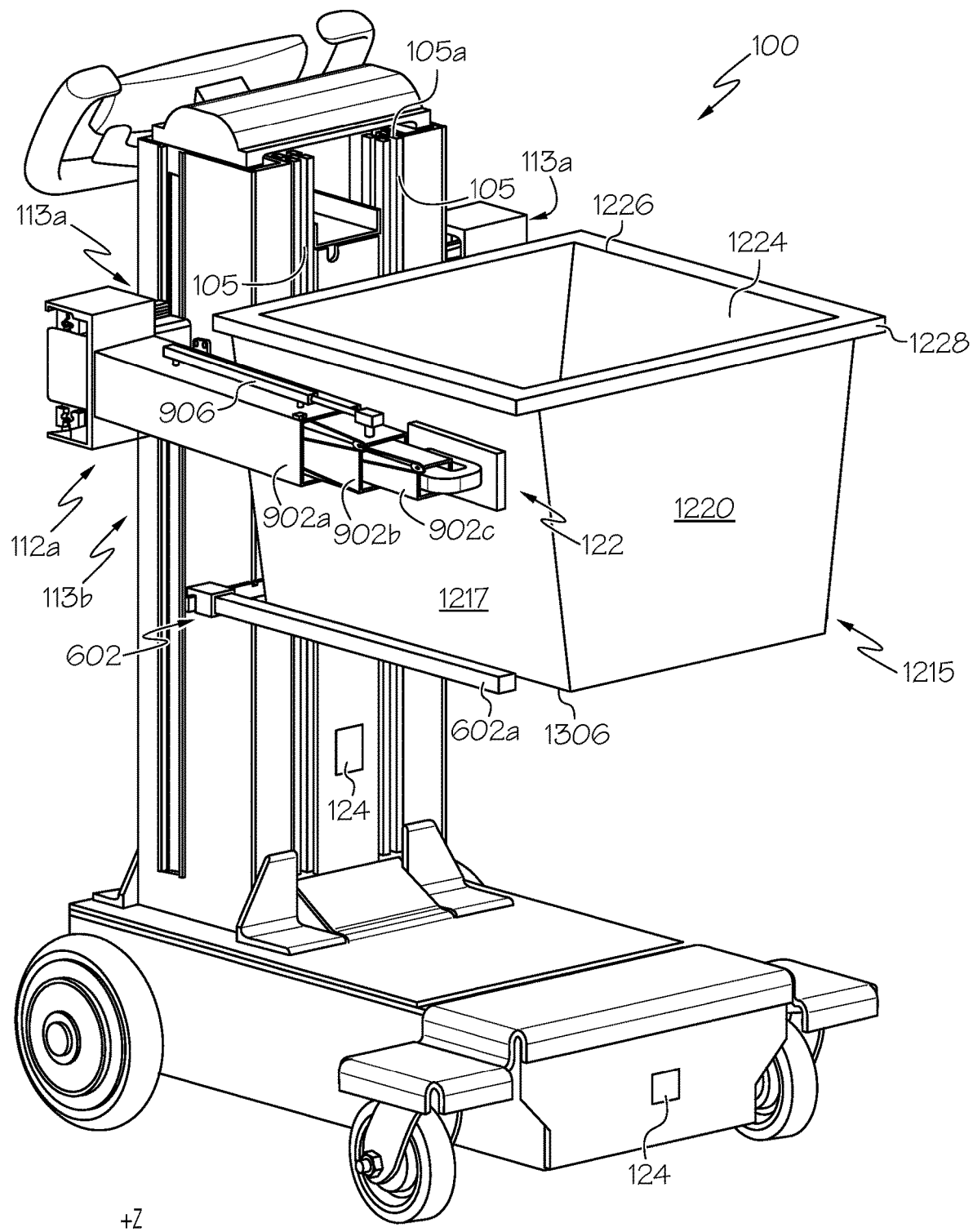
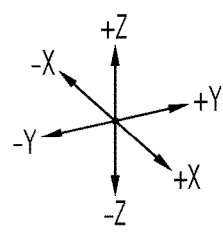
FIG. 13C

ASSISTIVE ROBOT SYSTEMS FOR CONTAINER TILTING

CROSS REFERENCE TO RELATED APPLICATIONS

This utility patent application claims priority from U.S. Provisional Patent Application Ser. No. 62/785,474, filed on Dec. 27, 2018, the entire contents of which is incorporated herein in its entirety.

TECHNICAL FIELD

The present specification generally relates to portable robot systems and, more particularly, to assistive robot systems that grip, raise, transport and tilt containers.

BACKGROUND

Certain people may have difficulty with transporting items, such as large, bulky and/or heavy items. For example, people may struggle with the tasks required to lift a container and tilt the container to empty a plurality of items or articles from the container. That is, people may be required to complete a number of tasks that may be physically taxing, such as lifting a container full of items and/or articles and emptying the items by tilting the container onto a shelf or into a storage bin.

Accordingly, alternative systems for assisting users with lifting, carrying and tilting containers are desired.

SUMMARY

In one embodiment, an assistive robot system is provided. The assistive robot system includes a lifting mechanism, a movable arm assembly coupled to the lifting mechanism, a container tilting arm assembly, a processing device communicatively coupled to the lifting mechanism and the movable arm assembly, and a non-transitory, processor-readable storage medium in communication with the processing device. The non-transitory, processor-readable storage medium comprising one or more programming instructions that, when executed, cause the processing device to transmit a command to the lifting mechanism to cause the lifting mechanism to move the movable arm assembly such that the container tilting arm assembly makes contact with a container gripped by the movable arm assembly, and transmit one or more signals to the movable arm assembly to cause the movable arm assembly to extend in a system longitudinal direction such that the container by the movable arm assembly is pivoted against the container tilting assembly to tilt the container within the movable arm assembly.

In another embodiment, an assistive robot system is provided. The assistive robot system includes a lifting mechanism, a movable arm assembly coupled to the lifting mechanism, a container tilting arm assembly, a sensor device that senses an area surrounding the assistive robot system, and a processing device communicatively coupled to the sensor device, the lifting mechanism, and the movable arm assembly. Data is transmitted from the sensor device to the processing device. The processing device processes the data and determines one or more movement commands, and the processing device transmits one or more signals corresponding to the one or more movement commands to cause the lifting mechanism and the movable arm assembly to move and grip a container, cause the lifting mechanism to move the movable arm assembly such that the container tilting arm assembly contacts the container gripped by the movable arm assembly at a zone of contact, and cause the movable arm assembly to extend in a system longitudinal direction such that the container within the movable arm assembly is pivoted against the container tilting arm assembly to tilt the container within the movable arm assembly.

In yet another embodiment, a method of tilting a container is provided. The method includes determining a position of a container, transmitting a grip command to cause a lifting mechanism and a movable arm assembly to move and grip the container and transmitting a move command to cause the lifting mechanism and the movable arm assembly to move the container to a pre-tilt position adjacent to a container tilting arm assembly. The method continues by transmitting a tilt command to cause the lifting mechanism and the movable arm assembly to pivot the container against the container tilting arm assembly to tilt the container and transmitting a return command to cause the lifting mechanism and the movable arm assembly to move the container back to the pre-tilt position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and example in nature and not intended to limit the subject matter defined by the claims. The following detailed description of the illustrative embodiments can be understood when read in conjunction with the following drawings, wherein like structure is indicated with like reference numerals and in which:

FIG. 6C schematically depicts a side view of the lifting mechanism of FIG. 5 with an extension section raised in the system vertical direction according to one or more embodiments shown and described herein;

FIG. 6D schematically depicts a side view of the lifting mechanism of FIG. 5 with an extension section and a midsection raised in the system vertical direction according to one or more embodiments shown and described herein;

FIG. 7C schematically depicts a side isolated view of the linkage assembly of the lifting mechanism of FIG. 7A with an extension section raised in the system vertical direction according to one or more embodiments shown and described herein;

FIG. 7D schematically depicts a side isolated view of the linkage assembly of the lifting mechanism of FIG. 7A with an extension section and a midsection raised in the system vertical direction according to one or more embodiments shown and described herein;

FIG. 9A schematically depicts an isolated view of the example lateral telescoping assembly of FIG. 8 in a first position according to one or more embodiments shown and described herein;

FIG. 9B schematically depicts an isolated view of the example lateral telescoping assembly of FIG. 9A in a second position according to one or more embodiments shown and described herein;

FIG. 10A schematically depicts an isolated view of the example longitudinal telescoping assembly of FIG. 8 in a first position according to one or more embodiments shown and described herein;

FIG. 10B schematically depicts an isolated view of the example longitudinal telescoping assembly of FIG. 10A in a mid-position according to one or more embodiments shown and described herein;

FIG. 10C schematically depicts an isolated view of the example longitudinal telescoping assembly of FIG. 10A in a second position according to one or more embodiments shown and described herein;

FIG. 12A schematically depicts a perspective view of a first example container according to one or more embodiments shown and described herein;

FIG. 12B schematically depicts a perspective view of a second example container according to one or more embodiments shown and described herein;

FIG. 12C schematically depicts a perspective view of a third example container according to one or more embodiments shown and described herein;

FIG. 12D schematically depicts a front view of the first example container of FIG. 12A according to one or more embodiments shown and described herein;

FIG. 12E schematically depicts a front view of the second example container of FIG. 12B according to one or more embodiments shown and described herein;

FIG. 12F schematically depicts a front view of the third example container of FIG. 12C according to one or more embodiments shown and described herein;

FIG. 13C depicts a perspective view of the illustrative assistive robot system of FIG. 13A with the container at the pre-tilt position according to one or more embodiments shown and described herein;

DETAILED DESCRIPTION

The present disclosure relates generally to robot systems that raise, lower, extend, retract, transport and/or tilt objects, such as containers, thereby providing versatility in the type and transportation of the containers relative to other systems. The robot systems described herein are capable of lifting, lowering, gripping, placing and tilting a plurality of containers. During a tilting operation, a plurality of articles and/or objects within the container may be emptied from the container into a bin or another container and/or onto a floor, a shelf, and/or the like. The robot systems described herein are not limited by this disclosure, and may generally be any robot systems configured to assist humans with everyday tasks, such as robot systems that lift and lower containers, robot systems that tilt containers to place the objects or articles within one container into another, robot systems that transport containers, and/or the like. The robot systems described herein generally include various components that couple/decouple the robot systems from a plurality of varied shaped containers.

Although embodiments herein are described in the context of shopping and delivery robots, embodiments are not limited thereto. For example, the robot systems described herein may be used for various healthcare purposes, manufacturing purposes, and/or the like. Further, the robot systems described herein may be used for indoor and/or outdoor applications. Other uses should generally be understood and are included within the scope of the present disclosure.

As used herein, the term "assistive robot system" refers to any robot system that is capable of raising, lowering, placing, removing, transporting, storing, gripping, releasing, and/or the like a plurality of containers. That is, the assistive robot system described herein are not limited to robot systems that are designed for a particular use, but rather any robot system that has the container transportation capabilities as described herein.

As used herein, the term "container" refers to any object that is capable of being raised, lowered, placed, stored, transported, gripped, released, tilted, and the like, and that is capable of holding at least one article or anther object to be emptied or removed from the container during the tilting process.

Figure 1:
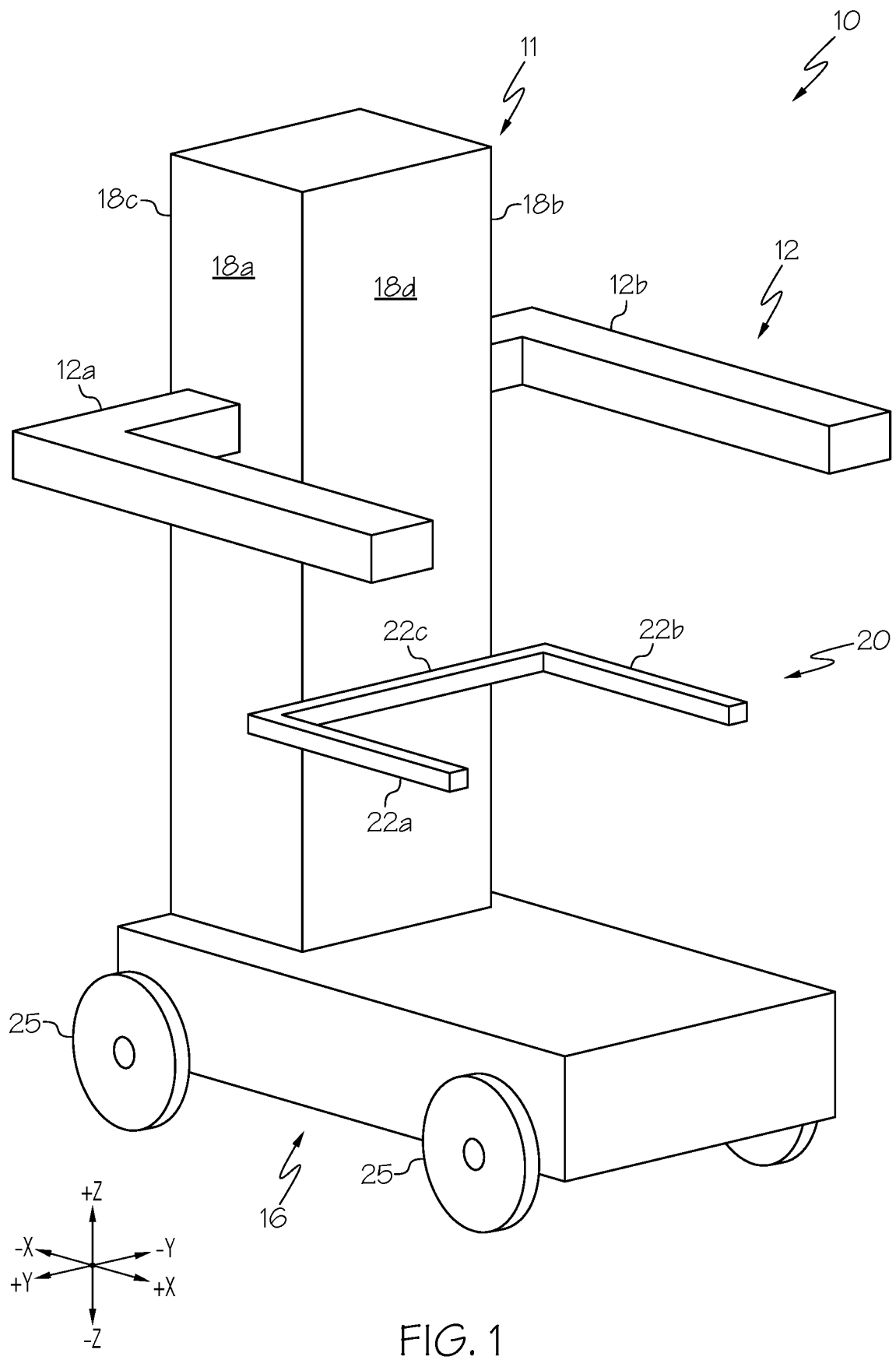
FIG. 1 depicts a perspective view of an illustrative assistive robot system according to one or more embodiments shown and described herein.

As used herein, the term "system longitudinal direction" refers to the forward-rearward direction of the system (i.e., in the +/−X direction depicted in FIG. 1). The term "system lateral direction" refers to the cross-direction (i.e., in the +/−Y direction depicted in FIG. 1), and is transverse to the longitudinal direction. The term "system vertical direction" refers to the upward-downward direction of the system (i.e., in the +/−Z direction depicted in FIG. 1). As used herein, "upper" or "top" is defined as the positive Z direction of the coordinate axis shown in the drawings. "Lower" or "bottom" is defined as the negative Z direction of the coordinate axis shown in the drawings. Further, the terms "inward", "extend", "retract", and "outward" are used to describe the relative positioning of various components of the system and/or their movements.

Referring now to the drawings, FIG. 1 depicts a perspective view of an illustrative assistive robot system 10. The illustrative assistive robot system 10 depicted in FIG. 1 may provide particular use in assisting people with gripping objects, such as a plurality of containers containing a plurality of goods (e.g., groceries from a grocery store) from a first position, such as, without limitation, a floor or a lower position and moving the container to position the container at a second position, such as, without limitation, a storage position on the illustrative assistive robot system 10 or placing the container at an end location (e.g., a shelf raised from the floor), as described in further detail herein. In some embodiments, the illustrative assistive robot system 10 depicted in FIG. 1 may tilt the container such that the plurality of goods within the container are displaced from the container to the second location such as, without limitation, the shelf, another container, and/or the like, as described in further detail herein. However, it should be appreciated that the assistive robot system 10 is not limited to this use and may be used for other purposes without departing from the scope of the present disclosure. For example, the assistive robot system 10 may be used to provide a storage location for the plurality of containers and/or transport the plurality of containers, as described in further detail herein. In another example, the assistive robot system 10 may be used in other fields, such as the warehouse field, the manufacturing field, and/or the like.

The assistive robot system 10 generally includes an example lifting mechanism 11. The example lifting mechanism 11 is supported on a base 16. The lifting mechanism 11 may include a plurality of surfaces, including, but not limited to, a first side 18a, a second side 18b, a rear side 18c, and a front side 18d. The various surfaces of the lifting mechanism 101 may support one or more components of the assistive robot system 10, as described in further detail herein. The assistive robot system 10 further includes an example movable arm assembly 12. The example movable arm assembly 12 includes a pair of arms 12a, 12b extending from the second side 18b and the first side 18a of the lifting mechanism 11 respectively to define a gap. The example movable arm assembly 12 is configured to work in conjunction with the example lifting mechanism 11 to move in coordination such that an object, such as a container, may be gripped, raised, lowered, picked, placed, tilted, and/or the like.

An example container tilting arm assembly 20 is mounted to the front side 18d of the lifting mechanism 11. The example container tilting arm assembly 20 includes a pair of arms 22a, 22b adjacent to the first side 18a and the second side 18b respectively and extending from the front surface 18d of the lifting mechanism 11 to define a gap. Between each arm 22a, 22b is a mounting member 22c that couples each arm 22a, 22b to the front side 18d of the lifting mechanism 11. The example container tilting arm assembly 20 is configured to work in conjunction with the example movable arm assembly 12 and the example lifting mechanism 11 to pivot an object against the container tilting arm assembly 20 such that the object gripped within the movable arm assembly 12 is tilted to empty the contents within the object, as discussed in greater detail herein.

For example, the example lifting mechanism 11 may move in the system vertical direction (i.e., in the +/−Z direction) and the example movable arm assembly 12 may move in the system lateral direction (i.e., in the +/−Y direction) and/or the system longitudinal direction (i.e., in the +/−X direction). As such, the movement of the example movable arm assembly 12 permits for a container to be gripped, released, and the like. In operation, a container may be gripped by the movable arm assembly 12 and positioned between the arms 22a, 22b such that the container is positioned against the example container tilting arm assembly 20. To achieve this position, the lifting mechanism 11, the example movable arm assembly 12, and/or the example container tilting arm assembly 20 may move in a plurality of coordinated movements. Once the container is positioned at the example container tilting arm assembly 20, the movable arm assembly 12 may move in a motion that causes the container to tilt or pivot against the example container tilting arm assembly 20. As a result, the contents within the container are emptied from the container into another container, onto a shelf, a floor, and the like.

The base 16 of the assistive robot system 10 may be coupled to one or more wheels 25. In some embodiments, at least one of the one or more wheels 25 may be coupled to a drive mechanism such as a motor, a transmission, and/or the like such that the wheels 25 can be rotated to move the assistive robot system 10 across a surface, as described in greater detail herein. In some embodiments, the wheels 25 may not be coupled to a drive mechanism, but rather the assistive robot system 10 is moved by receiving an external force (e.g., a user pushes or pulls the assistive robot system 10) to cause the wheels 25 to rotate and the assistive robot system 10 to move. Accordingly, it should be appreciated that the components of the assistive robot system 10 (i.e., the lifting mechanism 11, the movable arm assembly 12, the container tilting arm assembly 20, and the one or more wheels 25) assist users in moving containers, transporting containers, tilting containers, placing containers and/or the contents therein into other containers, on different surfaces, such as shelves, and the like.

Figure 2:
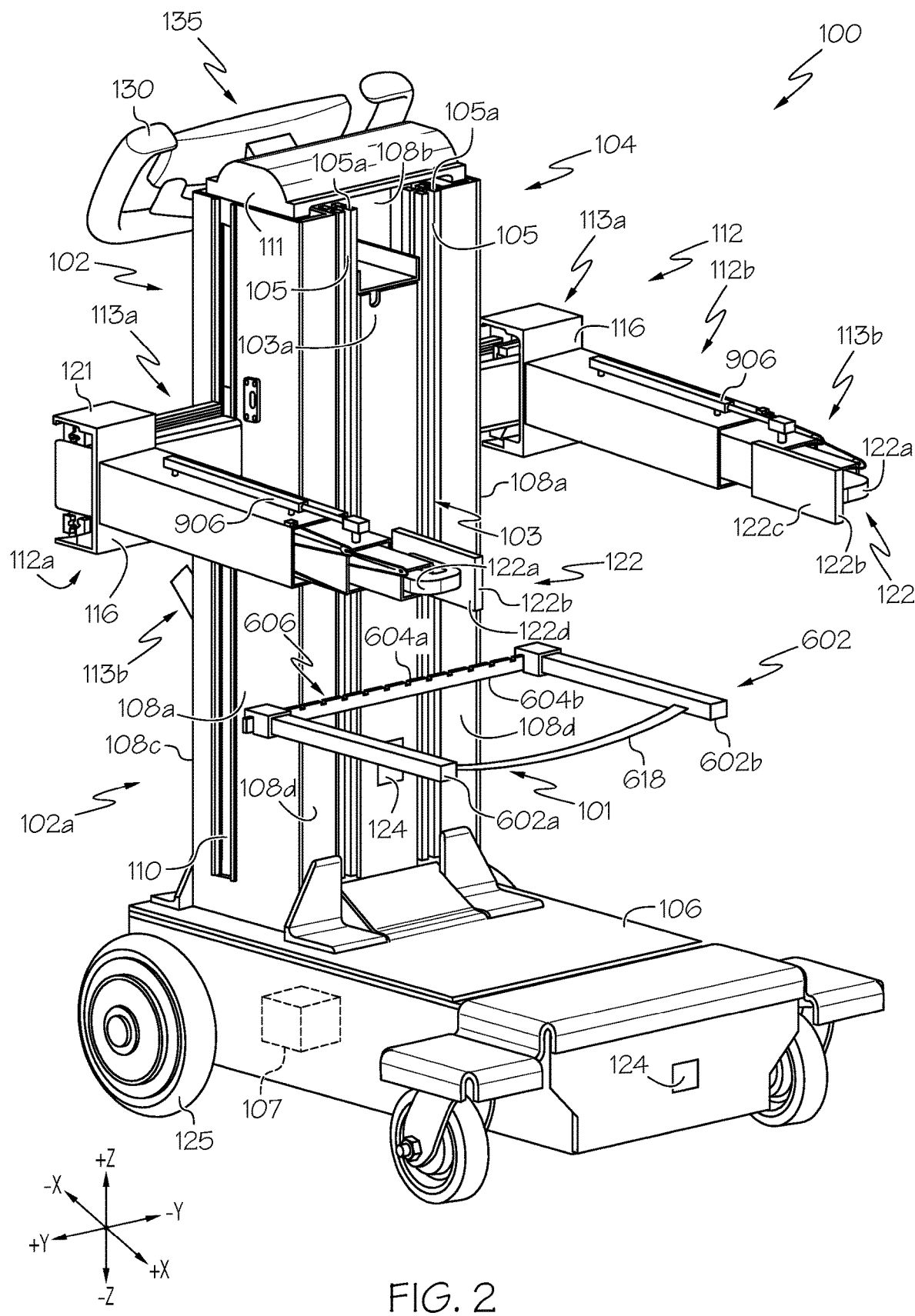
FIG. 2 depicts a perspective view of an illustrative assistive robot system according to one or more embodiments shown and described herein.

Now referring to FIG. 2, another assistive robot system, generally designated 100, according to an embodiment is depicted in greater detail. The illustrative assistive robot system 100 depicted in FIG. 2 may provide particular use in assisting people with moving objects, such as a plurality of containers containing a plurality of goods (e.g., groceries from a grocery store) from a first position, such as, without limitation, a floor or a lower position and moving the container, using the illustrative assistive robot system 100, to position the container at a second position, such as, without limitation, a storage position on the illustrative assistive robot system 100 or placing the container at an end location (e.g., a shelf raised from the floor), as described in further detail herein. In some embodiments, the illustrative assistive robot system 100 depicted in FIG. 2 may tilt the container such that the plurality of goods within the container are displaced from the container to the second location such as, without limitation, the shelf, another container, and/or the like, as described in further detail herein. However, it should be appreciated that the assistive robot system 100 is not limited to this use and may be used for other purposes without departing from the scope of the present disclosure. For example, the assistive robot system 100 may be used to provide a storage location for the plurality of containers and/or transport the plurality of containers, as described in further detail herein. In another example, the assistive robot system 100 may be used in other fields, such as the warehouse field, the manufacturing field, and/or the like.

The assistive robot system 100 generally includes an example lifting mechanism 101. The example lifting mechanism 101 is supported on a base 106. The lifting mechanism 101 may include a plurality of surfaces, including, but not limited to, a first side 108a, a second side 108b, a rear side 108c, and a front side 108d. The various surfaces of the lifting mechanism 101 may support one or more components of the assistive robot system 100, as described in further detail herein. The assistive robot system 100 further includes an example movable arm assembly 112. The example movable arm assembly 112 includes a pair of arms 112a, 112b extending from the second side 108b and the first side 108a of the lifting mechanism 101 respectively to define a gap. The example movable arm assembly 112 is configured to work in conjunction with the example lifting mechanism 101 to move in coordination such that an object, such as a container, may be gripped, raised, lowered, picked, placed, tilted, and/or the like.

The example lifting mechanism 101 includes an example first tower actuator assembly 102 and an example second tower actuator assembly 104 spaced apart from one another defining a gap. In some embodiments, a mast 103 may be disposed in the gap between the first tower actuator assembly 102 and the second tower actuator assembly 104. In embodiments, the mast 103 is stationary and does not translate with the example lifting mechanism 101, as discussed in greater detail herein. In other embodiments, there may be more than two tower actuator assemblies. The lifting mechanism 101 is supported on the base 106. In some embodiments, the first and second tower actuator assemblies 102, 104 may have telescoping sections that extend from a lower section 102a, as explained in greater detail herein. Further, in some embodiments, the first and second tower actuator assemblies 102, 104 and the telescoping sections may be actuated by a single actuator. In other embodiments, the first and second tower actuator assemblies 102, 104 and the telescoping sections may be actuated by multiple actuators. The lower section 102a may include the first side 108a, the second side 108b (FIG. 5), the rear side 108c, and the front side 108d. The various surfaces of the lower section 102a of the first tower actuator assembly 102 may support one or more components of the assistive robot system 100, as described in further detail herein. The first side 108a further includes a lower section slot 110. The lower section slot 110 extends from a position adjacent to the base 106 vertically in the system vertical direction (i.e., in the +/−X direction) a length of the lower section 102a.

It should be appreciated that the example second tower actuator assembly 104 is a mirror image of the first tower actuator assembly 102. As such, the same element numbers are used to describe the identical mirrored components and surfaces of the second tower actuator assembly 104.

In some embodiments, the mast 103 further includes a front surface 103a separating a pair of elongated members 105. One of the pair of elongated members 105 are attached to the second side 108b of the lower section 102a of the first tower actuator assembly 102 and the other one of the pair of elongated members 105 is attached to the second side 108b of the lower section 102a of the second tower actuator assembly 104. However, it should be appreciated that the pair of elongated members are not limited to the illustrated locations and may be positioned anywhere on the first tower actuator assembly 102. The pair of elongated members 105 extend in the system vertical direction (i.e., in the +/−Z direction) the length of the lower section 102a of the first tower actuator assembly 102 and the second tower actuator assembly 104 and terminate at the base 106. In some embodiments, the lifting mechanism 101 includes a cap 111 that extends between the first and second tower assemblies 102, 104 defining a top portion of the lifting mechanism 101. Each one of the pair of elongated members 105 further includes an elongated slot 105a that extends the length of the elongated members 105 in the system vertical direction (i.e., in the +/−Z direction), as discussed in greater detail herein. The elongated slot 105a may be a c-channel, a Unistrut, and/or the like.

Still referring to FIG. 2, the assistive robot system 100 includes the movable arm assembly 112. The movable arm assembly 112 includes a pair of arms 112a, 112b. Each of the pair of arms 112a, 112b may include a lateral telescoping assembly 113a, a longitudinal telescoping assembly 113b, and a housing 121 having an outer surface 116. Each one of the pair of arms 112a, 112b are operably coupled to a connector 114 (FIG. 5) that travels within the lower section slot 110, and in some embodiments, along an extension section rail 244 (FIG. 5), as discussed in greater detail herein. The lateral telescoping assembly 113a is operably coupled to the longitudinal telescoping assembly 113b, and vice versa. In some embodiments, the lateral telescoping assembly 113a may include a plurality of telescoping segments 802a, 802b, (FIGS. 9A-9B) that travel laterally in the system lateral direction (i.e., in the +/−Y direction), as discussed in greater detail herein. Further, in some embodiments, the longitudinal telescoping assembly 113b may also include a plurality of telescoping segments 902a, 902b, 902c (FIGS. 10A-10C) that travel longitudinally in the system longitudinal direction (i.e., in the +/−X direction), as discussed in greater detail herein. In some embodiments, the plurality of telescoping segments 902a, 902b, 902c (FIGS. 10A-10C) of the longitudinal telescoping assembly 113b are driven by a linear actuator 906. In some embodiments, each segment of the plurality of telescoping segments 902a, 902b, 902c (FIGS. 10A-10C) have a different interior area such that each segment nests within the previous telescoping segment, as explained in greater detail below. In other embodiments, each segment of the plurality of telescoping segments 902a, 902b, 902c (FIGS. 10A-10C) are in reserve order to form an inverse pyramid shape. It should be appreciated that in either embodiment, the telescoping segments mimic a gantry crane or other mechanism configured to lift and support heavy weight with limited degrees of freedom to support the weight of the container to be tilted.

In some embodiments, an example gripping assembly 122 is coupled to the longitudinal telescoping assembly 113b. In particular, the example gripping assembly 122 includes an attachment portion 122a and a gripping portion 122b. The attachment portion 122a is configured to attach and move the gripping portion 122b such that the example gripping assembly 122 is configured to extend and retract with the plurality of telescoping segments 902a, 902b, 902c (FIGS. 10A-10C) of the longitudinal telescoping assembly 113b extend and retract, as discussed in greater detail herein. The gripping portion 122b of the example gripping assembly 122 may have an inside surface 122a and an outside surface 122b. The inside surface 122c may be configured to engage with the container while the outside surface 122d is configured to be coupled to the attachment portion 122a. The inside surface 122c of the gripping portion 122b may be configured to grip and/or retain a plurality of containers. Each container may have a different shape, as discussed in greater detail herein. As such, in some embodiments, the inside surface 122c may be a pad that is contoured, textured, and/or a combination thereof, as discussed in greater detail herein. In other embodiments, the gripping portion may be a hook, a clasp, and/or the like. The attachment portion 122a may be a U-shape or a hook shape that positons the gripping portion 122b along an inner surface of the longitudinal telescoping assembly 113b such that contact is made with the container between the arms 112a, 112b of the movable arm assembly 112, as discussed in greater detail herein.

Still referring to FIG. 2, the assistive robot system 100 further includes an example container tilting arm assembly 602. The example container tilting arm assembly 602 includes a pair of arms 602a, 602b that are adjustably coupled to a mounting member 602c. The mounting member 602c is mounted to the elongated members 105 of the lifting mechanism 101. The mounting member 602c may be an elongated member such as flat stock. In some embodiments, the mounting member 602c includes an upper edge 604a and a lower edge 604b, the upper edge 604a having a plurality of notches 606. The notches 606 are configured to engage with each arm 602a, 602b of the example container tilting arm assembly 602. As such, the notches 606 provide a plurality of predetermined positons that space apart each arm 602a, 602b of the example container tilting arm assembly 602 such that a gap is defined between each arm 602a, 602b.

The pair of arms 602a, 602b are adjacent to the first side 108a and the second side 108b respectively and extend from the front surface 108d of the lifting mechanism 101 in the system longitudinal direction (i.e., in the +/−X direction). The example container tilting arm assembly 602 is configured to work in conjunction with the example movable arm assembly 112 and the example lifting mechanism 101 to pivot a container having a plurality of articles therein against the container tilting arm assembly 602 such that the container is tilted to empty the plurality of articles within the container, as discussed in greater detail herein.

In some embodiments, each arm 602a, 602b of the example container tilting arm assembly 602 are adjusted manually along the mounting member 602c in the system lateral direction (i.e., in the +/−Y direction) to match the size of the container to be tipped. In other embodiments, each arm 602a, 602b of the example container tilting arm assembly 602 is adjusted along the mounting member 602c by a motor, an actuator, a servo, and/or the like.

Still referring to FIG. 2, the base 106 of the assistive robot system 100 may be coupled to one or more mobility components, such as, for example, one or more wheels 125 rotatably coupled to the base 106. In some embodiments, at least one of the one or more wheels 125 may be coupled to a drive mechanism 107 such as a motor, a transmission, and/or the like such that the wheels 125 can be rotated to move the assistive robot system 100 across a surface, as described in greater detail herein. In some embodiments, the wheels 125 may not be coupled to a drive mechanism, but rather the assistive robot system 100 is moved by receiving an external force (e.g., a user pushes or pulls the assistive robot system 100) to cause the wheels 125 to rotate and the assistive robot system 100 to move. Further, it should be appreciated that the drive mechanism 107 may include power management components, such as, a battery, a charging unit, and the like. In some embodiments, at least one of the wheels 125 may be movable around a plurality of axes such that the wheel is steerable. The wheels 125 are otherwise not limited by the present disclosure and may contain any other features. For example, the wheels 125 may be adapted for moving over varied and/or unpaved terrain, adapted for lifting the assistive robot system 100 up a single step (such as a curb or the like), adapted to move in inclement weather conditions, and/or the like. Systems and methods for traversing a step or a curb are described in U.S. patent application Ser. No. 16/560,252, which is hereby incorporated by reference in its entirety. While FIG. 2 depicts the wheels 125 as the mobility components (also in FIG. 1 as the wheels 25), it should be appreciated that the present disclosure is not limited to such. For example, the mobility components may be skis, rotors, tracks, and/or the like that provide the assistive robot system 100 with an ability to move.

Still referring to FIG. 2, the assistive robot system 100 (as well as the assistive robot system 10 shown by FIG. 1) may include various components that allow the assistive robot system 100 to be manually pushed/pulled around a space, be semi-automatically driven by a user, and/or have autonomous movement capabilities that allow the assistive robot system 100 to move around a space with little or no input from a user. That is, the assistive robot system 100 may include components that allow for operation in a full manual mode, a manual assist mode, a semi-autonomous mode, and/or an autonomous mode, as described in greater detail herein.

For example, in some embodiments, the assistive robot system 100 may include one or more handles 130 that are positioned and arranged for a user to grasp. That is, a user may manually push/pull the assistive robot system 100, turn the assistive robot system 100, and/or the like by applying a force to at least the one or more handles 130. As such, the one or more handles 130 may generally be located anywhere on the assistive robot system 100, particularly locations that are accessible by a user. For example, the one or more handles 130 may be located at elbow level or below for an average human such that the one or more handles 130 can be comfortably grasped by the user. In some embodiments, the one or more handles 130 may be coupled to the rear side of the lifting mechanism 101. In other embodiments, the one or more handles 130 may be coupled to a rear side of the mast 103, as depicted in FIGS. 2, 4C, 4E and 8. In other embodiments, the one or more handles 130 may be coupled to other locations not depicted, such as, for example, coupled to a side of the lifting mechanism 101. In some embodiments, the one or more handles 130 may be integrated with one or more portions of the assistive robot system 100 at or near the base 106 such that a user may use his or her feet to contact the one or more handles 130 to move the assistive robot system 100. In some embodiments, the one or more handles 130 may have one or more user interface hardware components (not shown) integrated therein or coupled thereto, such as touchscreens, buttons, switches, joysticks, and/or the like that allow a user to navigate a user interface, to provide inputs for moving the assistive robot system 100 (e.g., to automatically or semi-automatically drive the assistive robot system 100), to lock one or more portions of the assistive robot system 100, to provide commands that allow the assistive robot system 100 to autonomously move, and/or the like. In some embodiments, the one or more user interface hardware components may be able to decouple from the one or more handles 130 such that a user may carry the one or more user interface hardware components separately from the assistive robot system 100 and use the one or more user interface hardware components to remotely control one or more aspects of the assistive robot system 100 and/or components thereof.

The assistive robot system 100 may include a sensor device 124 that includes one or more sensors positioned or mounted thereto, as shown in FIG. 2. However, the position is of the one or more sensors Is not limited to the positions as illustrated in FIG. 2. The sensor device 124 may include various components for assisting a user of the assistive robot system 100 in lifting, carrying, storing, placing and/or tilting a container such that the plurality of objects within the container are displaced from the container onto a surface, such as a shelf, another container, and/or the like. Further, the sensor device 124 may assist in the semi-autonomous movement of the assistive robot system 100, assisted movement of the assistive robot system 100 in a manual assist mode, and/or the like.

In embodiments, the one or more sensors of the sensor device 124 are positioned on the assistive robot system 100 and configured to identify the position of the container tilting arm assembly 602, whether a second container is stored on the assistive robot system 100, and the like. It should be appreciated that the assistive robot system 100 may change the lifting, carrying, storing, placing, extending, retracting and/or tilting of the container when a second container is stored on the assistive robot system 100 and/or based on the positioning of the container tilting arm assembly 602. Further, in some embodiments, the plurality of sensors of the sensor device 124 are positioned on the assistive robot system 100 and configured to identify whether a plurality of articles within the container have been emptied from the container during the tilting. It should be appreciated that if articles remain in the container, the assistive robot system 100 may repeat the tilting of the container, as discussed in greater detail herein. In embodiments, the plurality of sensors of the sensor device 124 are positioned on the assistive robot system 100 and configured to identify whether the container tilting arm assembly 602 is in a proper position to make contact with the container. In these embodiments, the assistive robot system 100 may change the position of the container tilting arm assembly 602, change the position of the container within the movable arm assembly 112, prompt a user to change the position of the container tilting arm assembly 602, and the like, as discussed in greater detail herein.

The various components of the sensor device 124 are not limited by the present disclosure, and may generally be any components that provide the functionality described herein. For example, the sensor device 124 may include one or more sensing devices, including cameras, optical sensors, ranging systems, time of flight (TOF) sensors, proximity sensing systems, laser emitting devices, and/or the like. Such systems should generally be understood and are not described further herein. It should be understood that other embodiments do not include sensors or a sensor device 124.

Now referring to FIGS. 3A-3D, various embodiments of the pair of arms 602a, 602b of the example container tilting arm assembly 602 will be described. Each arm 602a, 602b includes an inner surface 610 and an opposite outer surface 612. A plurality of container tilting devices may extend from at least one of the inner surface 610 of at least one of the pair of arms 602a, 602b. In some embodiments, the container tilting device may extend from each inner surface 610 of the pair of arms 602a, 602b, as discussed in greater detail herein. In other embodiments, the container tilting device may extend between each inner surface 610 of the pair of arms 602a, 602b, as discussed in greater detail herein.

Figure 3A:
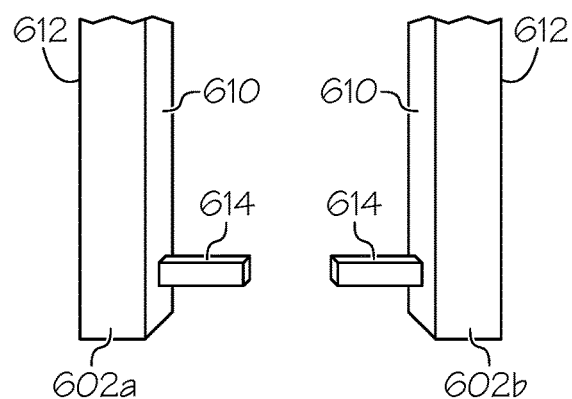
FIG. 3A depicts a top view of an example container tilting arm assembly of FIG. 2 having a pair of square pegs according to one or more embodiments shown and described herein.
Figure 13A:
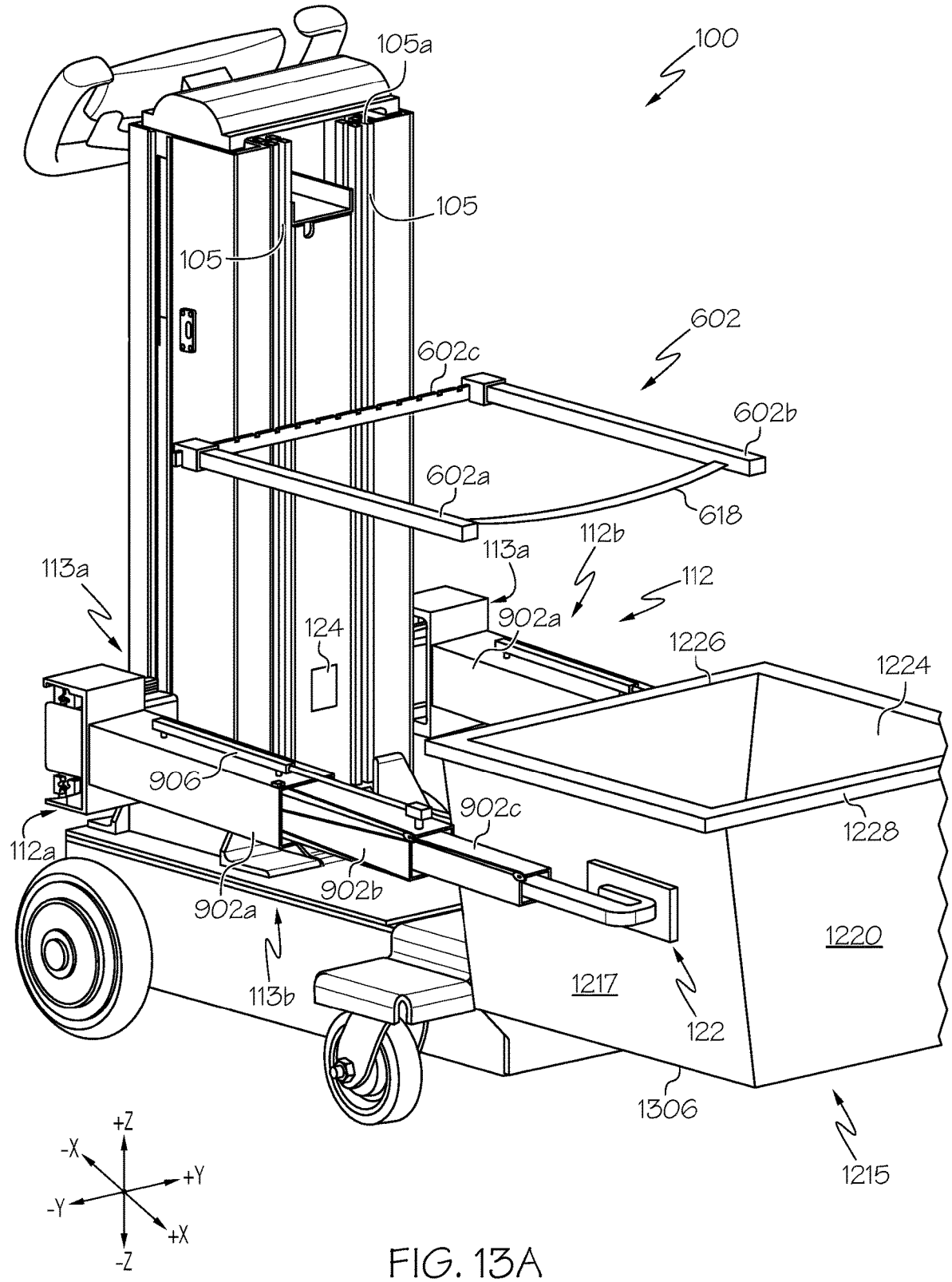
FIG. 13A depicts a perspective view of the illustrative assistive robot system of FIG. 2 gripping a container according to one or more embodiments shown and described herein.
Figure 13B:
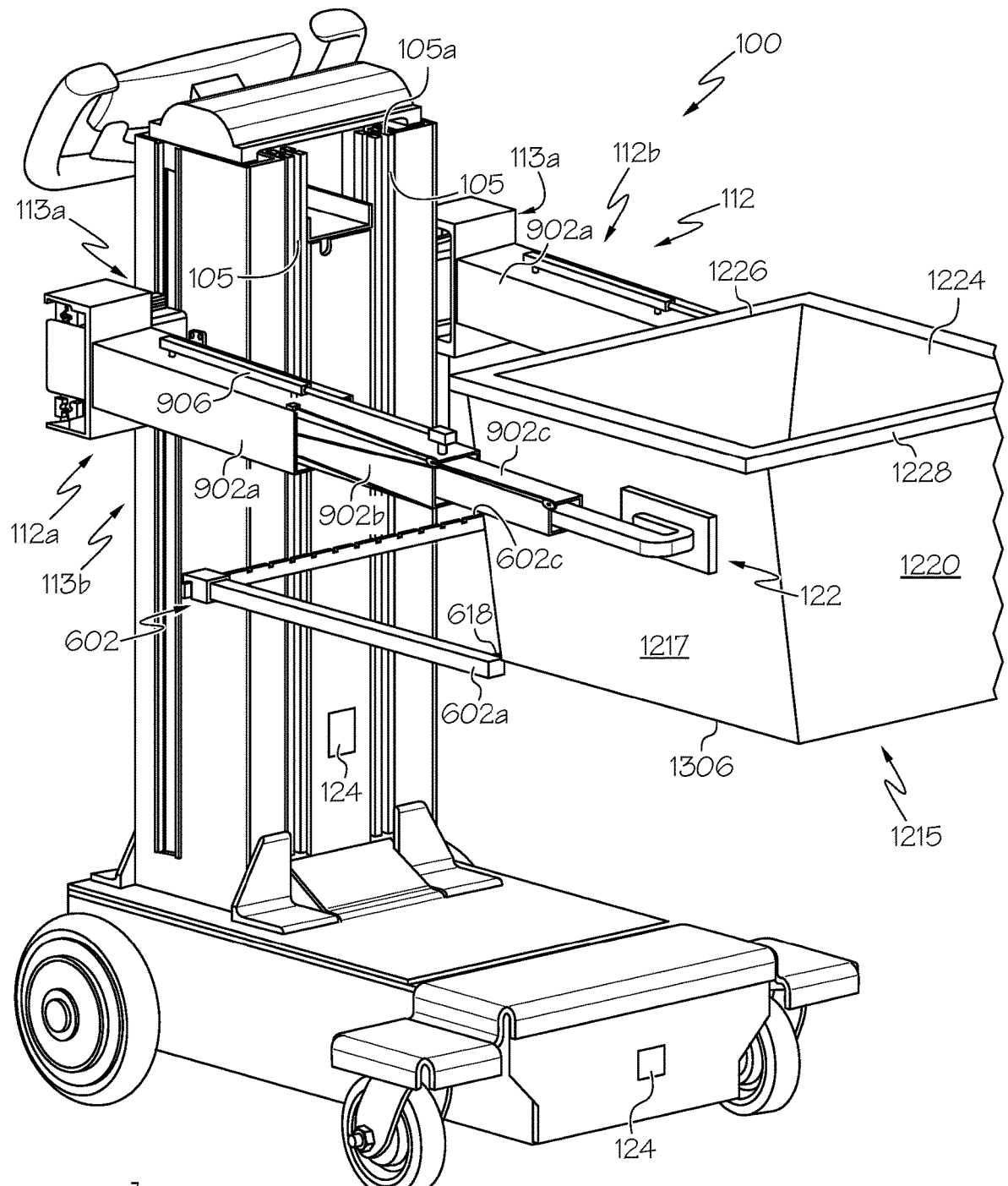
FIG. 13B depicts a perspective view of the illustrative assistive robot system of FIG. 13A raising the container in the system vertical direction according to one or more embodiments shown and described herein.
Figure 13D:
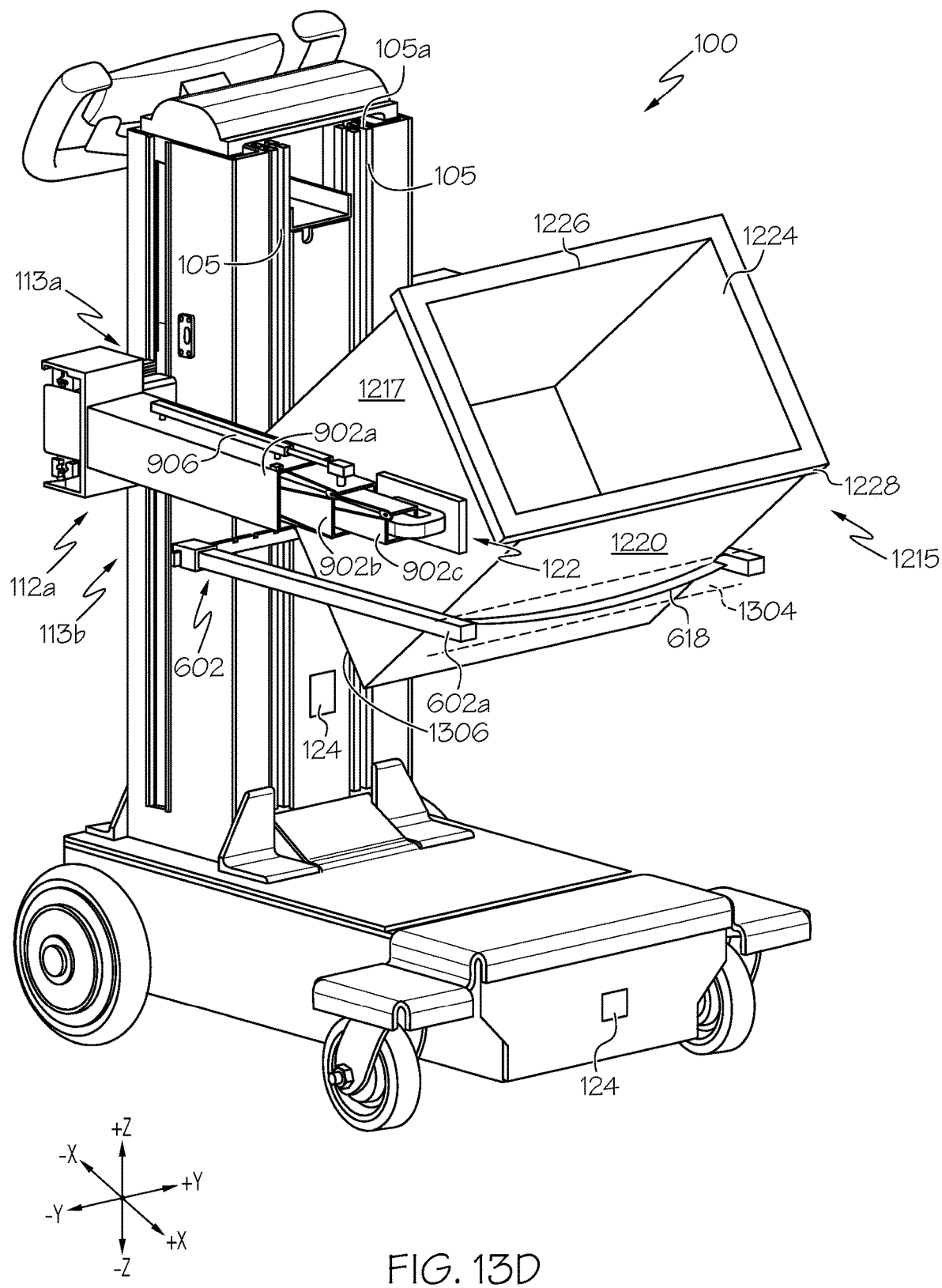
FIG. 13D depicts a perspective view of the illustrative assistive robot system of FIG. 13A tilting the container where a zone of contact extends through a front surface of the container according to one or more embodiments shown and described herein.
Figure 13E:
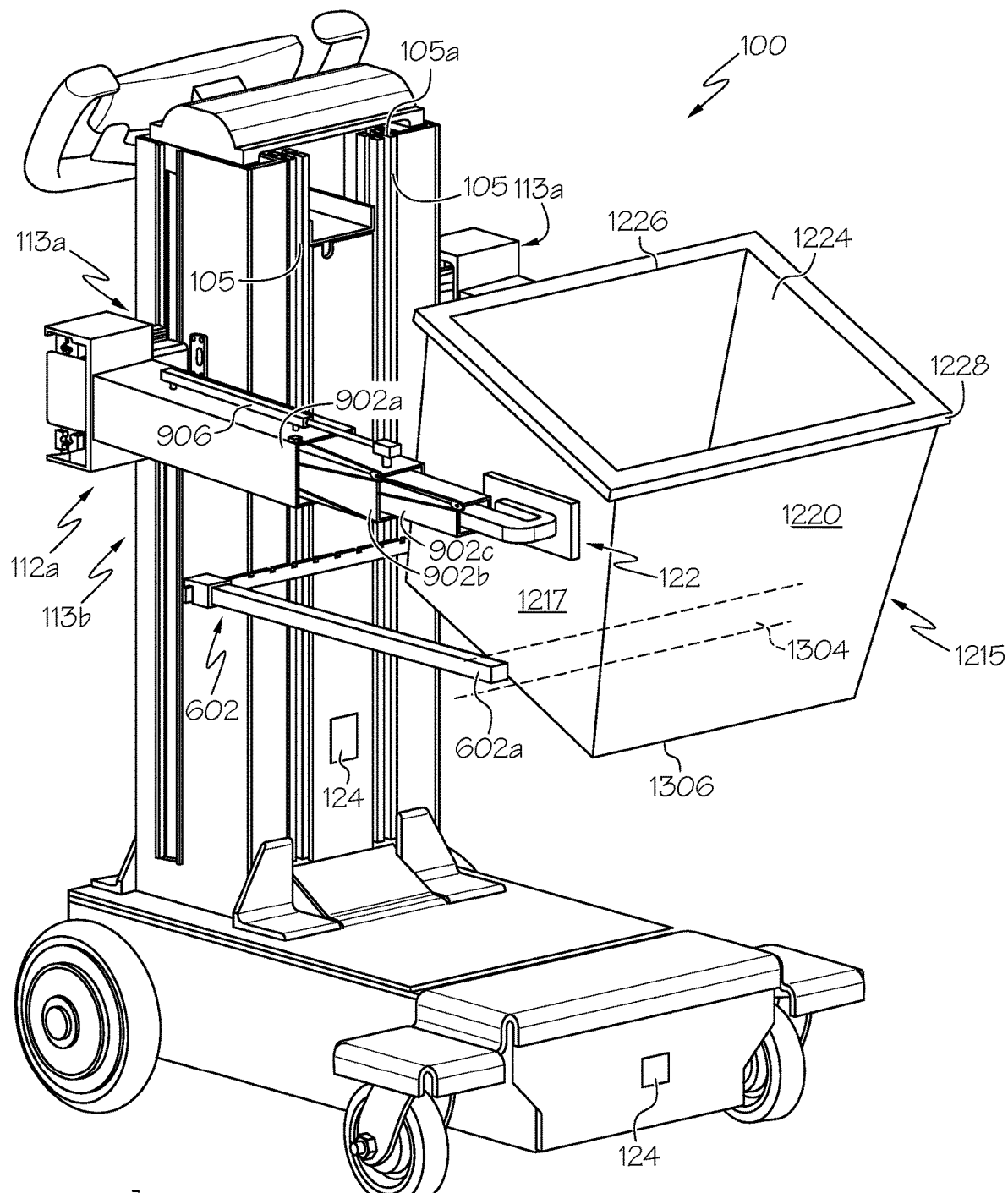
FIG. 13E depicts a perspective view of the illustrative assistive robot system of FIG. 13A tilting the container where a zone of contact extends through a bottom surface of the container according to one or more embodiments shown and described herein.

With reference to FIG. 3A, a pair of square pegs 614 extend from each inner surface 610 of the pair of arms 602a, 602b in a direction traverse to the pair of arms 602a, 602b such that the pair of square pegs 614 contacts the object within a zone of contact 1304 (FIGS. 13D-13E). That is, the pair of square pegs 614 extend laterally (i.e. in the +/−Y direction) from the inner surface 610 of the pair of arms 602a, 602b. In embodiments, the pair of square pegs 614 are aligned with one another with respect to the inner surface 610 of the pair of arms 602a, 602b. In other embodiments, the pair of square pegs 614 are offset. Further, in embodiments, the pair of square pegs 614 are symmetrical in shape. In other embodiments, the pair of square pegs 314 are asymmetrical. Further, in embodiments, the pair of square pegs 614 extend at least partially into the gap defined by the pair of arms 602a, 602b to define a second gap between each one of the pair of square pegs 614, as illustrated. It should be appreciated that the second gap, similar to the gap defined by the pair of arms 602a, 602b, may change based on the adjustment of the pair of arms 602a, 602b, as discussed in greater detail herein. The pair of square pegs 614 may be mounted to the pair of arms 602a, 602b by a fastener such as bolts and nuts, rivets, screws, and the like, and/or may be welded. In some embodiments, the pair of square pegs 614 may be integrally formed from each one of the pair of arms 602a, 602b.

Figure 3B:
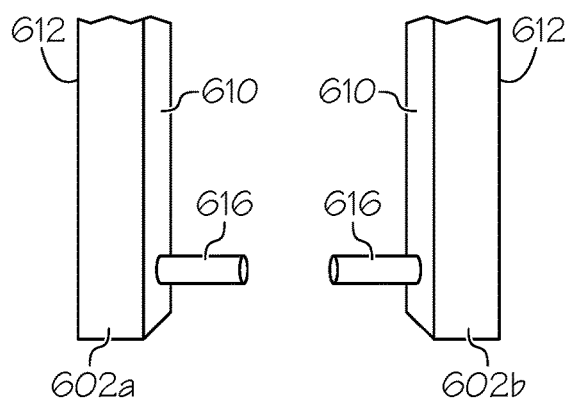
FIG. 3B depicts a top view of an example container tilting arm assembly of FIG. 2 having a pair of cylindrical pegs according to one or more embodiments shown and described herein.

With reference to FIG. 3B, a pair of cylindrical pegs 616 extend from each inner surface 610 of the pair of arms 602a, 602b in a direction traverse to the pair of arms 602a, 602b such that the pair of cylindrical pegs 616 contacts the object within the zone of contact 1304 (FIGS. 13D-13E). That is, the pair of cylindrical pegs 616 extend laterally (i.e. in the +/−Y direction) from the inner surface 610 of the pair of arms 602a, 602b. In embodiments, the pair of cylindrical pegs 616 are aligned with one another with respect to the inner surface 610 of the pair of arms 602a, 602b. In other embodiments, the pair of cylindrical pegs 616 are offset. Further, in embodiments, the pair of cylindrical pegs 616 are symmetrical in shape. In other embodiments, the pair of cylindrical pegs 616 are asymmetrical. Further, in embodiments, the pair of cylindrical pegs 616 extend at least partially into the gap defined by the pair of arms 602a, 602b to define a second gap between each one of the pair of cylindrical pegs 616 as illustrated. It should be appreciated that the second gap, similar to the gap defined by the pair of arms 602a, 602b, may change based on the adjustment of the pair of arms 602a, 602b, as discussed in greater detail herein. The pair of cylindrical pegs 616 may be mounted to the pair of arms 602a, 602b by a fastener such as bolts and nuts, rivets, screws, and the like, and/or may be welded. In some embodiments, the pair of cylindrical pegs 616 may be integrally formed from each one of the pair of arms 602a, 602b.

Figure 3C:
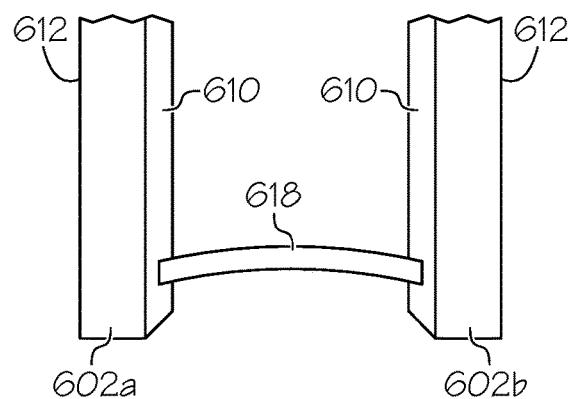
FIG. 3C depicts a top view of an example container tilting arm assembly of FIG. 2 having a resilient member according to one or more embodiments shown and described herein.

With reference to FIG. 3C, a resilient member 618 extends between each inner surface 610 of the pair of arms 602a, 602b in a direction traverse to the pair of arms 602a, 602b. That is, the resilient member 618 extends laterally (i.e. in the +/−Y direction) from the inner surface 610 of the pair of arms 602a, 602b. In some embodiments, the resilient member 618 is a belt. In other embodiments, the resilient member 618 is a strap, a string, an elastic member, and the like. In embodiments, the resilient member 618 extends between the inner surface 610 in a uniform manner such that each end in connect with the inner surface 610 is aligned with one another. In other embodiments, each end of the resilient member 618 is offset. Further, in embodiments, the resilient member 618 is symmetrical with respect to width and thickness. In other embodiments, the resilient member 618 is asymmetrical. Further, the resilient member 618 extends through the gap defined by the pair of arms 602a, 602b. It should be appreciated that the amount of tension or the length of the resilient member 618 sagging into the gap may change based on the adjustment of the pair of arms 602a, 602b, as discussed in greater detail herein. The resilient member 618 is mounted to the pair of arms 602a, 602b by a fastener such as bolts and nuts, rivets, screws, and the like, and/or may be welded.

Figure 3D:
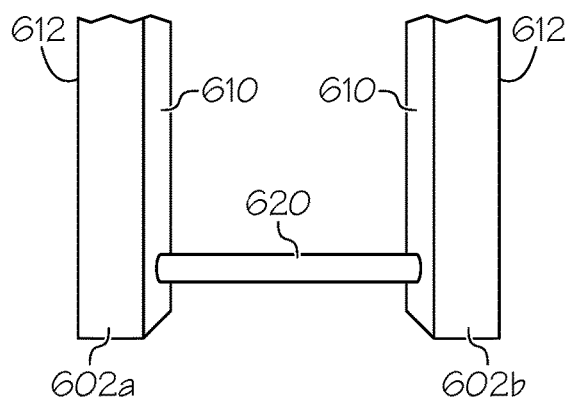
FIG. 3D depicts a top view of an example container tilting arm assembly of FIG. 2 having a rigid member according to one or more embodiments shown and described herein.

With reference to FIG. 3D, an elongated member 620 extends between each inner surface 610 of the pair of arms 602a, 602b in a direction traverse to the pair of arms 602a, 602b. That is, the elongated member 620 extends laterally (i.e. in the +/−Y direction) from the inner surface 610 of the pair of arms 602a, 602b. In some embodiments, the elongated member 620 is rigid such as a pipe. In other embodiments, the elongated member 620 is a channel, conduit, and the like. In embodiments, the elongated member 620 extends between the inner surface 610 in a uniform manner such that each end in connect with the inner surface 610 is aligned with one another. In other embodiments, each end of the elongated member 620 is offset. Further, in embodiments, the elongated member 620 is symmetrical with respect to width and thickness. In other embodiments, the elongated member 620 is asymmetrical. Further, the elongated member 620 extends through the gap defined by the pair of arms 602a, 602b. It should be appreciated that the amount of tension or the length of the elongated member 620 may change based on the adjustment of the pair of arms 602a, 602b, as discussed in greater detail herein. The elongated member 620 is mounted to the pair of arms 602a, 602b by a fastener such as bolts and nuts, rivets, screws, and the like, and/or may be welded.

It should be appreciated that the plurality of container tilting devices that extend from at least one of the inner surface 610 of at least one of the pair of arms 602a, 602b is not limited to the embodiments described above and herein. In some embodiments, the container tilting device may be a roller, a tab, a protrusion, and the like.

Now referring to 4A-4C, an operation of the example container tilting arm assembly 602 will be described. In addition, the example container tilting arm assembly 602 is configured to adjust in the system lateral direction (i.e., in the +/−Y direction) to match the size (i.e., the width) of the container to be tipped. The example container tilting arm assembly 602 is also adjustable in the system vertical direction (i.e., in the +/−Z direction) along the pair of elongated members 105 such that the height of the container tilting arm assembly 602 is variable to match a size of the container, the tilting position required, and the like. It should be appreciated that in some embodiments, the adjustment of the example container tilting arm assembly 602 in the system vertical direction (i.e., in the +/−Z direction) and/or in the system lateral direction (i.e., in the +/−Y direction) is performed by the movable arm assembly 112, either autonomously or semi-autonomously. In other embodiments, the adjustment of the example container tilting arm assembly 602 in the system vertical direction (i.e., in the +/−Z direction) and/or in the system lateral direction (i.e., in the +/−Y direction) is manually performed. In yet other embodiments, the adjustment of the example container tilting arm assembly 602 in the system vertical direction (i.e., in the +/−Z direction) and/or in the system lateral direction (i.e., in the +/−Y direction) is adjusted by a motor, an actuator, a servo, and/or the like.

Figure 4A:
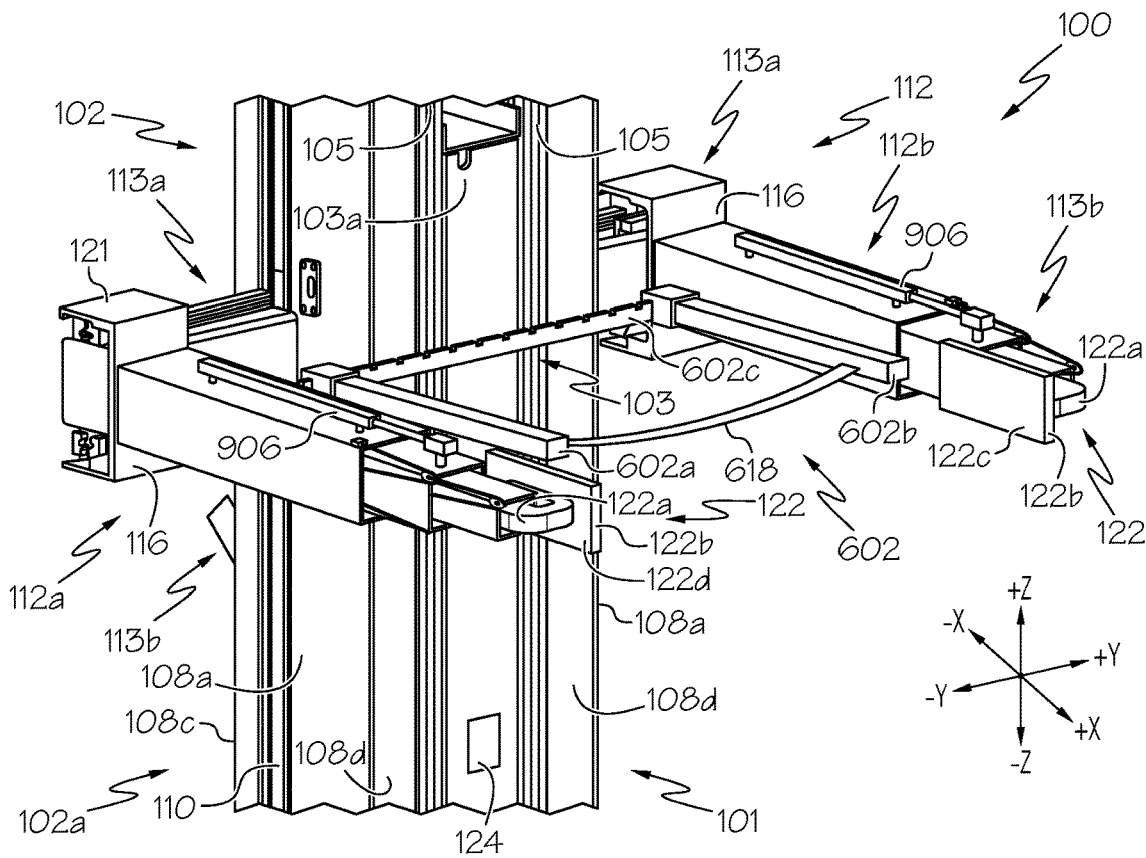
FIG. 4A depicts an isolated perspective view an example container tilting arm assembly and an example movable arm assembly of FIG. 2 according to one or more embodiments shown and described herein.
Figure 4B:
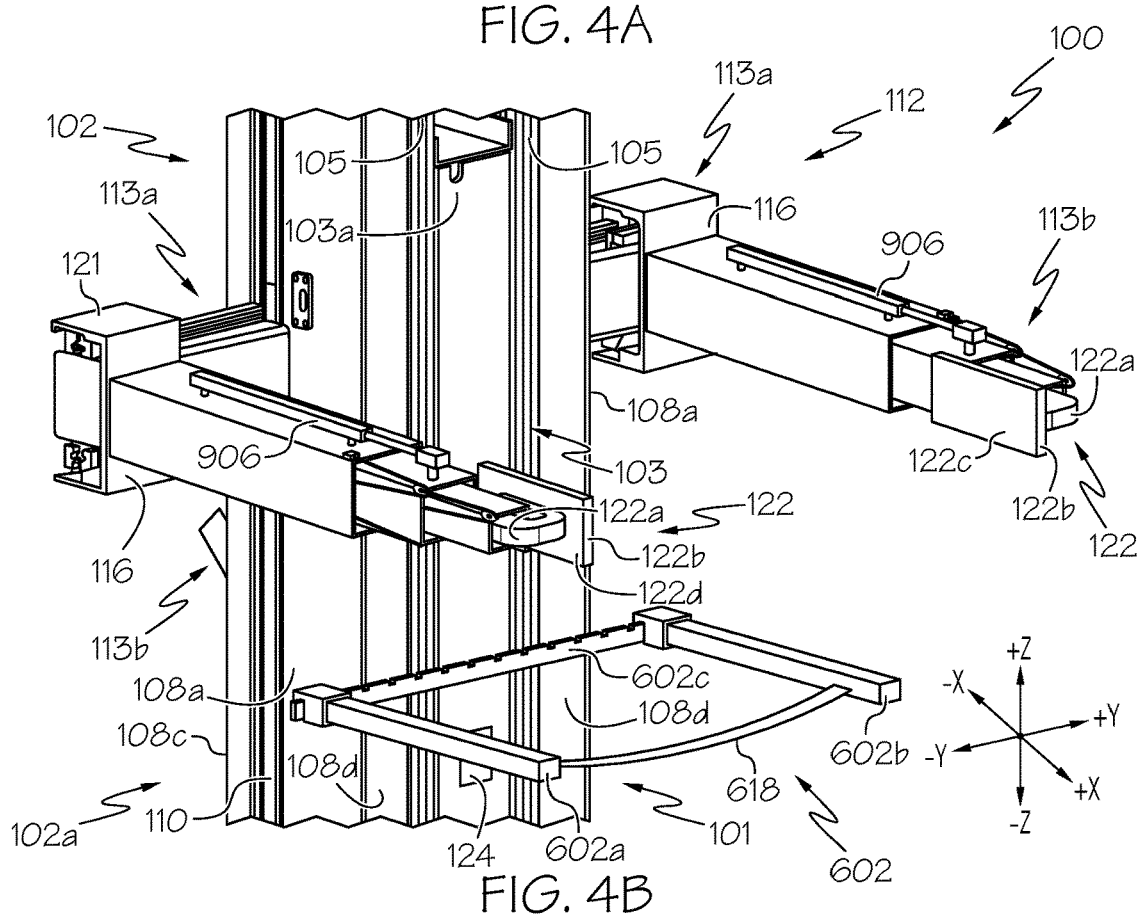
FIG. 4B depicts an isolated perspective view of the example container tilting arm assembly and the example movable arm assembly of FIG. 4A with the example movable arm assembly positioned above the example container tilting arm assembly in a system vertical direction according to one or more embodiments shown and described herein.
Figure 4C:
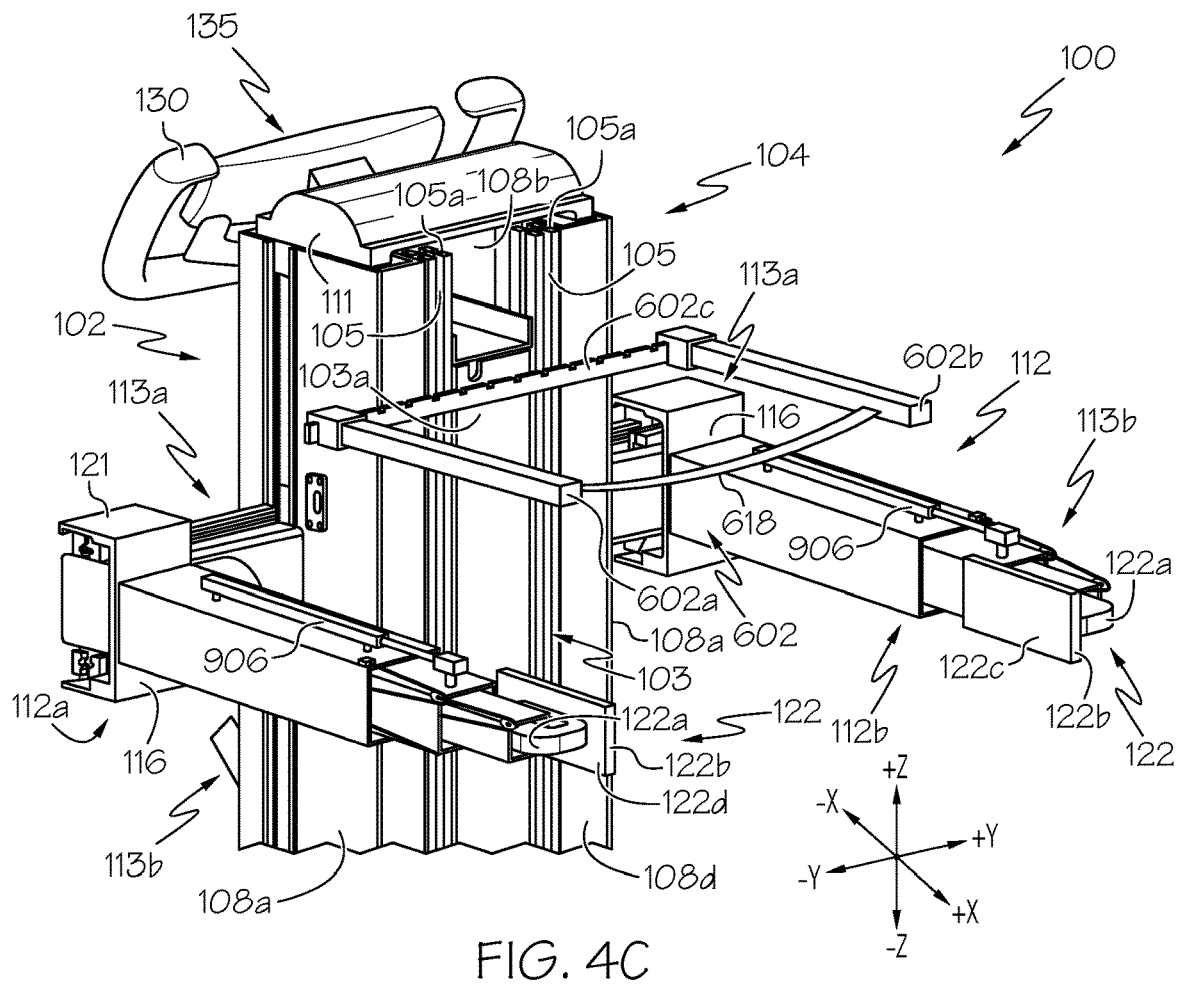
FIG. 4C depicts an isolated perspective view of the example container tilting arm assembly and the example movable arm assembly of FIG. 4A with the example movable arm assembly positioned below the example container tilting arm assembly in a system vertical direction according to one or more embodiments shown and described herein.

It should be appreciated that the example container tilting arm assembly 602 is adjustable in the system vertical direction (i.e., in the +/−Z direction) along the pair of elongated members 105 regardless of the position of the movable arm assembly 112. For example, as best shown in FIG. 4A, the example container tilting arm assembly 602 is illustrated as being at the same height in the system vertical direction (i.e., in the +/−Z direction) as the movable arm assembly 112. In another example, as best shown in FIG. 4B, the example container tilting arm assembly 602 is illustrated as being below the movable arm assembly 112 in the system vertical direction (i.e., in the +/−Z direction). In yet another example, as best shown in FIG. 4C, the example container tilting arm assembly 602 is illustrated as being above the movable arm assembly 112 in the system vertical direction (i.e., in the +/−Z direction). It should be appreciated that the movable arm assembly 112 and the example container tilting arm assembly 602 work in conjunction to grip, hold, raise, lower, tilt, place, and the like, containers of varying shapes.

Figure 4D:
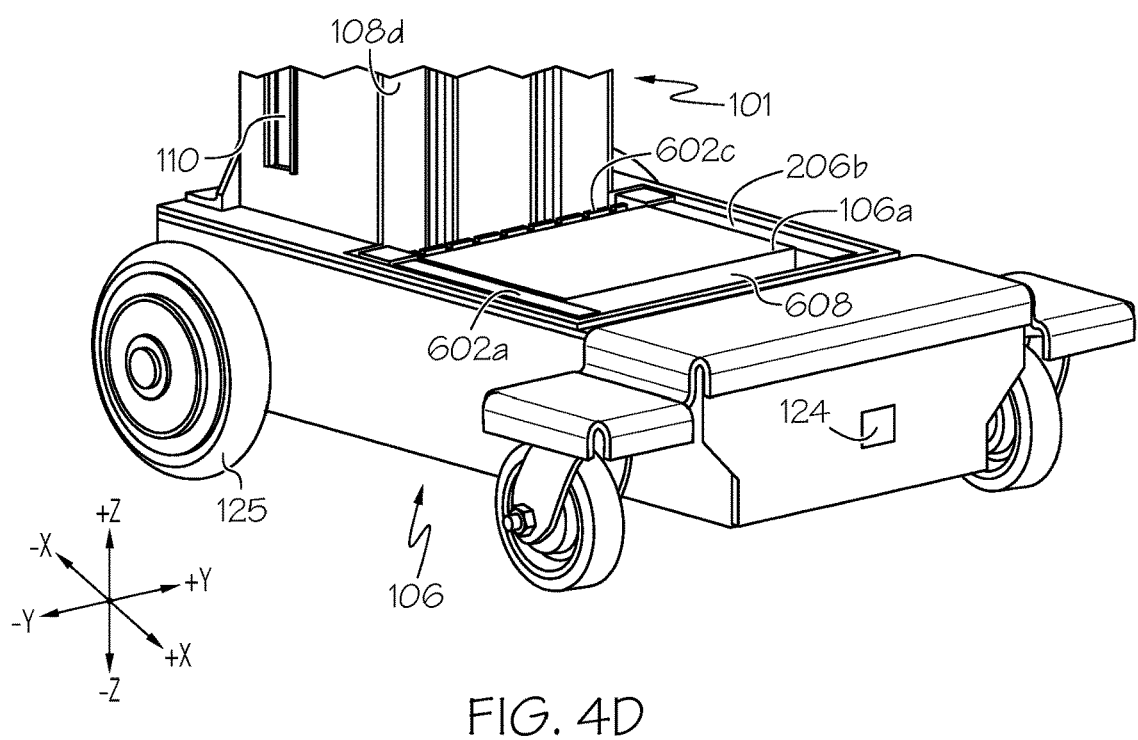
FIG. 4D depicts an isolated perspective view of the example container tilting arm assembly and an illustrative base of FIG. 2 with the example container tilting arm assembly stored within the base according to one or more embodiments shown and described herein.

Referring now to FIG. 4D, in embodiments, each arm 602a, 602b and the mounting member 602c of the example container tilting arm assembly 602 may be movable to a stored position within a recess 608 disposed in an upper surface 106a of the base 106. That is, the example container tilting arm assembly 602 is lowered in the system vertical direction (i.e., in the +/−Z direction) into the recess 608 of the base 106. It should be appreciated that in some embodiments, the lowering of the example container tilting arm assembly 602 into the recess 608 of the base 106 is performed by the movable arm assembly 112, either autonomously or semi-autonomously. In other embodiments, the lowering of the example container tilting arm assembly 602 into the recess 608 of the base 106 is manually performed. In yet other embodiments, the lowering of the example container tilting arm assembly 602 into the recess 608 of the base 106 is adjusted by a motor, an actuator, a servo, and/or the like.

It should be appreciated that, in embodiments, the recess 608 has a depth in the system vertical direction (i.e., in the +/−Z direction) that permits the example container tilting arm assembly 602 to be stored below the upper surface 106a of the base 106 such that the upper surface 106a of the base 106 is available to store a container. In other embodiments, the depth of the recess 608 in the system vertical direction (i.e., in the +/−Z direction) retains the example container tilting arm assembly 602, but does not position the example container tilting arm assembly 602 below the upper surface 106a of the base 106.

Figure 4E:
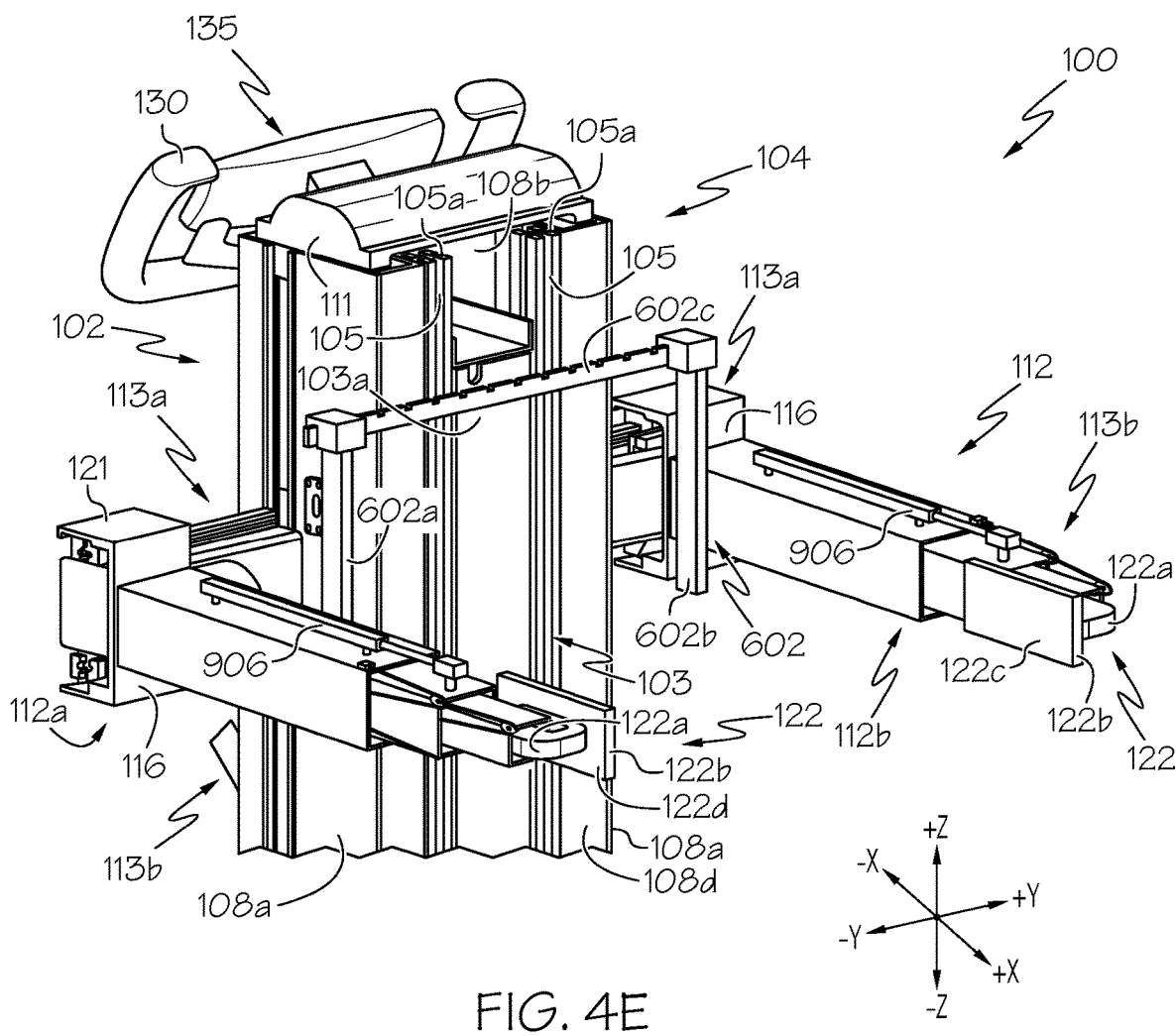
FIG. 4E depicts an isolated perspective view of the example container tilting arm assembly of FIG. 2 positioned in a folded arrangement according to one or more embodiments shown and described herein.

Referring now to FIG. 4E, each arm 602a, 602b of the example container tilting arm assembly 602 may be foldable between a first position and a second position. In the first position, each arm 602a, 602b is extended in a system longitudinal direction (i.e., in the +/−X direction), as shown in FIGS. 4A-4D. In the second position, each arm 602a, 602b folds or extends in a system vertical direction (i.e., in the +/−Z direction) such that each arm 602a, 602b is stowed or folded out of the way when not in use. It should be appreciated that in some embodiments, the moving or folding of the example container tilting arm assembly 602 between the first position and the second position, and vice versa, is performed by the movable arm assembly 112, either autonomously or semi-autonomously. In other embodiments, the moving or folding of the example container tilting arm assembly 602 between the first position and the second position, and vice versa, is manually performed. In yet other embodiments, the moving or folding of the example container tilting arm assembly 602 between the first position and the second position, and vice versa, is adjusted by a motor, an actuator, a servo, and/or the like.

Now referring to FIG. 5, an isolated perspective semi-exploded sectional view of the example first tower actuator assembly 102 of the lifting mechanism 101 will now be described. It should be appreciated that, as discussed above, the second tower actuator assembly 104 is a mirror image of the first tower actuator assembly 102 and thus will not be described. In embodiments, the first tower actuator assembly 102 includes telescoping sections. The example first tower actuator assembly 102 includes three telescoping sections: the lower section 102a, a midsection 102b, and an extension section 102c. As discussed above, the lower section 102a includes the first side 108a spaced apart from the second side 108b, the rear side 108c also spaced apart from the front side 108d so to form a lower section base portion 202 and a lower section cavity 204. The lower section base portion 202 is in contact with the base 106.

In some embodiments, the lower section cavity 204 further includes a plurality of surfaces, including, but not limited to, a lower section cavity first inner side 204a, a lower section cavity second inner side 204b, a lower section cavity third inner side 204c, and a lower section cavity fourth inner side 204d. The various surfaces of the lower section cavity 204 house the midsection 102b and the extension section 102c. As such, the lower section cavity 204 extends from the lower section base portion 202 to a lower section upper opening 206, opposite the lower section base portion 202 in the system vertical direction (i.e., in the +/−Z direction). In embodiments, the front side 108d of the lower section 102a further includes a groove 208 that extends the length of the front surface 108d of the lower section 102a in the system vertical direction (i.e., in the +/−Z direction). The groove 208 encroaches on the lower section cavity 204 such that the lower section cavity 204 may have an asymmetrical or irregular shape. In embodiments, a lower section rail 210 is mounted to the lower section cavity second inner side 204b and extends the length of the lower section cavity second inner side 204b in the system vertical direction (i.e., in the +/−Z direction). In embodiments, the lower section rail 210 includes a lower section rail stop limit 210a adjacent to the lower section upper opening 206. The lower section rail stop limit 210a may be generally a u-shaped stop that abuts the lower section rail 210 and the lower section cavity second inner side 204b. The lower section rail stop limit 210a may be any material that is capable of preventing a movement of another section of the first tower actuator assembly 102 from travelling or telescoping beyond on the limit stop. In some embodiments, the lower section rail stop limit 210a may be an electrically controlled switch, such as a toggle switch, a proximately switch, a laser switch, and/or the like.

In some embodiments, the illustrated lower section cavity 204 maintains a first sprocket 211, a second sprocket 212, and a third sprocket 213, as discussed with greater detail herein. More specifically, the first, second, and third sprockets 211, 212, 213 may be mounted to the lower section cavity second inner side 204b.

Figure 5:
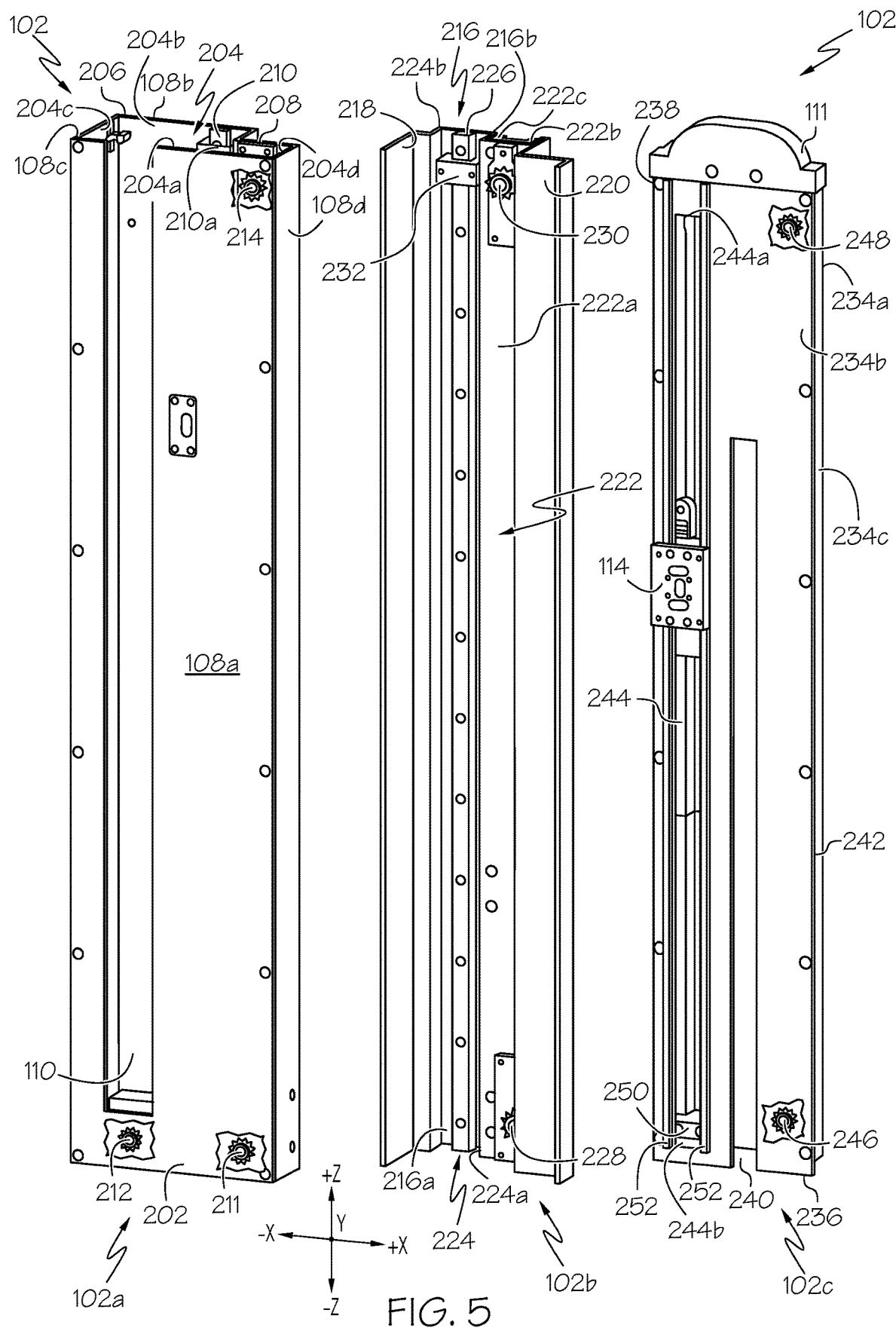
FIG. 5 depicts an isolated perspective exploded view of an example lifting mechanism of an illustrative assistive robot system of FIG. 2 according to one or more embodiments shown and described herein.

Still referring to FIG. 5, in some embodiments, as a non-limiting example, the midsection 102b further includes a plurality of surfaces, including, but not limited to, a midsection wall 216 having a midsection wall inner surface 216a and a midsection wall outer surface 216b, a midsection first flange 218, a midsection second flange 220, and a midsection u-shaped flange 222. The midsection wall 216 is attached to the midsection first flange 218 and the midsection u-shaped flange 222 so to space apart the midsection first flange 218 from the midsection u-shaped flange 222. As such, a midsection channel 224 is defined within the midsection wall inner surface 216a, which in turn forms an inner surface of the midsection channel 224. The midsection first flange 218 and the midsection u-shaped flange 222 continue to form the walls of the midsection channel 224 respectively.

The midsection second flange 220 is connected to the midsection u-shaped flange 222 opposite of the midsection wall 216 connection to the midsection u-shaped flange 222. That is, the midsection second flange 220 is outside of the midsection channel 224. Further, the midsection channel 224 includes a midsection channel base portion 224a and a midsection channel upper portion 224b. It should be appreciated that the example first tower actuator assembly 102 of the lifting mechanism 101 is not limited to the configuration as illustrated in FIG. 5 and that the example first tower actuator assembly 102 may take on any shape or structure and is not limited by the disclosure herein.

In this embodiment, the various surfaces of the midsection 102b align with the lower section cavity 204 such that the midsection 102b is housed within and extends from the lower section cavity 204 in the system vertical direction (i.e., in the +/−Z direction), as will be discussed in further detail herein. A midsection rail 226 is mounted to the midsection wall inner surface 216a and extends the length of the midsection channel 224 in the system vertical direction (i.e., in the +/−Z direction). Further, the midsection rail 226 aligns vertically with the lower section slot 110 in the system vertical direction (i.e., the +/−Z direction) so that when extended, the midsection rail 226 and the lower section slot 110 are continuous in the system vertical direction (i.e., in the +/−Z direction). Further, the midsection u-shaped flange 222 includes an outer portion 222a and an inner portion 222b that form the u-shape. As such, the inner portion 222b of the midsection u-shaped flange 222 aligns with and slidably engages with the lower section rail 210 in the system vertical direction (i.e., in the +/−Z direction) so that the midsection 102b may raise and lower from and into the lower section 102a by slidably engaging the midsection u-shaped flange 222 with the lower section rail 210. Moreover, the inner portion 222b of the midsection u-shaped flange 222 includes a u-shape flange stop limit 222c adjacent to both the midsection channel base portion 224a and the midsection channel upper portion 224b. The u-shape flange stop limit 222c may be any material that is capable of preventing a movement of another section of the first tower actuator assembly 102 from travelling or telescoping beyond on the limit stop. In some embodiments, the u-shape flange stop limit 222c may be an electrically controlled switch, such as a toggle switch, a proximately switch, a laser switch, and/or the like.

Still referring to FIG. 5, in some embodiments, the midsection second flange 220 may be configured to allow clearance to the first and third sprockets 211, 214 of the lower section 102a in the system vertical direction (i.e., in the +/−Z direction) so that when the midsection 102b rises and lowers from and into the lower section 102a, there will not be any interference with the operation of the first and third sprockets 211, 214 of the lower section 102a.

In some embodiments, a fourth sprocket 228 and a fifth sprocket 230 are attached to the midsection u-shaped flange 222 of the midsection 102b and assist in raising and lowering the midsection 102b from the lower section cavity 204, as discussed with greater detail herein. More specifically, the fourth and fifth sprockets 228, 230 are attached to the outer portion 222a of the midsection u-shaped flange 222. Further, a midsection limit stop 232 is coupled to an upper portion of midsection rail 226. The midsection limit stop 232 may be generally a u-shaped stop that abuts the midsection rail 226 and the midsection wall inner surface 216a. The midsection limit stop 232 may be any material that is capable of preventing a movement of another section of the first tower actuator assembly 102 from travelling or telescoping beyond on the limit stop. In some embodiments, the midsection limit stop 232 may be an electrically controlled switch, such as a toggle switch, a proximately switch, a laser switch, and/or the like.

Figure 6A:
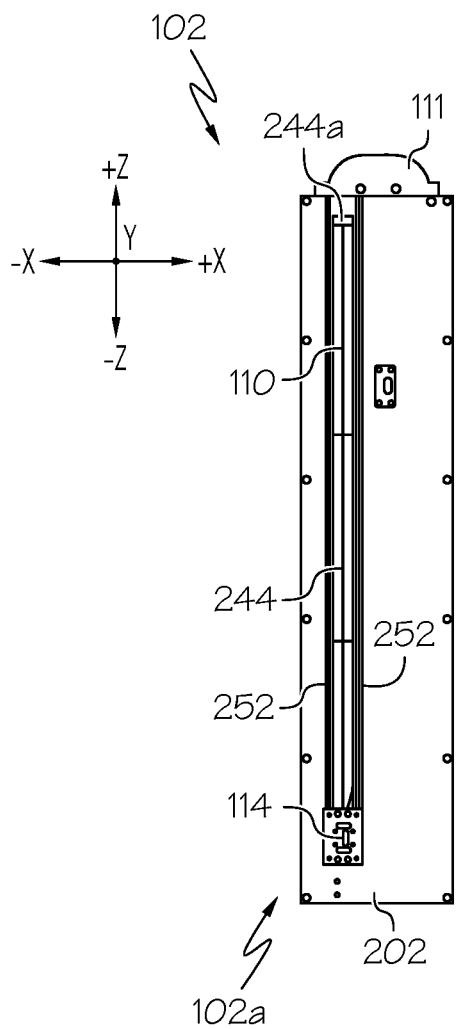
FIG. 6A schematically depicts a side view of the lifting mechanism of FIG. 5 at a home position according to one or more embodiments shown and described herein.
Figure 6B:
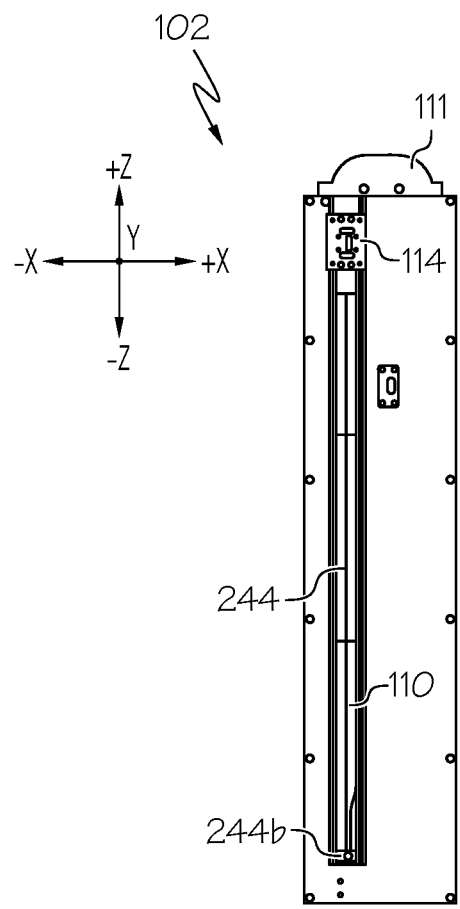
FIG. 6B schematically depicts a side view of the lifting mechanism of FIG. 5 with a connector raised in a system vertical direction according to one or more embodiments shown and described herein.

Still referring to FIG. 5, in some embodiments, the extension section 102c further includes a plurality of surfaces, including, but not limited to, an extension section outer wall 234a and opposing extension section inner wall 234b. The extension section outer wall 234a and opposing extension section inner wall 234b are separated by a thickness that forms an extension section front wall 234c and an extension section rear wall 234d (FIG. 6C). Further, in some embodiments, the extension section 102c includes extension base portion 236 and an extension top portion 238 in which the cap 111 of the first tower actuator assembly 102 is attached to the extension top portion 238. The extension section inner wall 234b includes an extension section slot 240 that extends in the system vertical direction (i.e., in the +/−Z direction). It should be appreciated that the extension section slot 240 may not extend the length of the extension section inner wall 234b, but may extend from the extension base portion 236 towards the extension top portion 238 without its apex in contact with the extension top portion 238. In some embodiments, the extension section outer wall 234a, the extension section front wall 234c and/or the extension section rear wall 234d may not be flush or extend to a point adjacent to the extension section inner wall 234b, thereby creating an extension section flange 242.

In some embodiments, the various surfaces of the extension section 102c align with the midsection 102b and the lower section cavity 204 of the lower section 102a such that the extension section 102c is maintained within the lower section cavity 204 and slidably extends from the lower section 102a and the midsection 102b in the system vertical direction (i.e., in the +/−Z direction), as will be discussed in further detail herein. In embodiments, an extension section rail 244 is mounted to the extension section inner wall 234b and extends the length of the extension section inner wall 234b in the system vertical direction (i.e., in the +/−Z direction). The extension section rail 244 has an upper edge rail portion 244a and a lower edge rail portion 244b. Further, the extension section rail 244 aligns vertically with the midsection rail 226 and the lower section slot 110 in the system vertical direction (i.e., in the +/−Z direction) so that when extended, the extension section rail 244, the midsection rail 226 and the lower section slot 110 are continuous in the system vertical direction (i.e., the +/−Z direction). In some embodiments, a pair of ribs 252 are separated by the extension section rail 244. The pair of ribs 252 protrude from the extension section inner wall 234b and extend from the extension base portion 236 to the extension top portion 238 in a system vertical direction (i.e., in the +/−Z direction). The pair of ribs 252 may shield or protect the extension section rail 244, may assist in aligning or maintain the alignment of the extension section 102c to the midsection 102b, provide strength and support to the connector 114 as well as provide a surface for the connector 114 to travel, move, and/or ride thereon during movement in the system vertical direction (i.e., in the +/−Z direction) between the upper edge rail portion 244a and a lower edge rail portion 244b. It should be appreciated that the example first tower actuator assembly 102, including the lower section 102a, the midsection 102b and the extension section 102c, is not limited to the configuration of the embodiments as illustrated in FIG. 5 and that the example first tower actuator assembly 102 may take on any shape or structure and is not limited by the disclosure herein.

Still referring to FIG. 5, in some embodiments, the extension section flange 242 may align with the fourth and fifth sprockets 228, 230 of the midsection 102*b* in the system vertical direction (i.e., in the +/−Z direction) so that the extension section 102*c* may raise and lower from the midsection 102*b* without interfering with the operation of the fourth and fifth sprockets 228, 230 of the midsection 102*b*.

In the illustrated embodiment, a sixth sprocket 246 and a seventh sprocket 248 are attached to an inside surface of the extension section outer wall 234*a* and assist in raising and lowering the extension section 102*c* from the midsection 102*b* and the lower section cavity 204, as discussed with greater detail herein. Further, an extension section limit stop 250 is coupled to the lower edge rail portion 244*b* of the extension section rail 244. The extension section limit stop 250 may be generally a u-shaped stop that abuts the lower edge rail portion 244*b* of the extension section rail 244 and the extension section inner wall 234*b*. The extension section limit stop 250 may be any material that is capable of preventing a movement of another section of the first tower actuator assembly 102 from travelling or telescoping beyond on the limit stop or used to temporarily lock the extension section 102*c* to the midsection 102*b* at a predetermined position during the extension process, as discussed in greater detail herein. The extension section limit stop 250 may be an electrically controlled switch, such as a toggle switch, a proximately switch, a laser switch, and/or the like. Further, it should be appreciated that the limit stops 210*a*, 222*c*, 232, 250 are not limited by the placement as illustrated in FIG. 5 and may be placed anywhere on the plurality of surfaces as appreciated by one skilled in the art.

It should be appreciated that the example first tower actuator assembly 102 make take on any shape or structure and is not limited by the disclosure herein. Further, the example first tower actuator assembly 102 may have a plurality of telescoping sections, which may have any shape or structure and is not limited by the disclosure herein. Further, in some embodiments, the example lifting mechanism 101 is a single tower assembly that has fewer telescoping sections than that of the first tower actuator assembly 102 and the second tower actuator assembly 104 described herein. It should be appreciated that the single tower assembly embodiment may provide more stability and may lift heavier loads than the other embodiments described herein with respect to the first tower actuator assembly 102 and the second tower actuator assembly 104. It should be appreciated that, in embodiments, the telescoping sections of the single tower assembly may be an inverted pyramid or may be a telescoping box structure.

Still referring to FIG. 5 and now also referring to FIGS. 6A-6D, which schematically depict isolated side views of the first tower actuator assembly 102 and the corresponding telescoping sections in various positions. In some embodiments, the connector 114 is slidably engaged with the extension section rail 244 between the upper edge rail portion 244*a* and a lower edge rail portion 244*b*. Further, the connector 114 may travel in the system vertical direction (i.e., in the +/−Z direction) within the lower section slot 110 when the midsection 102*b* and the extension section 102*c* are at a first position, as discussed in greater detail herein. Further, the connector 114 is mechanically coupled to a continuous member 302 (FIG. 7A) that is configured to raise and lower the connector 114 along the extension section rail 244 between the upper edge rail portion 244*a* and a lower edge rail portion 244*b*, as will be discussed in greater detail herein. Consequently, because the movable arm assembly 112 is mechanically coupled to the connector 114, when the connector 114 is raised or lowered along the extension section rail 244, whether while within the lower section slot 110 and/or when the extension section 102*c* is extended from the lower section 102*a* in the system vertical direction (i.e., in the +/−Z direction), the movable arm assembly 112 also travels the same distance in the system vertical direction (i.e., in the +/−Z direction).

Still referring to FIGS. 5 and 6A-6D, the lower section 102*a*, the midsection 102*b*, and the extension section 102*c* are all depicted as being in the first position, also referred to herein as a home position. In this first position, the midsection 102*b* and the extension section 102*c* are housed within the lower section 102*a*. The connector 114 may travel within the lower section slot 110 along the extension section rail 244 between the upper edge rail portion 244*a* and the lower edge rail portion 244*b* from a position adjacent to the lower section base portion 202 to an upper position in which the connector 114 makes contact with the upper edge rail portion 244*a* of the extension section rail 244. It should be appreciated that, in some embodiments, the extension section 102*c* is positioned ahead of, or in front of the midsection 102*b* within the lower section 102*a* in the positive system lateral direction (i.e., in the +Y direction) such that the extension section rail 244 and the connector 114 are always accessible in the lower section slot 110. Further, in this arrangement, when the connector 114 makes contact with the upper edge rail portion 244*a* of the extension section rail 244, the extension section 102*c* is driven or raised in the system vertical direction (i.e., in the +/−Z direction).

Now referring to FIG. 6C, in some embodiments, the connector 114 is makes contact with the upper edge rail portion 244*a* (FIG. 2) of the extension section rail 244. As a result, when the continuous member 302 (FIG. 7A, described below) continues to rotate, the connector 114 drives or raises the extension section 102*c* from the lower section 102*a* in the system vertical direction (i.e., in the +/−Z direction), as explained in greater detail below. As such, the extension section 102*c* will continue to raise in the system vertical direction (i.e., in the +/−Z direction) independent of the midsection 102*b* until the extension section limit stop 250 makes contact with the midsection limit stop 232 (FIG. 5), at which point the extension section 102*c* drives or raises the midsection 102*b* in the system vertical direction (i.e., in the +/−Z direction), as shown in FIG. 6D.

Now referring to FIGS. 5 and. 6D, in some embodiments, the extension section limit stop 250 makes contact with the midsection limit stop 232. As a result, the continuous member 302 continues to rotate driving or raising the extension section 102*c* and the midsection 102*b* in the system vertical direction (i.e., in the +/−Z direction) to an extended or a second position. The second position may be met when the u-shaped flange stop limit 222*c* is in contact with the lower section rail stop limit 210*a*. The contact between the stop limits 210*a*, 222*c* prevents the midsection 102*b* from raising any further in the system vertical direction (i.e., in the +/−Z direction) and the contact between the extension section limit stop 250 and the midsection limit stop 232 prevents the extension section 102*c* from advancing any further in the system vertical direction (i.e., in the +/−Z direction).

Referring now to FIGS. 7A-7D, a side isolated view of an example linkage assembly 300 of the first tower actuator assembly 102 that corresponds to the telescoping positions of FIGS. 6A-6D is schematically depicted. In some embodiments, the linkage assembly 300 includes the plurality of sprockets 301 and the continuous member 302. It should be appreciated that the plurality of sprockets 301 may be rollers or a combination of sprockets and rollers. The plurality of sprockets 301 of the illustrated embodiment includes the first sprocket 211, the second sprocket 212 the third sprocket 214, the fourth sprocket 228, the fifth sprocket 230, the sixth sprocket 246, and the seventh sprocket 248 described above and shown in FIG. 5. It should be appreciated that the some of the sprockets of the plurality of sprockets 301 travel, or translate, between a stop position and a travel position, while other sprockets of the plurality of sprockets 301 are fixed and do not travel. Further, in some embodiments, certain sprockets rotate whether in the stop or travel positions while others do not rotate while in the stop or travel positions. For example, the first sprocket 211, the second sprocket 212, and the third sprocket 214 of the lower section 102a are all fixed position sprockets and do not travel or move positions, and, depending on the position of the telescoping sections, may or may not rotate. It should be appreciated that the continuous member 302 may be a belt, a chain, a resilient member such as an elastic band, and the like. The continuous member 302 is a loop and does not have an end or a beginning, and, in some embodiments, the ends are attached to one another to form the loop. In embodiments, the continuous member 302 selectively engages different sprockets to drive or control the telescoping sections (i.e., the midsection 102b, extension section 102c, and/or the like). In some embodiments, the first sprocket 211 is a gear driven sprocket. That is, the first sprocket 211 may be attached to an axle or some other mechanism that receives a torque from a motor (not shown) and/or the like, to drive the continuous member 302, which in turn rotates and selectively engages different sprockets, as discussed in greater detail herein. It should be appreciated that the motor may be positioned within the base 106 (FIG. 2) to help provide stability and keep the weight of the motor in the base, as appreciated by those skilled in the art, when the telescoping sections (i.e., the midsection 102b, extension section 102c, and/or the like) are extended in the system vertical direction (i.e., in the +/−Z direction). Further, in some embodiments, as discussed with respect to FIGS. 5 and 6A-6D, limit switches and/or hard stops may be used to translate the different telescoping sections (i.e., the midsection 102b, and/or the extension section 103c). In other embodiments, an encoder may be used to track the position of the motor, the continuous member 302, the sprockets, and the like to obtain precise movements of the components of the assistive robot system 100.

Figure 7A:
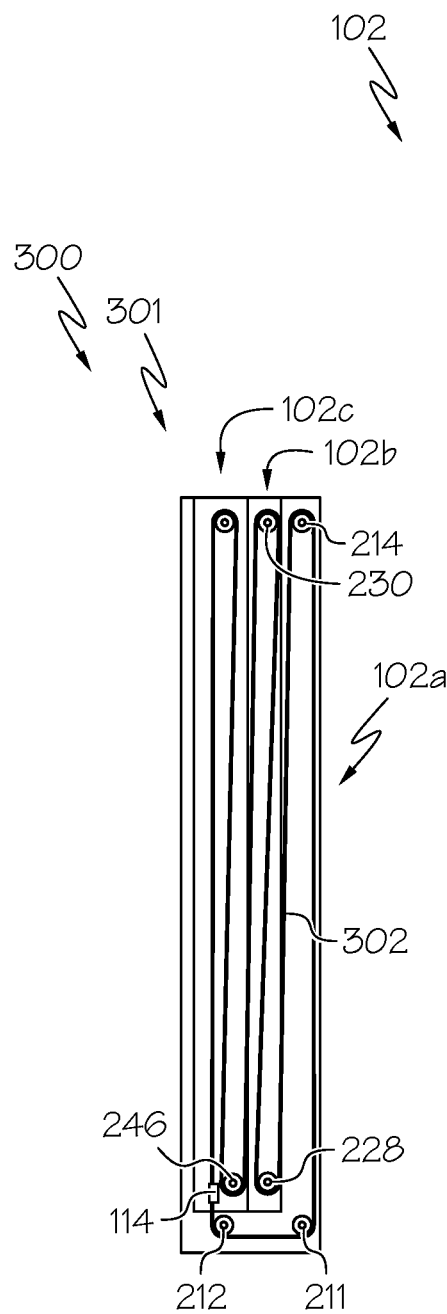
FIG. 7A schematically depicts a side isolated view of an example linkage assembly of the lifting mechanism of FIG. 5 according to one or more embodiments shown and described herein.
Figure 7B:
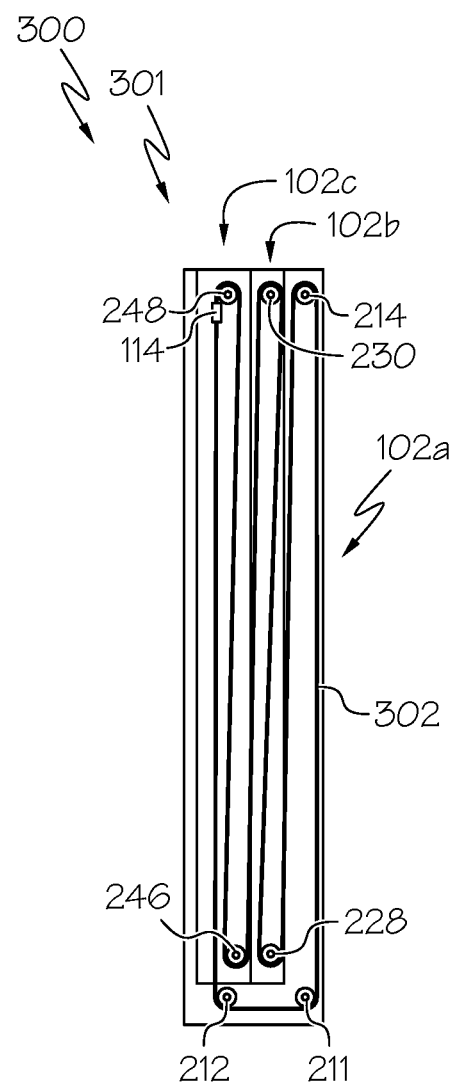
FIG. 7B schematically depicts a side isolated view of the linkage assembly of the lifting mechanism of FIG. 7A with a connector raised in the system vertical direction according to one or more embodiments shown and described herein.

Referring now to FIGS. 7A-7B, the lower section 102a, the midsection 102b, and the extension section 102c are all depicted as being in the first position or home position. In this first position, the midsection 102b and the extension section 102c are housed within the lower section 102a. In some embodiments, the connector 114 may travel without making contact with the upper edge rail portion 244a (FIG. 5) of the extension section rail 244. Further, because the midsection 102b and the extension section 102c are housed within the lower section 102a, the fourth sprocket 228, the fifth sprocket 230, the sixth sprocket 246, and the seventh sprocket 248 are in their respective stop positions. In the home position, the first and second sprockets 211, 212 are positioned below any other sprockets in the system vertical direction (i.e., in the +/−Z direction) and the third, fifth, and seventh sprockets 214, 230, 248 are positioned vertically above the remaining sprockets in the system vertical direction (i.e., in the +/−Z direction). Further, the fourth and sixth sprockets 228, 246 are positioned between the first and second sprockets 211, 212 and the third, fifth, and seventh sprockets 214, 230, 248 in the system vertical direction (i.e., in the +/−Z direction). As a result of this arrangement, the continuous member 302, in embodiments, has slack between the plurality of sprockets, which permits the continuous member 302 to lengthen or become tight as the plurality of sprockets 301 move from their stop position to their travel position and as the telescoping sections (i.e., the midsection 102b, and/or the extension section 103c) extend between the first position and the second positon. Further, in this arrangement, each sprocket of the plurality of sprockets 301 may rotate freely because the continuous member 302 is not restricting any of their respective movements.

Now referring to FIG. 7C, in some embodiments, the connector 114 makes contact with the upper edge rail portion 244a (FIG. 5) of the extension section rail 244 (FIG. 5). As such, the continuous member 302 has slack or is long between the second sprocket 212, the sixth sprocket 246, and the seventh sprocket 248 that allows the extension section 102c to raise in the system vertical direction (i.e., in the +/−Z direction) independent of the midsection 102b until the extension section limit stop 250 (FIG. 5) makes contact with the midsection limit stop 232 (FIG. 5). In this positon, the sixth sprocket 246 and the seventh sprocket 248 have traveled in the system vertical direction (i.e., in the +/−Z direction) from their stop position to their respective travel positions. The seventh sprocket 248, in its travel position, is vertically above the third sprocket 214 and the fifth sprocket 230 in the system vertical direction (i.e., in the +/−Z direction), while the sixth sprocket 246 is vertically above the first, second, and fourth sprockets 211, 212, 228 but is vertically below the third and fifth sprockets 214, 230 in the system vertical direction (i.e. in the +/−Z direction). As such, the continuous member 302 is now tight between the second sprocket 212, the sixth sprocket 246, and the seventh sprocket 248. In embodiments, the continuous member 302 tightening prevents the second sprocket 212, the sixth sprocket 246, and the seventh sprocket 248 from rotation. It should be appreciated that the third sprocket 228 and the fourth sprocket 230 remain in their respective stop positions and the continuous member 302 has slack or is long between the first sprocket 211, the third sprocket 214, the fourth sprocket 228 and the fifth sprocket 230. As such, the first sprocket 211, the third sprocket 214, the fourth sprocket 228 and the fifth sprocket 230 may rotate freely in this configuration.

Now referring to FIG. 7D, the first tower actuator assembly 102 is at the second position. That is, the extension section 102c and now the midsection 102b are raised to the full extension position in the system vertical direction (i.e., in the +/−Z direction). The slack in the continuous member 302 between the first sprocket 211, the third sprocket 214, the fourth sprocket 228 and the fifth sprocket 230 allows the midsection 102b to raise in the system vertical direction (i.e., in the +/−Z direction) while also vertically raising the extension section 102c in the system vertical direction (i.e., in the +/−Z direction). In this positon, the fourth sprocket 228 and the fifth sprocket 230 have traveled in the system vertical direction (i.e., in the +/−Z direction) from their stop position to their respective travel positions. The fifth sprocket 230, in its travel position, is vertically above the sixth sprocket 246 in the system vertical direction (i.e. in the +/−Z direction). Further the travel position of the fourth sprocket 228, while above the first and second sprockets 211, 212 may be vertically below the third sprocket 214 in the system vertical direction (i.e. in the +/−Z direction). As such, the continuous member 302 is tightened due to the displacement of the sprockets. That is, the continuous member 302 may be tightened between the first sprocket 211, the third sprocket 214, the fourth sprocket 228 and the fifth sprocket 230 and the continuous member 302 may remain tight between the second sprocket 212, the sixth sprocket 246, and the seventh sprocket 248. As such, in this configuration, the plurality of sprockets 301 may not be permitted to rotate to permit rising in the system vertical direction (i.e., in the +Z direction) because the continuous member 302 is restricting the plurality of sprockets 301 from rotation in this direction.

It should be appreciated that in addition to the example first tower actuator assembly 102 and the plurality of telescoping sections taking on any shape or structure and is not limited by the disclosure herein, the example linkage assembly 300 may make take on any shape or structure and is not limited by the disclosure herein. Further, in some embodiments, the single tower assembly has only one linkage assembly. As such, in this embodiment, the linkage assembly may be positioned in the middle of the single tower assembly and only requires one actuator.

Figure 8:
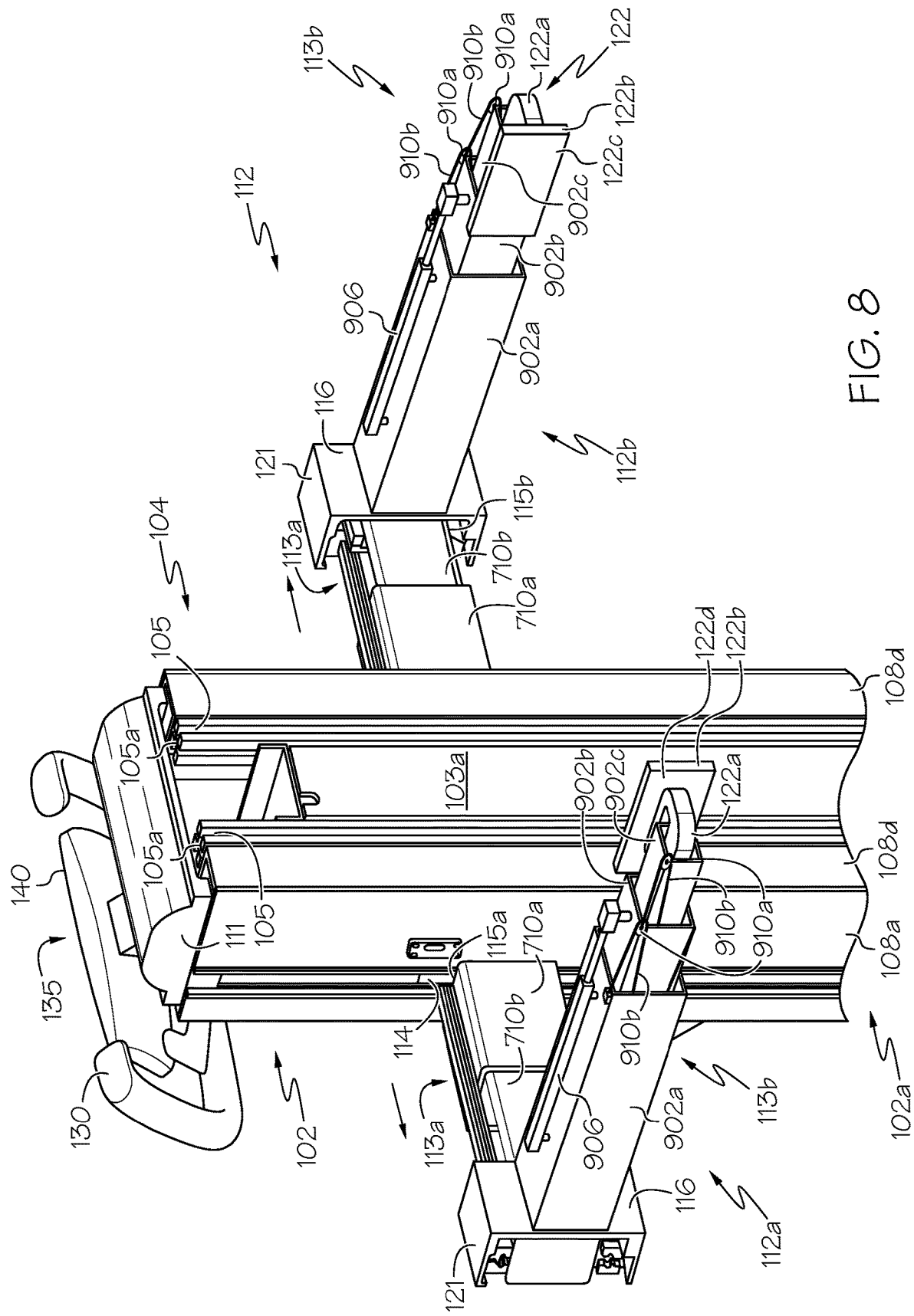
FIG. 8 schematically depicts an isolated perspective view of the movable arm assembly with an example lateral telescoping assembly in an extended position, an example longitudinal telescoping assembly in a retracted position and a user interface device coupled to the mast according to one or more embodiments shown and described herein.

Now referring to the FIG. 8, an isolated perspective view of the movable arm assembly 112 with the lateral telescoping assembly 113a in an extend state and a user interface device 135 coupled to the lower section 102a of the tower actuator assemblies 102, 104 are schematically depicted. The assistive robot system 100 includes the user interface device 135 having a display 140 (e.g., a touch screen display). For example, as shown in FIGS. 2 and 8, the user interface device 135 may be coupled to an upper portion of the mast 103 of the assistive robot system 100, similar to the position of the pair handles 130 (FIG. 2) as described in detail above. However, it should be understood that such a location is merely illustrative and the user interface device 135 may be coupled to other portions of the assistive robot system 100 or may be a separate component that is not coupled to the assistive robot system 100 without departing from the scope of the present disclosure. The user interface device 135 may generally provide one or more user-facing functions, including, but not limited to, providing the user with controls for controlling movement of the assistive robot system 100 including control of movement of the movable arm assembly 112, the container tilting arm assembly 602, and the base 106 and providing the user with controls for controlling settings of the assistive robot system 100, and/or the like. It should be understood that the user interface device 135 may provide other functionality not specifically described herein without departing from the scope of the present disclosure.

Referring now to FIGS. 8 and 9A-9B, the lateral telescoping assembly 113a of the movable arm assembly 112 will now be described. The lateral telescoping assembly 113a has a plurality of lateral telescoping segments. In the illustrated embodiment, the lateral telescoping assembly 113a is two segments: a first lateral segment 710a and a second lateral segment 710b. The first lateral segment 710a has a lateral attachment end 115a that is configured to be coupled to the connector 114 (FIG. 2). The second lateral segment 710b has a lateral arm distal end 115b is coupled to and housed within a housing 121. The housing 121 is positioned laterally outwardly (i.e., in the +/−Y direction) from the first and second tower actuator assemblies 102, 104 and opposite the lateral attachment end 115a. In embodiments, the lateral attachment end 115a is configured to be coupled to the connector 114 (FIG. 2). As such, the lateral telescoping assembly 113a extends laterally from the first tower actuator assembly 102 in a system lateral direction (i.e., in the +/−Y direction) and telescopes in the system lateral direction (i.e., in the +/−Y direction) between a retracted, or first position Y1 and an extended, or second position Y2. The lateral telescoping assembly 113a further includes a drum 702 and an actuator 704. The drum 702 is rotatably coupled to the actuator 704 via a connector 706 such as a shaft, a rod, and/or the like. The drum 702 is configured to rotate, in either direction, upon an activation of the actuator 704. Further, the drum 702 is configured to house a coiled member 708, such a as belt. Further, the drum 702 is configured to house a coiled member 708, such a as belt or a chain. In some embodiments, the coiled member 708 is a rigid member such as a lead screw, a rack and pinion assembly, a rigid chain, and the like. The coiled member 708 includes a first end 708a and a second end 708b. The first end 708a may be attached to the first tower actuator assembly 102 and the second end 708b may be attached to the drum 702. In some embodiments, the first end 708a of the coiled member 708 may be attached to the connector 114. The coiled member 708 may be configured to coil tightly around a circumference of the drum 702 and itself when the first lateral segment 710a and the second lateral segment 710b are in the retracted state Y1.

Conversely, the coiled member 708 may loosen and expand its coil during the unwinding or uncoiling from the drum 702 when the second lateral segment 710b is extended from the first lateral segment 710a at the second position Y2. As such, when the lateral telescoping assembly 113a is extended from the retracted position Y1 into the extended position Y2, the coiled member 708 pushes the second lateral segment 710b away from the first lateral segment 710a and the first tower actuator assembly 102. It should be appreciated that the second lateral segment 710b telescopes across a surface of the first lateral segment 710a such that the first lateral segment 710a is generally stationary and/or has less telescoping movement in the system lateral direction (i.e. in the +/−Y direction) than the second lateral segment 710b. In some embodiments, the second lateral segment 710b telescopes away from the first tower actuator assembly 102. In some embodiments, the coiled member 708 is spring loaded when coiled onto the drum 702. As such, when extending the second lateral segment 710b from the first lateral segment 710a in the system lateral direction (i.e., in the +/−Y direction), the coiled member 708 pushes the second lateral segment 710b away from the first lateral segment 710a and the first tower actuator assembly 102 using the actuator 704. During retraction, the second lateral segment 710b is retracted onto the first lateral segment 710a in the system lateral direction (i.e., in the +/−Y direction) without the need for the actuator 704. That is, the coiled member 708 may coil itself during retraction. It should be appreciated that the coiled member 708 is stiff enough to push the second lateral segment 710b away from the first lateral segment 710a and flexible enough to coil over itself onto the drum 702. Further, it should be appreciated that the coiled member 708 may self-regulate its own recoil speed based on, for example, on the stiffness or rigidness of the coiled member 708. That is, the flexibility the coiled member 708 may determine the recoil speed and the strength of the coiled member 708.

Referring now to FIG. 8 and FIGS. 10A-10C, the longitudinal telescoping assembly 113b of the movable arm assembly 112 will now be described. The longitudinal telescoping assembly 113b has a plurality of telescoping longitudinal segments. In the illustrated embodiment, the telescoping segments are boxed beams that each have a different sized inner area such that each segment may nest in another telescoping segment. Further, in the illustrated embodiment, the longitudinal telescoping assembly 113b is three segments: a first longitudinal segment 902a, a second longitudinal segment 902b, and a third longitudinal segment 902c. It should be understood that more or fewer segments may be provided. The first longitudinal segment 902a may include an attachment end 904a that is coupled to the housing 121. In some embodiments, the attachment end 904a is coupled to the outer surface 116 of the housing 121 such that the longitudinal telescoping assembly 113b extends from the outer surface 116 of the housing 121 in a direction perpendicular to the lateral telescoping assembly 113a.

The third longitudinal segment 902c includes a distal end 904b. The longitudinal telescoping assembly 113b extends longitudinally from the lateral telescoping assembly 113a in a system longitudinal direction (i.e., in the +/−X direction) between a retracted, or first position X1 and an extended, or second portion X2. To facilitate movement, the linear actuator 906 is mounted to the first longitudinal segment 902a and operably coupled to the second longitudinal segment 902b. In some embodiments, the linear actuator 906 is coupled to the second longitudinal segment 902b via a peg 907 that extends from an outer surface of the second longitudinal segment 902b. In other embodiments, the linear actuator 906 may be coupled to the second longitudinal segment 902b by a fastener such as a bolt and nut, screws, rivets, and the like. It should be appreciated that the linear actuator 906 may be electrically driven, pneumatically driven, hydraulically driven, and the like. Further, the linear actuator 906 may be a cylinder, a motor, and the like having a shaft, a rod, and the like that moves the telescoping segments between the first position X1 and the second position X2 in a uniform movement, as discussed in greater detail herein.

Each of the telescoping segments are interconnected to the second longitudinal segment 902b via a dual pulley system 908. The dual pulley system 908 includes a plurality of pulleys 910a and a pulley member 910b for use during the extension of the longitudinal telescoping assembly 113b to the second position X2. In some embodiments, the plurality of pulleys 910a are positioned on an outer surface of each telescoping section and the pulley members 910b are routed on the outer surface of each of the telescoping segments. Further, the dual pulley system 908 includes a plurality of pulleys 912a and a pulley member 912b for use during the retraction of the longitudinal telescoping assembly 113b to the first position X1. In some embodiments, the plurality of pulleys 912a are positioned within the interior area of each telescoping section and the pulley members 912b are routed through the interior area of each of the telescoping segments. The pulley members 910b, 912b may be a chain, a belt, a rope, a string, and the like. It should be appreciated that the dual pulley system 908 works in conjunction with the linear actuator 906 such that each segment of the longitudinal telescoping assembly 113b extends and retracts in a uniform movement. It should be appreciated that FIG. 10B illustrates a mid-position between the first position X1 and the second position X2, however this is not limiting and the telescoping segments may move anywhere and stop anywhere between the first position X1 and the second position X2.

In some embodiments, when the linear actuator 906 extends in the system longitudinal direction, the pulley member 910b is moved through the plurality of pulleys 910a such that the pulley member 910b moves the telescoping segments (i.e., the second longitudinal segment 902b and the third longitudinal segment 902c). In other embodiments, when the linear actuator 906 retracts in the system longitudinal direction, the pulley member 912b is moved through the plurality of pulleys 912a such that the pulley member 912b moves the telescoping segments (i.e., the second longitudinal segment 902b and the third longitudinal segment 902c).

It should be appreciated that the box beam configuration along with the dual pulley system 908 and the nesting arrangement permit the longitudinal telescoping assembly 113b to lift, hold, lower, place, maintain, and/or the like, a plurality of containers with varying weights. That is, the assistive robot system 100 and in particular the longitudinal telescoping assembly 113b, while in the first position X1, the second position X2, or any position therebetween is robust such that the longitudinal telescoping assembly 113b is configured to lift, lower, transport, tilt, and the like, containers that weigh much more that the assistive robot system 100. It should be appreciated that the longitudinal telescoping assembly 113b is not bound by the first position X1 and the second position X2 and that there are a plurality of positions therebetween that the linear actuator 906 and/or the dual pulley system 908 may position the second longitudinal segment 902b and the third longitudinal segment 902c with respect to the first longitudinal segment 902a.

In some embodiments, the gripping assembly 122 is attached to the third longitudinal segment 902c and operably connected to the dual pulley system 908. A portion of the attachment portion 122a is nested within the interior area of the third longitudinal segment 902c and is configured to extend and/or retract into and out of the interior area of the third longitudinal segment 902c. In some embodiments, in operation, when the linear actuator 906 actuates the longitudinal telescoping assembly 113b and the dual pulley system 908, the attachment portion 122a extends and retracts with each of the second longitudinal segment 902b and the third longitudinal segment 902c of the longitudinal telescoping assembly 113b in a uniform movement thereby changing or modifying the position of the gripping portion 122b. As best shown in FIG. 10A, it should be appreciated that in the first position X1, the attachment portion 122a of the gripping assembly 122, much like the third longitudinal segment 902c, is nested within the interior area of the second longitudinal segment 902b, which in turn is nested within the interior area of the first longitudinal segment 902a. In the X1 position, a portion of the gripping portion 122b is positioned along the inside surface of the third longitudinal segment 902c In other embodiments, when the container is gripped by the movable arm assembly 112, the example gripping assembly 122 may remain in the extended position independent of the position of the telescoping segments. As such, the attachment portion 122a and/or the gripping portion 122b of the example gripping assembly 122 maintains contact with the container even when the telescoping segments are in the X1 or retracted position.

As discussed above, the inside surface of the gripping portion 122b may be a pad that is be contoured, textured, and/or a combination thereof. For example, the inside surface 122c may be a pad with chevron ridges, rounded ridges, deep waves, and/or the like, configured to grip the container. In other embodiments, the gripping assembly 122 may be a hook, a clasp, and/or the like, configured to grip a plurality of containers, each container having a different shape, as discussed in greater detail herein.

Figure 11A:
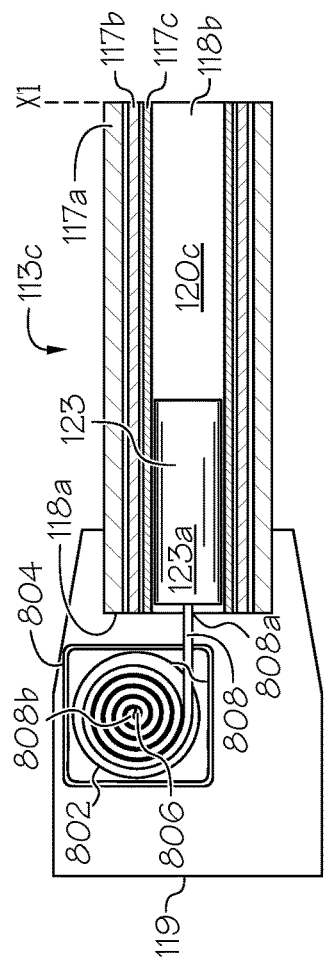
FIG. 11A schematically depicts an isolated view of a second example longitudinal telescoping assembly in a first position according to one or more embodiments shown and described herein.
Figure 11B:
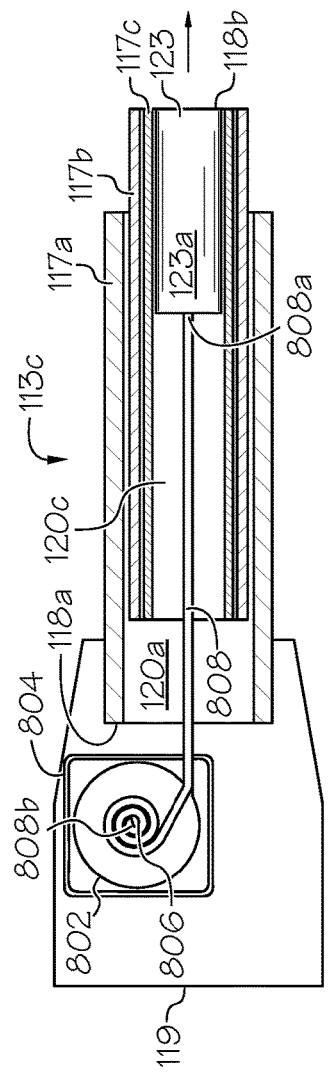
FIG. 11B schematically depicts an isolated view of the second example longitudinal telescoping assembly of FIG. 11A in a mid-positon according to one or more embodiments shown and described herein.
Figure 11C:
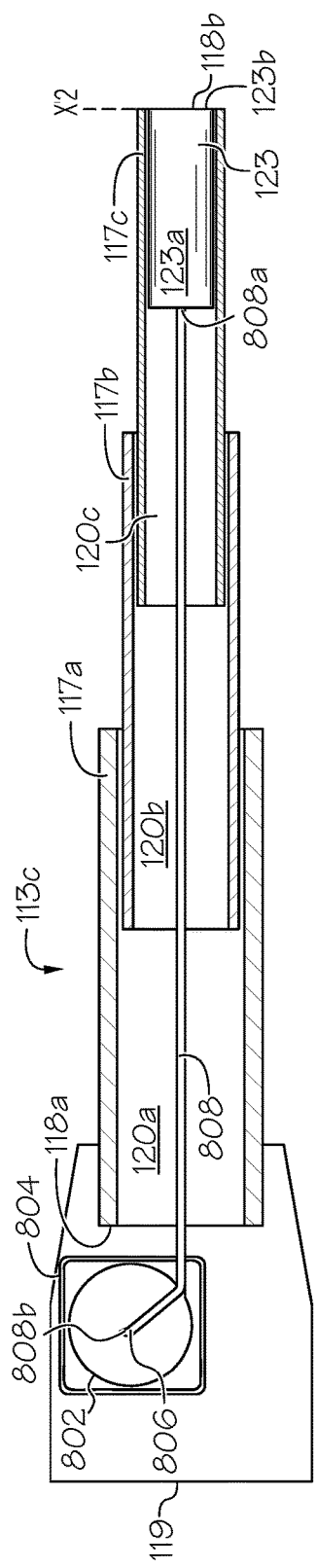
FIG. 11C schematically depicts an isolated view of the second example longitudinal telescoping assembly of FIG. 11A in a second position according to one or more embodiments shown and described herein.

Referring now to FIGS. 11A-11C, an additional or a second embodiment of the example movable arm assembly 112 will now be described. It should be appreciated that for like elements, the same reference numerals are used. In the illustrated embodiment, the example movable arm assembly 112 includes another example longitudinal telescoping assembly 113c. The longitudinal telescoping assembly 113c has a plurality of longitudinal telescoping segments. In the illustrated embodiment, the longitudinal telescoping assembly 113c has three segments: a first slide segment 117a, a second slide segment 117b, and a third slide segment 117c. It should be understood that more or fewer segments may be provided. In some embodiments, the first slide segment 117a includes an attachment end 118a that is coupled to an attachment plate 119. The attachment plate 119 is mounted to the housing 121 (FIG. 8) and extends from the housing 121 such that the longitudinal telescoping assembly 113c extends from the attachment plate 119 in a direction traverse to or perpendicular to the lateral telescoping assembly 113a in the system longitudinal direction (i.e., in the +/−X direction).

The third slide segment 117c of the longitudinal telescoping assembly 113c includes a distal end 118b. The longitudinal telescoping assembly 113c is configured to move between a retracted, or first position X'1 and an extended, or second portion X'2. It should be appreciated that FIG. 11B illustrates a mid-position between the first position X'1 and the second position X'2, however this is not limiting and the telescoping segments may move anywhere and stop anywhere between the first position X'1 and the second position X'2. The longitudinal telescoping assembly 113c further includes a drum 802 and an actuator 804. The drum 802 is rotatably coupled to the actuator 804 via a connector 806 such as a shaft, a rod, and/or the like. The drum 802 is configured to rotate, in either direction, upon an activation of the actuator 804. Further, the drum 802 is configured to house a coiled member 808, such as a belt or a chain. In some embodiments, the coiled member 808 is a rigid member such as a lead screw, a rack and pinion assembly, a rigid chain, and the like. The coiled member 808 includes a first end 808a and a second end 808b. The first end 808a is attached to a second example gripping assembly 123 and the second end 808b is attached to the drum 802. In some embodiments, the first end 808a of the coiled member 808 is attached to the third slide segment 117c. In embodiments, the coiled resilient member 808 is configured to coil tightly around a circumference of the drum 802 and itself when the longitudinal telescoping assembly 113c is in the retracted state X'1. Conversely, the coiled member 808 loosens and expands its coil during the unwinding or uncoiling from the drum 802 while the longitudinal telescoping assembly 113c is being extended into the second position X'2. As such, when extending the longitudinal telescoping assembly 113c from the retracted position X'1 into the extended position X'2, the coiled member 808 may push the gripping assembly 122, which in turn pulls the third slide segment 117c and the second slide segment 117b from the first slide segment 117a.

In some embodiments, the third slide segment 117c and the second slide segment 117b telescope along a longitudinal linear rail and across an inner surface 120a of the first slide segment 117a such that the first slide segment 117a is generally stationary and/or has less telescoping movement in the system longitudinal direction (i.e. in the +/−X direction) than the third slide segment 117c and/or the second slide segment 117b. It is appreciated that the longitudinal linear rail is mounted to the inner surface 120a of the first slide segment 117a and inner surfaces 120b, 120c of the second and third slide segments 117b, 117c of the longitudinal telescoping assembly 113c and extends a length of the inner surfaces 120a, 120b, 120c in the system longitudinal direction (i.e., in the +/−X direction). It should be appreciated that the first slide segment 117a is fixedly mounted to the attachment plate 119. It should also be appreciated that the longitudinal telescoping assembly 113c may have other configurations and that the segments may be nested in any arrangement. For example, the arrangement described herein relating to the third slide segment 117c and the second slide segment 117b telescope along the longitudinal linear rail across the inner surface 120a of the first slide segment 117a is merely one example and is non-limiting.

In some embodiments, the coiled member 808 is spring loaded when coiled onto the drum 802. As such, when extending the longitudinal telescoping assembly 113c, the coiled resilient member 808 retracts a second example gripping assembly 123, the second slide segment 117b and the third slide segment 117c towards the attachment plate 119 along the longitudinal linear rail without the need for the actuator 804. It should be appreciated that the actuator 804 is used to drive or extend the second example gripping assembly 123, the second slide segment 117b, and the third slide segment 117c into the extend position X'2 along the longitudinal linear rail. Further, it should be appreciated that the coiled resilient member 808 coils upon itself during retraction. In embodiments, the coiled member 808 is stiff enough to push or extend second example gripping assembly 123 in the system longitudinal direction (i.e., in the +/−X direction) such that second example gripping assembly 123 pulls the third slide segment 117c and the second slide segment 117b and is also flexible to coil over itself onto the drum 802. Further, it should be appreciated that the coiled member 808 may self-regulate its own recoil speed based on, for example, the stiffness or the rigidity of the coiled member 808. That is, the flexibility the coiled member 808 may determine the recoil speed and the strength of the coiled member 808.

The second example gripping assembly 123 may be slidably attached to the inner surface 120a of each of the slide segments 117a, 117b, 117c of the longitudinal telescoping assembly 113b along the longitudinal linear rail such that the coiled member 808 drives the second example gripping assembly 123 to extend and retract each of the slide segments 117b, 117c of the longitudinal telescoping assembly 113c. When the longitudinal telescoping assembly 113c is retracted, or in the first position X'1, the second example gripping assembly 123 may be adjacent to the attachment end 118a. Conversely, when the longitudinal telescoping assembly 113c is extended, or in the second position X'2, the second example gripping assembly 123 may be adjacent to the distal end 118b.

In some embodiments, an outside surface 123b of the second example gripping assembly 123 engages with the longitudinal linear rail of the longitudinal telescoping assembly 113c. Further, in some embodiments, an inside surface 123a of the second example gripping assembly 123 may a pad that is be contoured, textured, and/or a combination thereof. For example, the inside surface 123a may be a pad with chevron ridges, rounded ridges, deep waves, and/or the like. In other embodiments, the second example gripping assembly 123 may be a hook, a clasp, and/or the like, configured to grip a plurality of containers, each container having a different shape, as discussed in greater detail herein.

Referring now back to FIG. 8 and now to FIGS. 12A-12F, non-limiting container shapes are illustrated and described. FIG. 12A is a perspective view of a first example container 1205 and FIG. 12D is a front view of the first example container 1205 of FIG. 12A. The first example container 1205 includes a pair of parabolic sidewalls 1207. The pair of arms 112a, 112b of the movable arm assembly 112 and, in particular, the example gripping assembly 122 is configured to be in contact with the pair of parabolic sidewalls 1207 so to grip, raise, place, store, lower, tilt and/or the like, the container 1205.

FIG. 12B is a perspective view of a second example container 1210 and FIG. 12E is a front view of the first example container 1210 of FIG. 12B. The second example container 1210 includes a pair of modified trapezoidal sidewalls 1212 having an upper flat region 1213 and a lower flat region 1214. The pair of arms 112a, 112b of the movable arm assembly 112 and the gripping assembly 122 of each of the pair of arms 112a, 112b is configured to be in contact with the pair of modified trapezoidal sidewalls 1212 so to grip, raise, place, store, lower, tilt, and/or the like, the container 1210.

FIG. 12C is a perspective view of a third example container 1215 and FIG. 12F is a front view of the third example container 1215 of FIG. 12A. The third example container 1215 includes a pair of trapezoidal sidewalls 1217, a front wall 1220 and a rear wall 1222 so to form a cavity 1224 having an opening 1226. A lip portion 1228 surrounds the circumference of the opening 1226. The pair of arms 112a, 112b of the movable arm assembly 112 and the gripping assembly 122 of each of the pair of arms 112a, 112b is configured to be in contact with the pair of trapezoidal sidewalls 1217 so to grip, raise, place, store, lower, tilt, and/or the like, the container 1215.

Now referring to FIGS. 13A-13E, an example container tilting motion is schematically depicted. With reference to FIG. 13A, the assistive robot system 100 is illustrated gripping the third example container 1215 with the gripping assembly 122 of each of the pair of arms 112a, 112b of the example movable arm assembly 112. It should be appreciated that the container 1215 is not limited to the third example container 1215, but may be the first example container 1205 (FIG. 12A), the second example container 1210 (FIG. 12B), and/or any other container or object shape. In the illustrated embodiment, the container 1215 begins on a floor surface. However, this is non-limiting and the container may be gripped from any height in the system vertical direction (i.e., in the +/−Z direction) that is within reach of the example gripping assembly 122 of the movable arm assembly 112 and the lifting mechanism 101.

Now referring to FIG. 13B, the assistive robot system 100 is schematically depicted as raising the container 1215 in the system vertical direction (i.e., in the +/−Z direction) from the floor to a raised position. It should be appreciated the while the longitudinal telescoping assembly 113b of the example movable arm assembly 112 is depicted as being extended to the second position X2 (FIG. 10C), this is non-limiting and the longitudinal telescoping assembly 113b of the example movable arm assembly 112 may be moved (i.e. extended or retracted) to any position in the system longitudinal direction (i.e. in the +/−X direction).

Now referring to FIG. 13C, the assistive robot system 100 is schematically depicted as positioning the container 1215 in a pre-tilt position by retracting the longitudinal telescoping assembly 113b of the example movable arm assembly 112 in the system longitudinal direction (i.e., in the +/−X direction). It should be appreciated the while the longitudinal telescoping assembly 113b of the example movable arm assembly 112 is depicted as being retracted to the first position X1 (FIG. 10A), this is non-limiting and the longitudinal telescoping assembly 113b of the example movable arm assembly 112 may be extended or retracted to any position in the system longitudinal direction (i.e. in the +/−X direction). In some embodiments, the pre-tilt position obtained by the movement of the longitudinal telescoping assembly 113b of the example movable arm assembly 112 is based on the size of the container 1215. In other embodiments, the pre-tilt position may be based on the positon of the container tilting arm assembly 602, the desired location to place the contents of the container when tilted, and the like. Further, it should be appreciated that in some embodiments, when the container 1215 is gripped by the movable arm assembly 112 and retracted to the first position, the gripping assembly 122 may remain in the extended position independent of the position of the telescoping segments. As such, the gripping assembly 122 maintains contact with the container 1215 even when the telescoping segments are in the X1 (FIGS. 10A-10C) or retracted position.

Now referring to FIG. 13D, in some embodiments, the assistive robot system 100 is schematically depicted as positioning a zone of contact 1304 of a first surface 1306a of the container 1215 in contact with the container tilting arm assembly 602. The container 1215 is pivoted or tilted against the container tilting arm assembly 602 such that the contents or articles within the container 1215 may be emptied into or onto another object, such as a second container, a floor, a shelf, and the like. In some embodiments, the zone of contact 1304 extends a length in the system lateral direction (i.e. in the +/−Y direction) of the front wall 1220 of the container 1215. Further, the zone of contact 1304 may have a height in the system vertical direction (i.e. in the +/−Z direction). As such, it should be appreciated an area of the zone of contact 1304 may vary based on the size, shape, type, material, and the like of the container 1302.

Now referring to FIG. 13E, in other embodiments, the assistive robot system 100 is schematically depicted as positioning a zone of contact 1304 of a second surface 1306 of the container 1215 in contact with the container tilting arm assembly 602. In the illustrated embodiment, a bottom surface 1306 is traverse to the front wall 1220. In other embodiments, the second surface 1306 may be any other surface. The container 1215 is pivoted or tilted against the container tilting arm assembly 602 such that the contents or articles within the container 1215 may be emptied into or onto another object, such as a second container, a floor, a shelf, and the like. In some embodiments, the zone of contact 1304 extends a length in the system lateral direction (i.e., in the +/−Y direction) of the bottom surface 1306 of the container 1215. Further, the zone of contact 1304 may have a height in the system vertical direction (i.e., in the +/−Z direction). As such, it should be appreciated an area of the zone of contact 1304 may vary based on the size, shape, type, material, and the like of the container 1215.

Figure 14A:
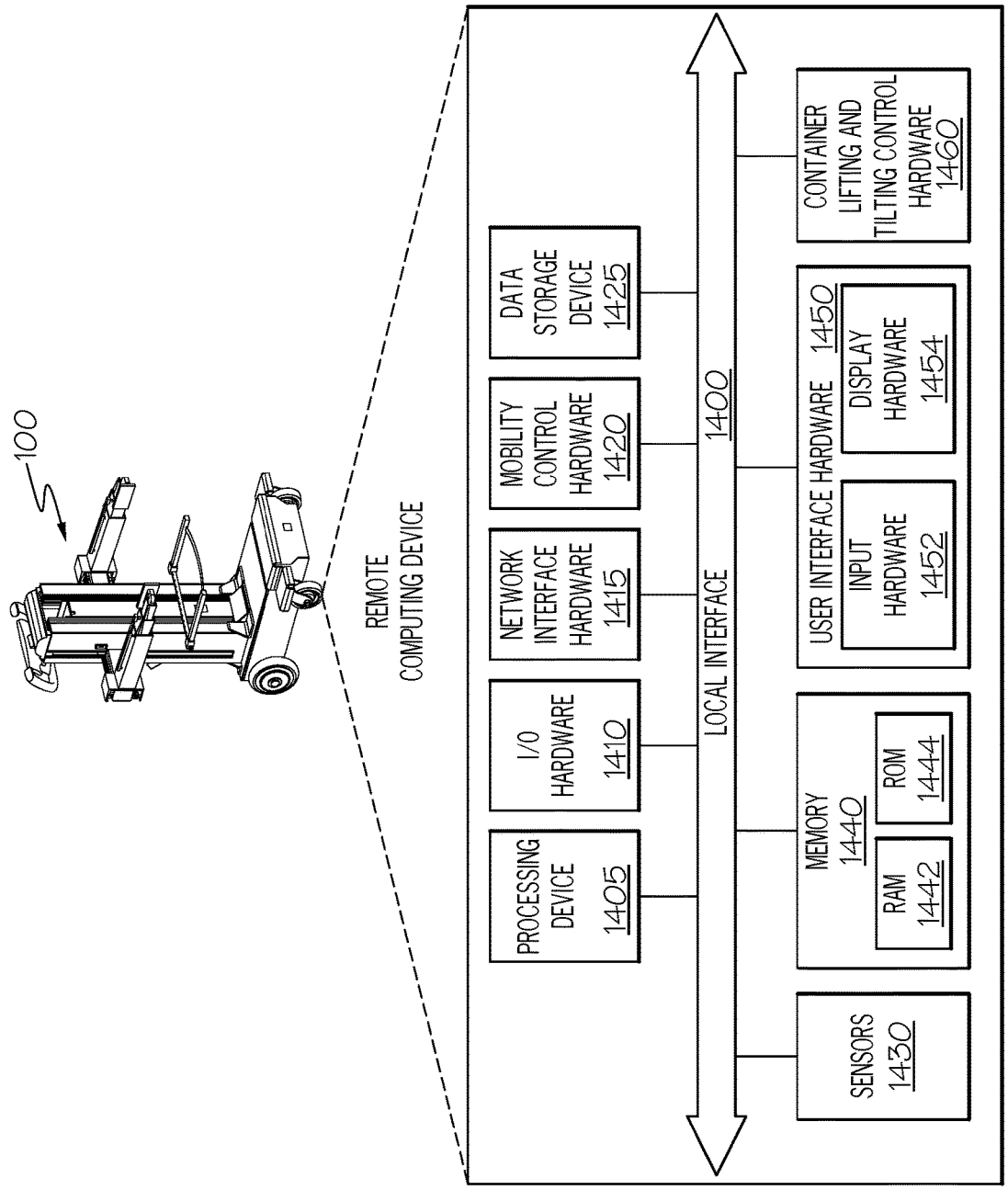
FIG. 14A schematically depicts an illustrative memory component containing illustrative logic components according to one or more embodiments shown and described herein.
Figure 14B:
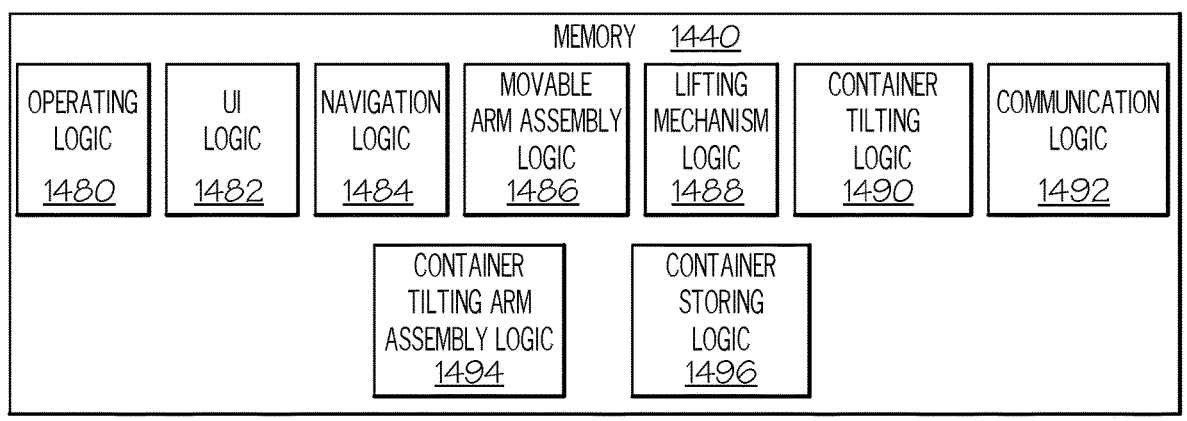
FIG. 14B schematically depicts an illustrative memory component device containing illustrative logic modules according to one or more embodiments shown and described herein.
Figure 14C:
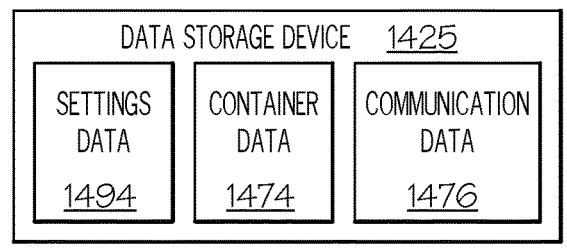
FIG. 14C schematically depicts an illustrative data storage device containing illustrative data components according to one or more embodiments shown and described herein.

Now referring got FIGS. 14A-14C, in various embodiments, the user interface device 135 (FIG. 8) and the display 140 (FIG. 8) may be integrated with one or more additional hardware components within the assistive robot system 100. FIG. 14A schematically depicts illustrative hardware components of the assistive robot system 100 that may be used to provide the functionality of the assistive robot system 100, as described herein.

The assistive robot system 100 may have a non-transitory computer-readable medium containing one or more programming instructions for completing the various processes described herein, which may be embodied as hardware, software, and/or firmware, according to embodiments shown and described herein. While in some embodiments the various components of the assistive robot system 100 may be configured as a general purpose computer with the requisite hardware, software, and/or firmware, in other embodiments, the various components of the assistive robot system 100 may also be configured as a special purpose computer designed specifically for performing the functionality described herein.

As also illustrated in FIG. 14A, the assistive robot system 100 may include a processing device 1405, I/O hardware 1410, network interface hardware 1415, mobility control hardware 1420, a data storage device 1425, the sensors 1430, a non-transitory memory component 1440, user interface hardware 1450, and object lifting control hardware 1460. A local interface 1400, such as a bus or the like, may interconnect the various components.

The processing device 1405, such as a computer processing unit (CPU), may be the central processing unit of the assistive robot system 100, performing calculations and logic operations to execute a program. The processing device 1405, alone or in conjunction with the other components, is an illustrative processing device, computing device, processor, or combination thereof. The processing device 1405 may include any processing component configured to receive and execute instructions (such as from the data storage device 1425 and/or the memory component 1440).

The memory component 1440 may be configured as a volatile or a nonvolatile non-transitory computer-readable medium and, as such, may include random access memory 1442 (including SRAM, DRAM, and/or other types of random access memory), read only memory (ROM) 1444, flash memory, registers, compact discs (CD), digital versatile discs (DVD), and/or other types of storage components. The memory component 1440 may include one or more programming instructions thereon that, when executed by the processing device 1405, cause the processing device 1405 to complete various processes. Still referring to FIG. 14A, the programming instructions stored on the memory component 1440 may be embodied as a plurality of software logic modules, where each logic module provides programming instructions for completing one or more tasks, as described in greater detail below with respect to FIG. 14B.

The network interface hardware 1415 may include any wired or wireless networking hardware, such as a modem, LAN port, wireless fidelity (Wi-Fi) card, WiMax card, mobile communications hardware, and/or other hardware for communicating with other networks and/or devices, including the vehicle to which the assistive robot system 100 is coupled, as described herein.

The data storage device 1425, which may generally be a storage medium, may contain one or more data repositories for storing data that is received and/or generated. The data storage device 1425 may be any physical storage medium, including, but not limited to, a hard disk drive (HDD), memory, removable storage, and/or the like. While the data storage device 1425 is depicted as a local device, it should be understood that the data storage device 1425 may be a remote storage device, such as, for example, a server computing device, cloud based storage device, or the like. Illustrative data that may be contained within the data storage device 1425 is described below with respect to FIG. 14C.

Still referring to FIG. 14A, the I/O hardware 1410 may communicate information between the local interface 1400 and one or more other components of the assistive robot system 100. For example, the I/O hardware 1410 may act as an interface between the various components described with respect to FIG. 14A and other components of the assistive robot system 100, such as one or motors or devices that drive movement and/or steering of the wheels 125 (FIG. 2). Still referring to FIG. 14A, the I/O hardware 1410 may be utilized to transmit one or more commands to the other components of the assistive robot system 100 in some embodiments.

The user interface hardware 1450 may include various hardware components for communicating with a user of the assistive robot system 100, such as, for example, input hardware 1452, and display hardware 1454. The input hardware 1452 may include devices such as, for example, a keyboard, a mouse, a joystick, a camera, a touch screen, a microphone, a wireless remote control device, and/or another device for receiving inputs from a user. The display hardware 1454 may include devices such as a video card, a monitor, and/or another device for sending and/or presenting visual data to a user. The display hardware 1454 may also incorporate audio output hardware or the like that generates and presents audible data to a user, such as spoken words, tones, and/or the like. It should be understood that the user interface hardware 1450 may be integrated with the user interface device 135 and the display 140 described herein with respect to FIG. 8.

Still referring to FIG. 14A, the mobility control hardware 1420 may be one or more hardware components for controlling movement of the various components of the assistive robot system 100, such as movement and steering of the wheels 125 (FIG. 2). Such hardware components may generally be configured to generate and transmit one or more signals to one or more motors coupled to the wheels 125 (FIG. 2) to effect movement of the wheels 125 (FIG. 2) or the like.

The one or more sensors 1430 may generally include the various sensors described herein, including the sensors included within the sensor device 124 (FIG. 2). The sensors 1430 may receive sensed information and transmit signals and/or data corresponding to the sensed information to one or more components described herein. For example, the sensors 1430 may receive images and/or image data via the sensor device 124 (FIG. 2) and generate one or more signals and/or data to transmit to the processing device 1405 for processing the data and determining control of the assistive robot system 100 for maneuvering the assistive robot system 100 and/or tilting the container, as described in greater detail herein.

The container tilting hardware 1460 may generally include one or more components for controlling movement of the movable arm assembly 112 (FIGS. 2 and 8) such as an upward and downward movement thereof, an extending and retracting movement thereof, and/or a lateral widening or reducing movement thereof. Further, the movement may be controlled for the first tower actuator assembly 102 (FIGS. 2, 5, 6A-6D and 7A-7D) such as an upward and downward movement thereof. Such hardware may transmit signals to the actuator 704 of the lateral telescoping assembly 113a (FIGS. 9A-9B), the linear actuator 906 of the longitudinal telescoping assembly 113b (FIGS. 10A-10C), the actuator 804 of the longitudinal telescoping assembly 113c (FIG. 11A-11C), and/or the lifting mechanism 101 (FIG. 2), which move accordingly.

The program instructions contained on the memory component 1440 (including the RAM 1442 and the ROM 1444) may be embodied as a plurality of software modules, where each module provides programming instructions for completing one or more tasks. For example, FIG. 14B schematically depicts the memory component 1440 containing illustrative logic components according to one or more embodiments shown and described herein. As shown in FIG. 14B, the memory component 1440 may be configured to store various processing logic, such as, for example, operating logic 1480, user interface (UI) logic 1482, navigation logic 1484, movable arm assembly logic 1486, lifting mechanism logic 1488, container tilting logic 1490, communication logic 1492, container tilting arm assembly logic 1494, and/or container storing logic 1496 (each of which may be embodied as a computer program, firmware, or hardware, as an example). The operating logic 1480 may include an operating system and/or other software for managing components of the assistive robot system 100 (FIG. 2). The UI logic 1482 may include one or more programming instructions for providing a user interface to a user and receiving commands from the user. The navigation logic 1284 may include one or more programming instructions for directing movement of the assistive robot system 100, including autonomous and semiautonomous movement around a space, and/or the like, as described in greater detail herein. The movable arm assembly logic 1486 may include one or more programming instructions for directing movement of the movable arm assembly 112 of the assistive robot system 100, including autonomous and semiautonomous movement to grip a container, extend a container, place a container, tilt a container, and/or the like, as described in greater detail herein.

The movable arm assembly logic 1486 may also direct movement of the movable arm assembly 112 to move the container tilting arm assembly 602, including autonomous and semiautonomous movement, to grip the container tilting arm assembly 602 and move in the system vertical direction, in the system lateral direction, move the container tilting arm assembly 602 between the folded position and the use position (FIG. 4E), and/or move the container tilting arm assembly 602 between the stored position in the base 106 (FIG. 4D) and the use position. The lifting mechanism logic 1488 may include one or more programming instructions for directing movement of the first and second tower actuator assemblies 102, 104 and the telescoping segments, including autonomous and semiautonomous movement to raise and lower the movable arm assembly 112 and/or the container tilting arm assembly 602, with and without a container, and/or the like, as described in greater detail herein. The container tilting logic 1490 may include one or more programming instructions for directing movement between the various components such that the container is pivoted or tilted to empty or remove the plurality of articles within the container. Further, the container tilting logic 1490 may include one or more programming instructions for determining pose data of the assistive robot system 100 including the robot itself, the location of the movable arm assembly 112, the location of the lifting mechanism 101, the location of the container tilting arm assembly 600 and the like.

The communications logic 1492 may include one or more programming instructions for communicating between the various components of the assistive robot system 100, recognizing the objects via the sensor device 124, radio frequency (RF) identification, optical imaging, and/or the like. The container tilting arm assembly logic 1494 may include one or more programming instructions for directing movement of the container tilting arm assembly 602 of the assistive robot system 100, including autonomous and semi-autonomous movement to tilt a container by pivoting the container utilizing the container tilting arm assembly 602.

Further, the container tilting arm assembly logic 1494 may determine the position of the container tilting arm assembly 602, whether the container tilting arm assembly 602 is stowed in the base 1-6 (FIG. 2) or are folded into the storage position (FIG. 4E). The container tilting arm assembly logic 1494 may also determine a width of the arms 602*a*, 602*b* of the container tilting arm assembly 602. It should be appreciated that in embodiments, the container may be tilted to make loading the container with objects an easier task. The container storing logic 1496 may include one or more programming instructions for directing movement of the container tilting arm assembly 602 and the movable arm assembly 112 of the assistive robot system 100, including autonomous and semiautonomous movement to either move a container, store a container, or tilt a container when a container is in storage on the assistive robot system 100.

FIG. 14C schematically depicts a block diagram of various data contained within a storage device (e.g., the data storage device 1425) of a computing device and/or a vehicle component according to one or more embodiments shown and described herein. As shown in FIG. 14C, the data storage device 1425 may include, for example, settings data 1472, container data 1474, and/or communication data 1476. Settings data 1472 may include, for example, data associated with particular user settings for the assistive robot system 100, such as UI preferences settings, control preferences settings, and/or the like. Container data 1474 may generally refer to a database of information relating to a plurality of containers that the assistive robot system 100 may pick-up, place somewhere, store, tilt, and/or generally transport about a space. Communication data 1476 may generally be data that corresponds to communications between the various components and/or the type of container, and/or the like. For example, the communications data 1476 may include pose data for the assistive robot system 100 including the robot itself, the location of the movable arm assembly 112, the location of the lifting mechanism 101, the location of the container tilting arm assembly 602, and the like.

It should be understood that the components illustrated in FIGS. 14A-14C are merely illustrative and are not intended to limit the scope of this disclosure. More specifically, while the components in FIGS. 14A-14C are illustrated as residing within the assistive robot system 100, this is a nonlimiting example. In some embodiments, one or more of the components may reside external to the assistive robot system 100.

As mentioned above, the various components described with respect to FIGS. 14A-14C may be used to carry out one or more processes and/or provide functionality for moving the assistive robot system 100, for guiding the movable arm assembly 112 and/or the container tilting arm assembly 602 of the assistive robot system 100, for raising, lowering, and or tilting the container via the first and second tower actuator assemblies 102, 104, the movable arm assembly 112 and/or the container tilting arm assembly 602, for grasping or releasing of containers, and for receiving user inputs. An illustrative example of the various processes are described with respect to FIGS. 15-17 hereinbelow.

Figure 15:
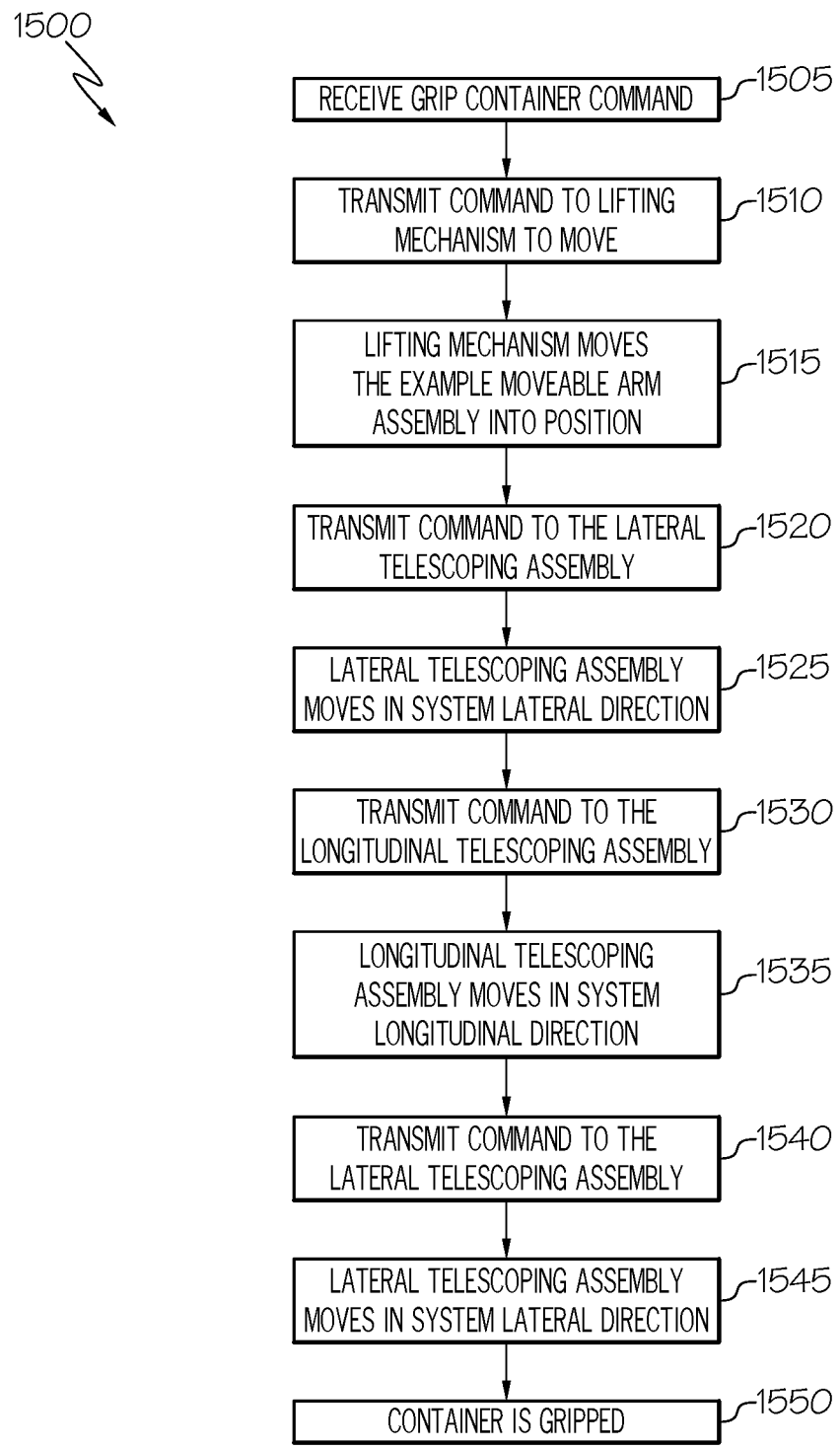
FIG. 15 depicts a flow diagram of an illustrative method of gripping a container according to one or more embodiments shown and described herein.
Figure 16:
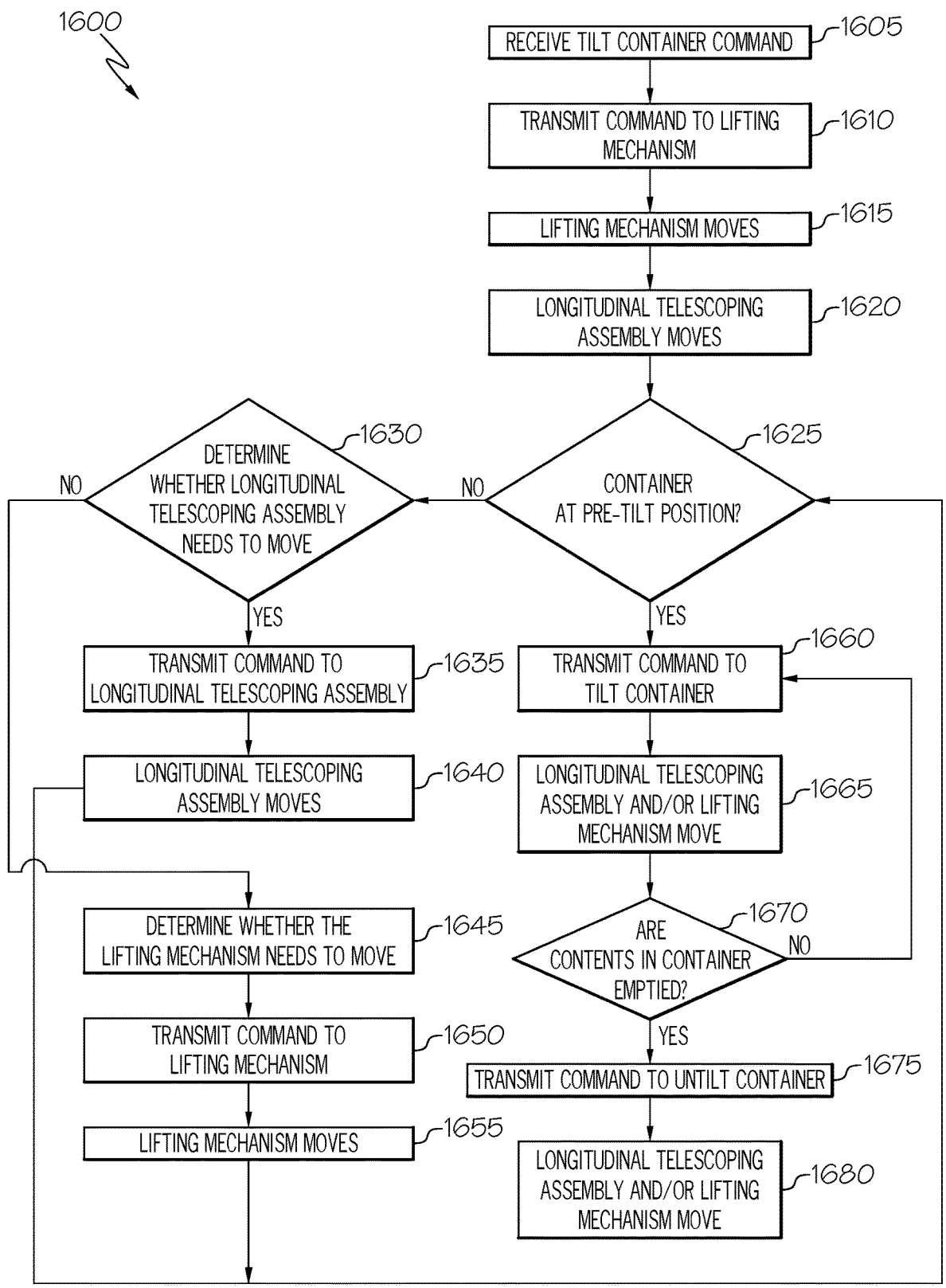
FIG. 16 depicts a flow diagram of an illustrative method of tilting a container according to one or more embodiments shown and described herein.
Figure 17:
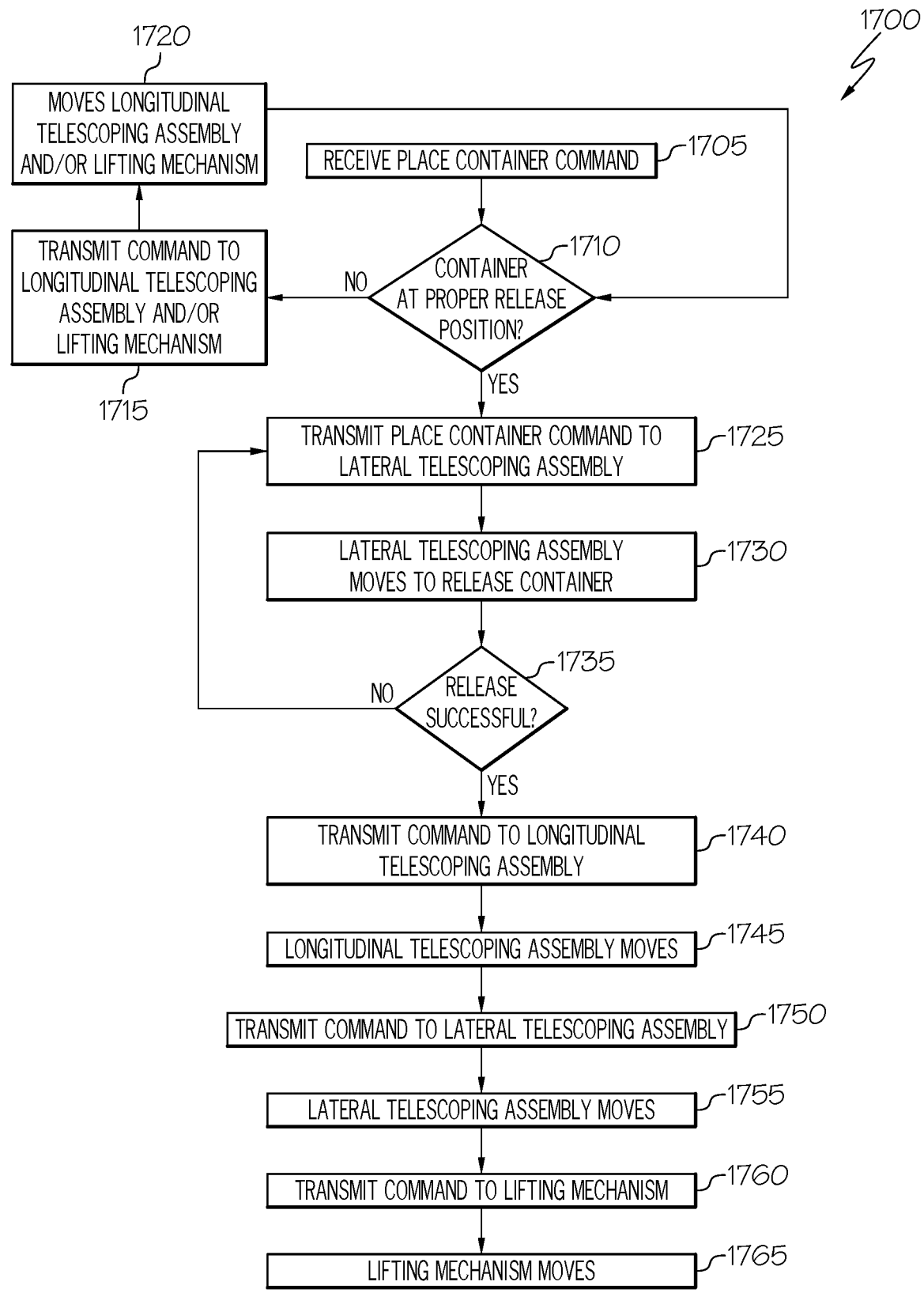
FIG. 17 depicts a flow diagram of an illustrative method of placing a container according to one or more embodiments shown and described herein.

As previously mentioned, FIGS. 15-17 depict various non-limiting processes that may be completed by the assistive robot system 100 and/or one or more components thereof for autonomous or semiautonomous operation of the assistive robot system 100 (FIG. 2). The various processes described with respect to FIGS. 15-17 may generally be completed by the assistive robot system 100 or a component thereof, such as, for example, the processing device 1405 (FIG. 14A). FIG. 15 depicts an illustrative method of gripping a container, generally designated 1500, according to some embodiments. The various steps described with respect to FIG. 15 are merely illustrative, and additional, fewer, or alternative steps are contemplated without departing from the scope of the present disclosure. In addition, the steps described with respect to FIG. 15 are generally completed when the assistive robot system is gripping the container.

At block 1505, a grip container command may be received. The grip container command may be received via the user interface of the assistive robot system, may be received via a remote control device that transmits a wireless signal to the assistive robot system, and/or the like. It should be appreciated that the phrase "grip container" may also be understood to mean "engage container." Upon receiving such a command, a command may then be transmitted to the lifting mechanism at block 1510 to cause the example movable arm assembly to move into a position similar to the height in the system vertical direction (i.e., in the +/−Z direction) as the pair of sidewalls of the container to be gripped at block 1515.

Thereafter, a command is transmitted to the lateral telescoping assembly, at block 1520, to cause the example movable arm assembly to move in the system lateral direction (i.e., in the system +/−Y direction), if required, such that the example movable arm assembly has a width that is larger than the pair of sidewalls of the container to be gripped, at block 1525. For example, if the width of the container is 400 millimeters in the system lateral direction (i.e., in the +/−Y-direction), the lateral telescoping assembly may extend 430 millimeters in the system lateral direction (i.e., in the system +/−Y-direction) such that the example gripper assembly is wider than the container in the system lateral direction (i.e., in the +/−Y direction). It should be appreciated that this is merely an example and that the distances may vary. Further, it should be appreciated that the distances may be determined automatically by the sensing device or manually by a user controlling the lateral telescoping assembly via the user interface.

Thereafter, a command is transmitted to the longitudinal telescoping assembly, at block 1530, to move in the system longitudinal direction (i.e., in the system +Z direction) such that the example movable arm assembly moves, if required, to align the example gripping assembly with the pair of sidewalls of the container to be gripped at block 1535. For example, if the container is 400 millimeters in front of the base of assistive robot system in the system longitudinal direction (i.e., in the +/−X direction), the longitudinal telescoping assembly may extend 430 millimeters in the system longitudinal direction (i.e., in the system +/−X direction) such that the example gripping assembly is aligned with the sidewalls of the container. It should be appreciated that this is merely an example and that the distances may vary. Further, it should be appreciated that the distances may be determined automatically by a sensing device or manually by a user controlling the longitudinal telescoping assembly via the user interface. Moreover, while not specifically described in FIG. 15, the assistive robot system may, depending on the distance of the container, transmit a signal to the drive mechanism (e.g., the one or more motors) to cause the wheels to move (i.e., towards or away from the container), thereby positioning the assistive robot system in a position so to grip the container. In another example, a signal may be transmitted to a user interface device such that the user interface device displays a command to a user that instructs the user to push or pull the assistive robot system towards or away from the container so to position the longitudinal telescoping assembly X into the proper gripping position.

Once the longitudinal telescoping assembly is in position, a command is transmitted to the lateral telescoping assembly, at block 1540, to cause the lateral telescoping assembly to move in the system lateral direction (i.e., in the +/−Y direction), at block 1545, such that the example gripping assembly makes contact with, or grips the pair of sidewalls of the container. As such, the container is now gripped by the assistive robot system at block 1550. In some embodiments, confirming that the container is gripped may be verified automatically by the sensing device or manually by a user confirming via the user interface.

FIG. 16 depicts an illustrative method of tilting the container, generally designated 1600, according to some embodiments. The various steps described with respect to FIG. 16 are merely illustrative, and additional, fewer, or alternative steps are contemplated without departing from the scope of the present disclosure. In addition, the steps described with respect to FIG. 16 are generally completed when the assistive robot system has gripped the container.

At block 1605, a tilt container command is received. The tilt container command may be received via the user interface of the assistive robot system, may be received via a remote control device that transmits a wireless signal to the assistive robot system, and/or the like. Upon receiving such a command, a command is transmitted to lifting mechanism, at block 1610, which causes the lifting mechanism to move with a container gripped by the example gripping assembly of the movable arm assembly to a height in the system vertical direction (i.e. in the +/−Z direction) at or above a tilt position, at block 1615. Once at a height equal to or greater than the tilt positon, the longitudinal telescoping assembly moves to positions the container at the pre-tilt positon, at block 1620. At block 1625, a verification may be performed to ensure that the container is positioned properly at the pre-tilt position. If the container is not properly positioned at the pre-tilt position, the assistive robot system determines whether the longitudinal telescoping assembly needs to move, at block 1630, and if so, a command is transmitted to the longitudinal telescoping assembly, at block 1635, which in turn causes the longitudinal telescoping assembly to move, at block 1640. If the assistive robot system determines that the lifting assembly needs to move, at block 1645, a command is transmitted to the lifting mechanism, at block 1650, which in turn causes the lifting mechanism to move, at block 1655. After the move of the longitudinal telescoping assembly, at block 1640, and/or after the move of the lifting mechanism, at block 1655, the verification of the container at the pre-tilt position, at block 1625, may be performed again to ensure that the container is positioned properly. It should be appreciated that the method of blocks 1625-1655 may be performed simultaneously to properly position the container at the pre-tilt position. Further, it should be appreciated that verifying whether the container is at the pre-tilt position may be determined automatically by the sensing device or manually by a user confirming via the user interface.

When the container is verified as being properly positioned at the pre-tilt position, at block 1625, then a tilt container command is transmitted, at block 1660. In response, the command causes the longitudinal telescoping assembly and/or the lifting mechanism to move such that a surface of the container within a zone of contact of the container is positioned to pivot or tilt against the object tilting arm assembly, at block 1665. During the tilting of the container, a plurality of contents or articles within the container are emptied and as such, the assistive robot system verifies whether the plurality of articles within the container are emptied, at block 1670. If any of the plurality of articles remain within the container, the tilt container command is again transmitted at block 1660, which in turn causes the longitudinal telescoping assembly and/or the lifting mechanism to pivot or tilt the container again, at block 1665. It should be appreciated that this loop may continue until all of the plurality of articles are emptied from the container. Further, it should be appreciated that verifying whether contents remain in the container is determined automatically by the sensing device or manually by the user confirming via the user interface.

Once the plurality of articles are removed from the container, an un-tilt container command is transmitted, at block, 1675, which causes the longitudinal telescoping assembly and/or the lifting mechanism to move the container back to the pre-tilt position, at block 1680. It should be appreciated that the assistive robot system may wait at the pre-tilt position for additional commands such as a command that cause the assistive robot system to move the container to a drop off location, a command that causes the assistive robot system to store the empty container on the assistive robot system, and the like.

FIG. 17 depicts an illustrative method of placing the container, generally designated 1700, according to some embodiments. The various steps described with respect to FIG. 17 are merely illustrative, and additional, fewer, or alternative steps are contemplated without departing from the scope of the present disclosure. In addition, the steps described with respect to FIG. 17 are generally completed when the assistive robot system has released the container.

At block 1705, a place container command may be received. The place container command may be received via the user interface of the assistive robot system, may be received via a remote control device that transmits a wireless signal to the assistive robot system, and/or the like. Upon receiving such a command, a verification may be performed to ensure that the container is at the proper release position, at block 1710. The container release position may be determined automatically by the sensing device or manually by a user confirming via the user interface. If the container is not at the proper release position, a command is transmitted to the longitudinal telescoping assembly and/or the lifting mechanism, at block 1715, which in turn causes the longitudinal telescoping assembly and/or the lifting mechanism to move, at block 1720. It should be appreciated that the method of blocks 1710-1720 may be performed simultaneously to properly position the container at the proper release position. Moreover, in some embodiments, if the container is not at the proper release position, a signal may be transmitted to the drive mechanism (e.g., the one or more motors) to cause the wheels to move (i.e., away from the container and/or shelf), thereby positioning the assistive robot system in a position neat the release position. In another example, a signal may be transmitted to a user interface device such that the user interface device displays a command to a user that instructs the user to push or pull the assistive robot to the release position.

Once the container is in the proper release position, a place container command is transmitted, at block 1725, that causes the lateral telescoping assembly to move in the system lateral direction (i.e., in the system +/−Y direction) such that the example gripping assembly no longer make contact with, or grips the pair of sidewalls of the container, at block 1730. As such, the container is now released or placed by the assistive robot system. For example, the container may now be placed on a shelf that is higher in the system vertical direction (i.e., in the +/−Z direction) then the height where the container was gripped, placed at a lower position in the system vertical direction (i.e., in the +/−Z direction) and/or placed on the assistive robot system. The release of the container is verified at block 1735. The container release verification may be automatically performed by the sensing device or manually performed by the user confirming via the user interface. If the release of the container was not successful, the place container command may again be transmitted to the lateral telescoping assembly, at block 1725, causing the lateral telescoping assembly to again move, at block 1730.

If the release was successful, thereafter, a command is transmitted to the longitudinal telescoping assembly, at block 1740, that causes the longitudinal telescoping assembly to move such that the example gripping assembly is clear of the container and the place of release, such as the shelf, at block 1745. Moreover, depending on the distance of the container at the release position or the shelf, a signal may be transmitted to the drive mechanism (e.g., the one or more motors) to cause the wheels to move (i.e., away from the container and/or shelf), thereby positioning the assistive robot system in a position away from the container and/or shelf. In another example, a signal may be transmitted to a user interface device such that the user interface device displays a command to a user that instructs the user to push or pull the assistive robot system away from the container and/or the shelf.

A command may then be transmitted to the lateral telescoping assembly at block 1750 causing the lateral telescoping assembly to move in the system lateral direction (i.e., in the system +/−Y direction) such that the lateral telescoping assembly moves, at block 1755. A command may then be transmitted to the lifting mechanism, at block 1760 that causes the lifting mechanism to move, at block 1765.

It should now be understood that the assistive robot systems described herein are configured to grip, raise, tilt, lower, retrieve and place containers on raised surfaces, such as shelves, lower surfaces such as floor, tilt containers to empty contents into a second container, onto to shelf or onto a floor. The assistive robot systems described herein generally include various components that grip, release, and tilt containers, as well as various components that allow for communications to a user while performing the gripping, raising, lowering, tilting, and placing of containers.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An assistive robot system comprising:
   a lifting mechanism;
   a movable arm assembly coupled to the lifting mechanism;
   a container tilting arm assembly;
   a processing device communicatively coupled to the lifting mechanism and the movable arm assembly; and
   a non-transitory, processor-readable storage medium in communication with the processing device, the non-transitory, processor-readable storage medium comprising one or more programming instructions that, when executed, cause the processing device to:
   transmit a command to the lifting mechanism to cause the lifting mechanism to move the movable arm assembly such that the container tilting arm assembly makes contact with a container gripped by the movable arm assembly, and transmit one or more signals to the movable arm assembly to cause the movable arm assembly to extend in a system longitudinal direction such that the container gripped by the movable arm assembly is pivoted against the container tilting arm assembly to tilt the container within the movable arm assembly.

2. The assistive robot system of claim 1, wherein:

the movable arm assembly comprises a pair of movable arms;

each movable arm of the pair of movable arms comprises a longitudinal telescoping assembly and a lateral telescoping assembly;

the longitudinal telescoping assembly comprises a plurality of longitudinal telescoping segments configured to extend and retract in the system longitudinal direction; and the lateral telescoping assembly comprises a plurality of lateral telescoping segments configured to extend and retract in the system lateral direction.

3. The assistive robot system of claim 1, wherein the container tilting arm assembly is a pair of arms defining a gap.

4. The assistive robot system of claim 3, wherein an elongated member is connected to the pair of arms in a direction traverse to the pair of arms such that the elongated member contacts the container within a zone of contact of the container.

5. The assistive robot system of claim 3, wherein each arm of the pair of arms further includes a member extending in a direction traverse to the pair of arms and into the gap such that each member contacts the container within a zone of contact of the container.

6. The assistive robot system of claim 1, wherein the container tilting arm assembly is adjustable in a system vertical direction such that a height at which the container is tipped is adjustable.

7. The assistive robot system of claim 1, further comprising a base having an upper surface, wherein the container tilting arm assembly is stored in one or more recesses in the upper surface of the base.

8. An assistive robot system comprising:

a lifting mechanism;

a movable arm assembly coupled to the lifting mechanism;

a container tilting arm assembly;

a sensor device that senses an area surrounding the assistive robot system; and a processing device communicatively coupled to the sensor device, the lifting mechanism, and the movable arm assembly, wherein:

data is transmitted from the sensor device to the processing device, the processing device processes the data and determines one or more movement commands, and the processing device transmits one or more signals corresponding to the one or more movement commands to:

cause the lifting mechanism and the movable arm assembly to move and grip a container, cause the lifting mechanism to move the movable arm assembly such that the container tilting arm assembly contacts the container gripped by the movable arm assembly at a zone of contact, and cause the movable arm assembly to extend in a system longitudinal direction such that the container within the movable arm assembly is pivoted against the container tilting arm assembly to tilt the container within the movable arm assembly.

9. The assistive robot system of claim 8, wherein the sensor device is configured to identify whether a second container is stored in the container tilting arm assembly.

10. The assistive robot system of claim 8, wherein the sensor device is configured to identify whether a plurality of articles within the container have been emptied from the container during the tilting.

11. The assistive robot system of claim 8, wherein the sensor device is configured to identify whether the container tilting arm assembly is in a proper position to make contact with the container.

12. The assistive robot system of claim 11, wherein the processing device transmits one or more signals corresponding to the one or more movement commands to:

cause the lifting mechanism and the movable arm assembly to move and grip the container tilting arm assembly so to place the container tilting arm assembly in the proper position for tilting the container.

13. The assistive robot system of claim 8, wherein the container tilting arm assembly is adjustable in a system vertical direction such that a height at which the container is tipped is adjustable.

14. The assistive robot system of claim 8, wherein the container tilting arm assembly is a pair of arms defining a gap.

15. The assistive robot system of claim 14, wherein:

each arm of the pair of arms is foldable between a first position and a second position, the first position is where the pair of arms extend in the system longitudinal direction, and the second position is a stowed position where the pair of arms extend in a system vertical direction such that the pair of arms are folded when not in use.

16. The assistive robot system of claim 14, wherein an elongated member is connected to the pair of arms in a direction traverse to the pair of arms such that the elongated member contacts the container within the zone of contact of the container.

17. The assistive robot system of claim 14, wherein each arm of the pair of arms further includes a member extending in a direction traverse to the pair of arms and into the gap such that each member contacts the container within the zone of contact of the container.

18. The assistive robot system of claim 8, wherein:

the movable arm assembly comprises a pair of movable arms;

each movable arm of the pair of movable arms comprises a longitudinal telescoping assembly and a lateral telescoping assembly;

the longitudinal telescoping assembly comprises a plurality of longitudinal telescoping segments configured to extend and retract in the system longitudinal direction; and the lateral telescoping assembly comprises a plurality of lateral telescoping segments configured to extend and retract in the system lateral direction.

* * * * *

UNITED STATES PATENT AND TRADEMARK OFFICE
CERTIFICATE OF CORRECTION

| | | |
|---|---|---|
| PATENT NO. | : 11,420,338 B2 | Page 1 of 1 |
| APPLICATION NO. | : 16/560363 | |
| DATED | : August 23, 2022 | |
| INVENTOR(S) | : Joseph Bondaryk et al. | |

It is certified that error appears in the above-identified patent and that said Letters Patent is hereby corrected as shown below:

On the Title Page

In page 2, Column 1, item (56), U.S. patent documents, cite no. 13, delete "Stabler" and insert --Stahler--, therefor.

In page 2, Column 1, item (56), U.S. patent documents, cite no. 11, delete "Lame" and insert --Larue--, therefor.

In the Specification

In Column 38, Line(s) 36, after "onto", delete "to" and insert --a--, therefor.

Signed and Sealed this
Twenty-eighth Day of November, 2023

Katherine Kelly Vidal
*Director of the United States Patent and Trademark Office*